US012762287B2

(12) United States Patent
Zhu

(10) Patent No.: US 12,762,287 B2
(45) Date of Patent: Oct. 13, 2026

(54) DATA PROCESSING METHOD AND APPARATUS BASED ON HIERARCHICAL CHAIN NETWORK

(71) Applicant: Tencent Technology (Shenzhen) Company Limited, Shenzhen (CN)

(72) Inventor: Gengliang Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 72 days.

(21) Appl. No.: 19/024,904

(22) Filed: Jan. 16, 2025

(65) Prior Publication Data

US 2025/0156584 A1 May 15, 2025

Related U.S. Application Data

(63) Continuation of application No. PCT/CN2024/071989, filed on Jan. 12, 2024.

(30) Foreign Application Priority Data

Jan. 17, 2023 (CN) ........................ 202310089052.X

(51) Int. Cl.
*G06F 21/64* (2013.01)

(52) U.S. Cl.
CPC .................................... *G06F 21/64* (2013.01)

(58) Field of Classification Search
CPC ........................................................ G06F 21/64
USPC ............................................................ 726/26
See application file for complete search history.

(56) References Cited

U.S. PATENT DOCUMENTS 11,063,770 B1 * 7/2021 Peng ........................ G06F 21/64
2018/0260909 A1 9/2018 Li
2020/0265031 A1 * 8/2020 Greven ............... H04L 67/1097
2022/0036455 A1 * 2/2022 Bennett .............. G06Q 20/4016

FOREIGN PATENT DOCUMENTS

CN 101656765 A 2/2019
CN 111507815 A 8/2020
CN 112837162 A 5/2021
CN 114760325 A 7/2022

OTHER PUBLICATIONS

International Search Report issued in Internation Priority Application No. PCT/CN2024/071989 dated Apr. 21, 2024, w/English translation, 5 pages.

* cited by examiner

*Primary Examiner* — Anthony D Brown
(74) *Attorney, Agent, or Firm* — Crowell & Moring LLP

(57) ABSTRACT

This disclosure relates to a data processing method and apparatus based on a hierarchical chain network. The method includes: obtaining a data location request for target service data; determining a first node mapping identifier of a verification execution node from a mapping space when a target service data identifier of the target service data is obtained from the data location request; performing data verification on the target service data identifier based on a resource location table associated with a first node address of the verification execution node, to obtain a first data verification result; and when the first data verification result indicates that a service data identifier obtained through synchronization does not include the target service data identifier, using, as a second node mapping identifier, a node mapping identifier that is in a node routing list and that has a shortest distance from the target service data identifier.

20 Claims, 9 Drawing Sheets

DATA PROCESSING METHOD AND APPARATUS BASED ON HIERARCHICAL CHAIN NETWORK

RELATED APPLICATION

This application is a continuation application of PCT Patent Application No. PCT/CN2024/071989, filed on Jan. 12, 2024, which claims priority to Chinese Patent Application No. 202310089052X, filed with the China National Intellectual Property Administration on Jan. 17, 2023 and entitled "DATA PROCESSING METHOD AND APPARATUS BASED ON HIERARCHICAL CHAIN NETWORK, DEVICE, AND MEDIUM", wherein the content of the above-referenced applications is incorporated herein by reference in its entirety.

FIELD OF THE TECHNOLOGY

This disclosure relates to the field of blockchain technologies, and in particular, to a data processing method and apparatus based on a hierarchical chain network, a device, and a medium.

BACKGROUND OF THE DISCLOSURE

Currently, in a blockchain system, a "service network-consensus network" hierarchical structure may be formed by using a blockchain network built on a double-layer chain structure, to improve confidentiality and security of data in a blockchain.

The inventors have found in practice that, in the hierarchical structure of the blockchain network, each service node in the service network can obtain, through clearing, only service data related to the service node, but cannot store all data in the blockchain network. Therefore, it may take a long time to query for and verify specified service data on any service node. For example, if a user wants to verify authenticity of specific service data (for example, service data X) in the chain, because the user does not know a specific address at which the service data X is stored, the user may randomly initiate a query on any service node (for example, a service node 1) in the service network. If the service data X to be verified does not exist on the service node 1 at this time, the user may initiate the same query on a next service node (for example, a service node 2) that is close to the service node 1, and so on, until a service node on which the service data X is stored is found. In this way, authenticity of the service data X can be verified. Clearly, in a worst case, in this point-by-point verification method, all service nodes need to be searched to obtain a required address. Especially when a large number of service nodes exist in the service network and a node joins or exits the service network frequently, addressing efficiency of the method is low, leading to low verification efficiency during service data verification.

SUMMARY

Embodiments of this disclosure provide a data processing method and apparatus based on a hierarchical chain network, a device, and a medium. An introduced verification network may be configured for directed data addressing, to improve efficiency of addressing between verification nodes. Further, a node address of a service node storing service data can be quickly obtained based on a verification node found through directed data addressing. Further, verification efficiency for service data can be improved based on the quickly obtained node address.

An aspect of the embodiments of this disclosure provides a data processing method based on a hierarchical chain network. The method is performed by a verification execution node. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network. M is a positive integer. The verification execution node is included in the M verification nodes. The method includes:

- obtaining a data location request transmitted by a first service node in the service network for target service data;
- determining a first node mapping identifier of the verification execution node from a mapping space corresponding to the verification network in response to a target service data identifier of the target service data being identified from the data location request, the mapping space including node mapping identifiers respectively corresponding to the M verification nodes, and the node mapping identifiers being obtained by respectively mapping node addresses of the M verification nodes to the mapping space;
- performing, in a first order obtained by sorting the node mapping identifiers in ascending order, data verification on the target service data identifier based on a resource location table associated with a first node address of the verification execution node, to obtain a first data verification result, the resource location table being configured for recording an adjacent node mapping identifier greater than the first node mapping identifier, an adjacent node address corresponding to the adjacent node mapping identifier being configured for storing a service data identifier of the service data that is synchronized from the blockchain, and the data verification result being configured for indicating whether the service data identifier obtained through synchronization includes the target service data identifier;
- obtaining a node routing list corresponding to the verification execution node in response to the first data verification result indicating that the service data identifier obtained through synchronization does not include the target service data identifier, the node routing list being configured for recording K routing node mapping identifiers, the routing node mapping identifier being a node mapping identifier of a verification node that has a preset distance from the first node mapping identifier in the mapping space, K being a positive integer greater than 1, and K being less than or equal to a spatial influence parameter of the mapping space;
- determining, as a second node mapping identifier, a routing node mapping identifier among the K routing node mapping identifiers that is found in a second order opposite to the first order and that has a shortest distance from the target service data identifier in the mapping space; and transmitting a data location request to a target verification node corresponding to the second node mapping identifier, to enable the target verification node to perform data verification on the target service data.

An aspect of the embodiments of this disclosure provides a data processing method based on a hierarchical chain network. The method is performed by a target verification node. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network. M is a positive integer. The target verification node is included in the M verification nodes. The method includes:

obtaining a data location request that carries a target service data identifier and that is forwarded by a verification execution node based on a second node mapping identifier, the verification execution node being included in the M verification nodes, the data location request being a request transmitted by a first service node for target service data corresponding to the target service data identifier, the first service node being any service node in the service network, the verification execution node being configured to determine a first node mapping identifier of the verification execution node from a mapping space corresponding to the verification network in response to the target service data identifier being identified from the data location request, and perform, in a first order obtained by sorting node mapping identifiers in the mapping space in ascending order, data verification on the target service data identifier based on a resource location table associated with a first node address of the verification execution node, to obtain a first data verification result, the mapping space including node mapping identifiers respectively corresponding to the M verification nodes, the node mapping identifiers being obtained by respectively mapping node addresses of the M verification nodes to the mapping space, the resource location table being configured for recording an adjacent node mapping identifier greater than the first node mapping identifier, an adjacent node address corresponding to the adjacent node mapping identifier being configured for storing a service data identifier of the service data that is synchronized from the blockchain, the data verification result being configured for indicating whether the service data identifier obtained through synchronization includes the target service data identifier, the first data verification result being configured for indicating the verification execution node to: when it is determined that the service data identifier obtained through synchronization does not include the target service data identifier, obtain a node routing list corresponding to the verification execution node, and determine, as the second node mapping identifier, a routing node mapping identifier, among K routing node mapping identifiers recorded in the node routing list, that is found in a second order opposite to the first order and that has a shortest distance from the target service data identifier, K being a positive integer greater than 1, and K being less than or equal to a spatial influence parameter of the mapping space; and performing data verification on the target service data based on a second node address corresponding to the second node mapping identifier when it is determined, based on the data location request, that the second node mapping identifier is a node mapping identifier with a shortest distance from the target service data identifier in the first order.

An aspect of the embodiments of this disclosure provides a data processing apparatus based on a hierarchical chain network. The apparatus runs on a verification execution node. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network. M is a positive integer. The verification execution node is included in the M verification nodes. The apparatus includes a memory operable to store computer-readable instructions; and a processor circuitry operable to read the computer-readable instructions. When executing the computer-readable instructions, the processor circuitry is configured to:

obtain a data location request transmitted by a first service node in the service network for target service data;

determine a first node mapping identifier of the verification execution node from a mapping space corresponding to the verification network in response to a target service data identifier of the target service data being identified from the data location request, the mapping space comprising node mapping identifiers respectively corresponding to the M verification nodes, and the node mapping identifiers being obtained by respectively mapping node addresses of the M verification nodes to the mapping space;

perform, in a first order obtained by sorting the node mapping identifiers in ascending order, data verification on the target service data identifier based on a resource location table associated with a first node address of the verification execution node, to obtain a first data verification result, the resource location table being for recording an adjacent node mapping identifier greater than the first node mapping identifier, an adjacent node address corresponding to the adjacent node mapping identifier being for storing a service data identifier of the service data that is synchronized from the blockchain, and the data verification result being for indicating whether the service data identifier obtained through synchronization comprises the target service data identifier;

obtain a node routing list corresponding to the verification execution node in response to the first data verification result indicating that the service data identifier obtained through synchronization does not comprise the target service data identifier, the node routing list being for recording K routing node mapping identifiers, the routing node mapping identifier being a node mapping identifier of a verification node that has a preset distance from the first node mapping identifier in the mapping space, K being a positive integer greater than 1, and K being less than or equal to a spatial influence parameter of the mapping space;

determine, as a second node mapping identifier, a routing node mapping identifier among the K routing node mapping identifiers that is found in a second order opposite to the first order and that has a shortest distance from the target service data identifier in the mapping space; and transmit a data location request to a target verification node corresponding to the second node mapping identifier, to enable the target verification node to perform data verification on the target service data.

An aspect of the embodiments of this disclosure provides a computer-readable storage medium, the computer-readable storage medium storing a computer program, and the computer program being suitable for being loaded and executed by a processor, so that a computer device having the processor performs the method provided in the embodiments of this disclosure.

An aspect of the embodiments of this disclosure provides a computer program product or a computer program, the computer program product or the computer program including computer instructions, and the computer instructions being stored in a computer-readable storage medium. A processor of a computer device reads the computer instructions from the computer-readable storage medium, and the processor executes the computer instructions, so that the computer device performs the method provided in the embodiments of this disclosure.

In the embodiments of this disclosure, a verification execution node in a verification network may obtain a data location request transmitted by a first service node in a service network for target service data. Herein, the first service node is any service node in the service network, and the verification execution node is a verification node randomly selected from M verification nodes for data verification. The data verification herein is essentially directed data addressing and verification between verification nodes in the verification network. For example, for directed data addressing, in the embodiments of this disclosure, in a mapping space associated with the verification network, a node mapping identifier with a shortest distance from a target service data identifier can be quickly queried in a specific order among a few verification nodes in the verification network based on the data location request obtained by the verification execution node. Then a verification node corresponding to the found node mapping identifier with a shortest distance from the target service data identifier may be used as a verification node (namely, a target verification node) finally found by the verification execution node through addressing. Further, the verification execution node in the embodiments of this disclosure may forward the data location request to the verification node (namely, the target verification node) finally found through addressing, so that the target verification node can perform a new round of data verification on the target service data. Specifically, the verification execution node may determine a first node mapping identifier of the verification execution node from the mapping space corresponding to the verification network in response to the target service data identifier of the target service data being identified from the data location request, and then may perform, in a first order obtained by sorting node mapping identifiers in ascending order, data verification on the target service data identifier based on a resource location table associated with a first node address of the verification execution node, to obtain a first data verification result. The resource location table is configured for recording an adjacent node mapping identifier greater than the first node mapping identifier. An adjacent node address corresponding to the adjacent node mapping identifier is configured for storing a service data identifier of service data that is synchronized from a blockchain. The data verification result is configured for indicating whether the service data identifier obtained through synchronization includes the target service data identifier. Further, when the first data verification result indicates that the service data identifier obtained through synchronization does not include the target service data identifier, the verification execution node may use, as a second node mapping identifier, a node mapping identifier (namely, a routing node mapping identifier), among K routing node mapping identifiers recorded in a node routing list maintained by the verification execution node, that is found in a second order (to be specific, an order opposite to the first order) and that has a shortest distance from the target service data identifier in the mapping space, and then may forward the data location request carrying the target service data identifier to a target verification node corresponding to the second node mapping identifier, so that the target verification node performs a new round of data verification. For example, the target verification node may be configure to verify authenticity of target service data when the second node mapping identifier of the target verification node is a node mapping identifier with a shortest distance from the target service data identifier in the first order. In the embodiments of this disclosure, because the verification network is deployed in the service network, when a service object randomly initiates a data location request for specific service data (for example, the target service data) to any verification node (for example, the verification execution node) in the verification network, a verification node (for example, the target verification node) corresponding to a node mapping identifier that is currently known to the verification node and that has a shortest distance from a service data identifier (for example, the target service data identifier) of the service data can be quickly found based on a resource location table and a node routing list that are maintained by the verification node, and the data location request may be forwarded to the target verification node. In this way, the target verification node can further perform search among a few other verification nodes associated with the target verification node in the mapping space by using a nonlinear search method similar to that used by the verification execution node, until a verification node with a shortest distance from the target service data identifier in the addressing direction in the entire verification network is found. Then addressing (namely, the directed data addressing) is completed. Subsequently, the finally found verification node may perform related verification on the service data. Compared with a point-by-point verification method, in the nonlinear search method used in the embodiments of this disclosure, addressing can be implemented through jumping to a few verification nodes, so that an addressing distance is effectively shortened. This can improve addressing efficiency for a verification node, and therefore can improve verification efficiency for service data.

DESCRIPTION OF EMBODIMENTS

Figure 1:
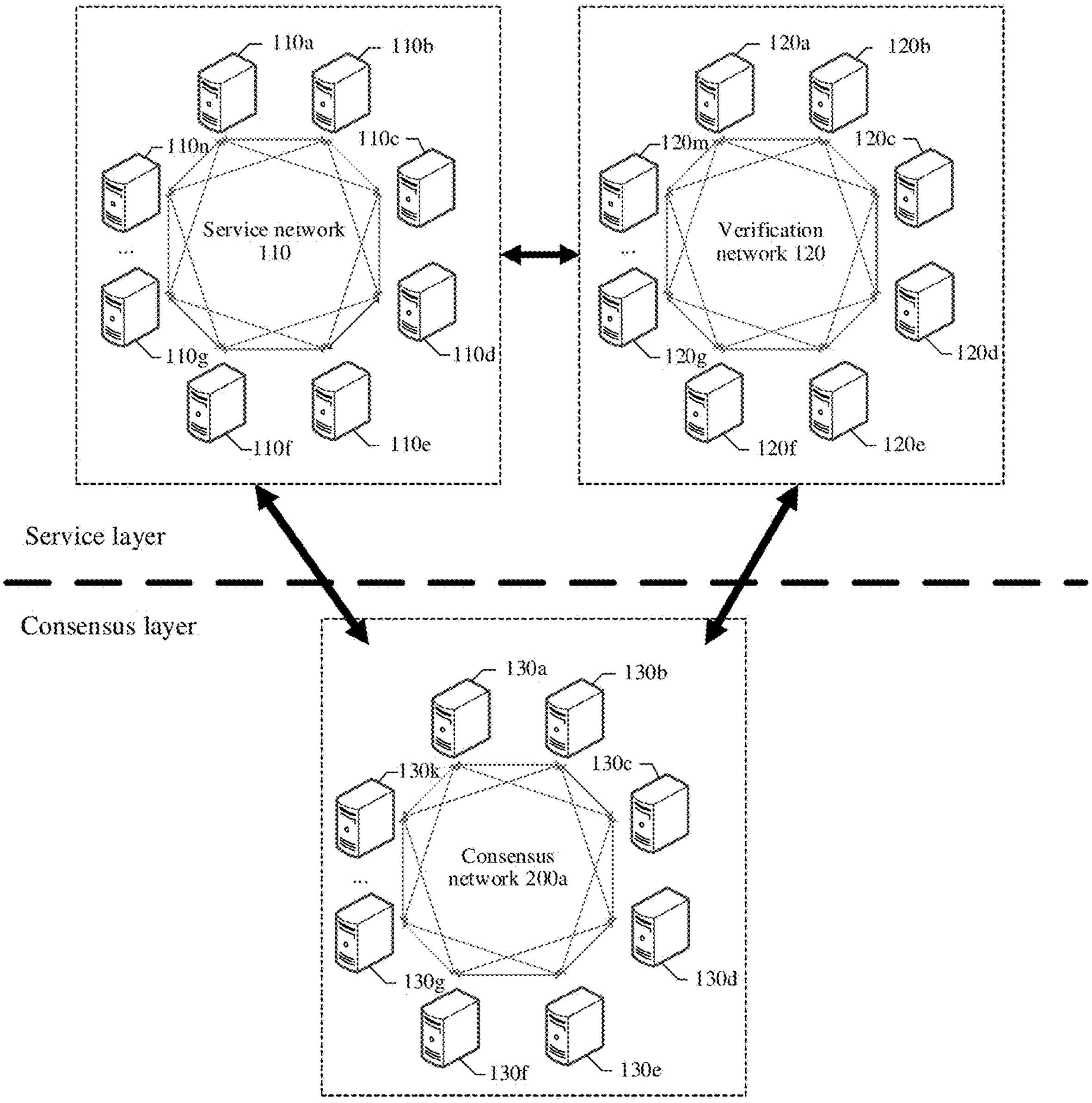
FIG. 1 is a schematic diagram of a hierarchical structure of a blockchain network according to an embodiment of this disclosure.

FIG. 1 is a schematic diagram of a hierarchical structure of a blockchain network according to an embodiment of this disclosure. The hierarchical structure of the blockchain network shown in FIG. 1 may be applied to a blockchain system. A blockchain is a new application mode for computer technologies such as distributed data storage, peer-to-peer transmission, a consensus mechanism, and an encryption algorithm. The blockchain is mainly configured to sort data in chronological order and encrypt the data into a ledger, so that the data cannot be tampered with or forged, and can be verified, stored, and updated. The blockchain is essentially a decentralized database, and each node in the database stores the same blockchain. In this embodiment of this disclosure, a hierarchical structure including a service layer and a consensus layer may be referred to as a double-layer chain structure, and a blockchain network corresponding to the double-layer chain structure is collectively referred to as a hierarchical chain network. A complete blockchain service system corresponding to the hierarchical chain network may include a service network 110, a verification network 120, and a consensus network 200*a* shown in FIG. 1. The service network 110 and the verification network 120 are deployed at the service layer shown in FIG. 1, and the consensus network 200*a* is deployed at the consensus layer shown in FIG. 1.

The service layer herein is essentially a blockchain ledger synchronization layer. To be specific, a service node in the service network 110 deployed at the service layer may be configured to synchronize, through clearing, ledger data related to the service node from a ledger in a blockchain (namely, a blockchain ledger). For example, the ledger data herein may be service data of a service submitted by the service node in the service network 110. In other words, in this embodiment of this disclosure, the blockchain maintained by the consensus network 200*a* may be configured to store the service data of the service submitted by the service node in the service network 110.

For example, after the service node deployed in the service network 110 submits a service to a consensus node in the consensus network 200*a*, the consensus node in the consensus network 200*a* may write the service to a service pool. In this way, a large number of services including the service in the service pool can be subsequently packaged to a block, and block consensus is performed on the block based on a blockchain consensus protocol to which the consensus node in the consensus network 200*a* conforms. Then, after the block consensus succeeds, the block including a large number of services may be written to the blockchain. Further, service data submitted by different service nodes for these services may be stored in the blockchain. Service data of a service may be obtained when the consensus node in the consensus network 200*a* performs, during a block consensus process, consensus voting on a service execution result obtained by performing the service and the consensus voting succeeds. Then each service node in the service network may synchronize, from the blockchain through clearing, service data related to a service submitted by the service node.

In addition, when the verification network 120 is additionally deployed at the service layer, a verification node in the verification network 120 may pre-synchronize, from the blockchain, a service data identifier of service data with a short distance from a node mapping identifier corresponding to a node address of the verification node. In this way, when the verification node subsequently obtains a data location request and determines, based on the data location request, that the node mapping identifier of the verification node is a node mapping identifier with a shortest distance from the service data identifier (for example, a target service data identifier below) of the service data in a specified addressing direction, data verification can be performed on the service data based on the node address of the verification node. The addressing direction herein is a direction indicated by a first order when a mapping space includes a ring mapping space. The first order is an order obtained by sorting, in ascending order, node mapping identifiers of all verification nodes included in the mapping space. For example, in this embodiment of this disclosure, node addresses of all the verification nodes may be pre-hashed by using a specific hash function, and then address hash values (namely, a type of hash value) of the node addresses that are obtained through hashing are mapped to the mapping space (a space in the mathematical sense for marking and storing an address hash value and/or a data hash value), to obtain the node mapping identifiers of the corresponding verification nodes in the mapping space. Further, the node mapping identifiers of the verification nodes may be sorted in ascending order in the mapping space, and an order obtained through sorting in ascending order is collectively referred to as the first order. Specifically, after the node mapping identifiers of the verification nodes are sorted in ascending order in the mapping space, a node mapping identifier with a smallest value (namely, a smallest node mapping identifier) and a node mapping identifier with a largest value (namely, a largest node mapping identifier) after sorting may be further connected head to tail. Then a mapping space in a ring shape that is formed through the head-to-tail connection may be referred to as a ring mapping space. In this case, a direction indicated by the first order in the original mapping space may be used as an addressing direction of the currently formed ring mapping space. In other words, a node mapping identifier of each verification node in this embodiment of this disclosure is obtained by mapping a node address of each verification node in the verification network to the mapping space.

The service layer herein may be a data processing layer that can provide different data processing capabilities in the hierarchical structure. For example, for the verification network 120 deployed at the service layer, a verification node in the verification network 120 may provide a service node in the service network 110 with a data processing capability for data verification when the verification node performs a data verification operation. The data verification operation herein is an operation performed by the verification node in the verification network 120 for data verification on a service data identifier (for example, the target service data identifier). The service data identifier (for example, the target service data identifier) herein is obtained by a consensus node in the consensus network 200*a* by mapping service data of a service (for example, target service data of a target service) to the mapping space after storing the service data of the service (for example, the target service data of the target service) in the blockchain. In other words, the service data identifier (for example, the target service data identifier) herein is obtained by mapping service data (for example, the target service data) of a service to the mapping space. In this way, when the service node in the service network 110 synchronizes, through clearing, the service data of the service (for example, the target service data of the target service) from the blockchain maintained by the consensus node in the consensus network 200*a*, the service node also synchronizes a service data identifier of the service data of the service (for example, a service data identifier of the target service data is the target service data identifier) from the blockchain maintained by the consensus node in the consensus network 200*a*.

For another example, the service network 110 deployed at the service layer may be configured to perform a data submission operation and a clearing and synchronization operation. When performing a data submission operation, a service node in the service network 110 may submit a service to a consensus node in the consensus network 200*a*. This means that the data submission operation herein is an operation performed by the service node in the service network 110 to submit a service to the consensus node in the consensus network 200*a*. Similarly, when performing a clearing and synchronization operation, the service node in the service network 110 may synchronize, through clearing, service data associated with a service submitted by the service node from the blockchain maintained by the consensus node in the consensus network 200*a*. In other words, the clearing and synchronization operation herein is an operation performed by the service node in the service network 110 to synchronize, through clearing, the service data associated with the service submitted by the service node from the blockchain. In addition, the consensus layer herein is a data processing layer in the hierarchical structure at which a blockchain consensus protocol runs. For example, all consensus nodes in the consensus network 200*a* deployed at the consensus layer may perform block consensus based on the running blockchain consensus protocol, and then may add a block passing the block consensus to the blockchain.

A service data identifier of service data in this embodiment of this disclosure is determined based on a hash value (for example, a data hash value) obtained by hashing the service data by using a specific hash function, and a node mapping identifier of a verification node is determined based on a hash value (for example, an address hash value) obtained by hashing a node address of the verification node by using the same hash function. To be specific, in the foregoing mapping space, the data hash value and the address hash value obtained through hashing herein are essentially two hash values with a same length. Therefore, a hash distance between the two hash values may be calculated to determine whether the node mapping identifier corresponding to the node address of the verification node is close to the service data identifier of the service data. In other words, in this embodiment of this disclosure, when a hash value (namely, an address hash value) of a node address of each verification node in the verification network 120 is obtained by pre-hashing the node address of each verification node by using a hash function, the hash value (namely, the address hash value) of the node address of each verification node may be prestored, so that the prestored hash value (namely, the address hash value) of the node address of each verification node can be subsequently mapped to the mapping space. Similarly, after a consensus node in the consensus network 200*a* stores service data of each service to the blockchain, the consensus node may further hash the service data of each service by using the same hash function, and may prestore a hash value (namely, a data hash value) of each piece of service data that is obtained through hashing, so that the hash value (namely, the data hash value) of each pieces of service data that is obtained through hashing can be subsequently mapped to the same mapping space. In this way, in the same mapping space, when a node mapping identifier of a verification node and a service data identifier of service data are hash values (for example, hash sequence values) with a same length, an exclusive OR operation may be performed on the node mapping identifier of the verification node and the service data identifier of the service data, to calculate a distance (the distance herein is essentially a hash distance) between two different identifiers. To be specific, a smaller hash distance indicates a shorter distance between two different identifiers; and on the contrary, a larger hash distance indicates a longer distance between two different identifiers. In this embodiment of this disclosure, a node address of a verification node may be configured for storing a service data identifier of service data that is synchronized from the blockchain and that has a short distance from a node mapping identifier of the verification node, and storing a node address of a service node on which the service data is stored.

In the foregoing hierarchical chain network, the service network 110 (also referred to as a witness network) and the consensus network 200*a* are independent of each other, and network isolation between the service network 110 and the consensus network 200*a* may be implemented by a routing network (namely, a routing proxy layer). For example, a peer-to-peer (P2P) network may be layered by routing nodes in the routing network to form a "service network-consensus network" hierarchical structure, so that confidentiality and security of data in the blockchain can be improved. There may be one or more routing nodes in the routing network. This is not limited herein.

A plurality of service nodes may be deployed in the service network 110 shown in FIG. 1. A quantity of service nodes deployed in the service network 110 is not limited herein. In this embodiment of this disclosure, a service node does not need to participate in an accounting consensus, but is mainly configured to submit a service to a consensus node, so that the consensus node can obtain service data associated with the service after performing the service. In addition, when receiving a clearing and synchronization request transmitted by the service node for the current service, the consensus node can return, in a timely manner, the service data of the current service to the service node, to implement clearing and synchronization of the service data. The clearing and synchronization request herein is a request submitted by the service node when the service node performs a clearing and synchronization operation for the current service. The clearing and synchronization operation herein is specifically an operation performed by the service node to request to synchronize, through clearing, service data related to the service node from the blockchain maintained by the consensus node. In this embodiment of this disclosure, an operation performed by any service node deployed in the service network 110 for a service (namely, an ordinary service) may include a data submission operation and a clearing and synchronization operation. The service node may be specifically a lightweight node that stores some data in a blockchain database. Such nodes may perform service verification through "simplified payment verification (SPV)". The service verification herein means that a verification operation may be performed on a current service. For example, data content of each piece of parameter data in the current service and a data format of the data content may be verified during execution of the verification operation. Therefore, the service node may also be referred to as an SPV node. For example, in some embodiments, to reduce a waste of storage space on a service node, the service node may be a lightweight node. In this case, the service node does not need to store all service data fully recorded in an entire blockchain, but obtains block header data and some block data that is accessible upon authorization (for example, service data associated with the service node, where the service data herein may include a service execution result obtained by performing a corresponding service and/or read/write status data recorded by service processing data invoked during execution of the corresponding service) from the blockchain maintained by the consensus network through identifier authentication during data clearing and synchronization.

A plurality of consensus nodes (namely, accounting nodes) may be deployed in the consensus network 200*a* shown in FIG. 1. A quantity of consensus nodes deployed in the consensus network 200*a* is not limited herein. For example, as shown in FIG. 1, the consensus network 200*a* may specifically include a consensus node 130*a*, a consensus node 130*b*, a consensus node 130*c*, . . . , and a consensus node 130*k*. The blockchain consensus protocol may run on these consensus nodes. The consensus node may be specifically a full node that includes a complete blockchain database. These consensus nodes may participate in service verification, service broadcast, block broadcast, and block consensus, and discover and maintain connections to other nodes, and may further record, to the blockchain, service data of a corresponding service and the like in a block that passes consensus.

In this embodiment of this disclosure, the service nodes and the consensus nodes in the hierarchical chain network may be collectively referred to as blockchain nodes (which may be referred to as nodes for short). The blockchain node may be a server that accesses the hierarchical chain network, or a terminal that accesses the hierarchical chain network. A specific form of the blockchain node is not limited herein. Each blockchain node may include a hardware layer, an intermediate layer, an operating system layer, and an application layer. The server herein may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal may be a smart terminal such as a smartphone, a tablet computer, a notebook computer, a desktop computer, a palmtop computer, a mobile Internet device (MID), a wearable device (for example, a smart watch or a smart wristband), a smart computer, or a smart in-vehicle device.

The service network 110 and the consensus network 200*a* shown in FIG. 1 may be in different network environments. For example, in some embodiments, a service node may be deployed in a public service network, a consensus node on which a blockchain consensus protocol runs may be deployed in a private consensus network, and the service node and the consensus node may interact with each other through a routing boundary. In this case, the consensus network is in a relatively secure private cloud, security of mutual access is already ensured by a consensus mechanism, and identifier management or network control does not need to be additionally added. However, the service node is in a public network and may be accessed by another uncertain network terminal. Therefore, behavior of accessing the consensus network by the service node and other possible nodes needs to be strictly controlled. In some other embodiments, alternatively, a service node and a consensus node may directly transmit data to each other without a routing node. This is not limited in this embodiment of this disclosure.

The foregoing hierarchical chain network is applicable to a variety of service scenarios such as a blockchain electronic bill and a blockchain electronic file. This is not limited herein.

In addition, intelligent processing data may be deployed in a blockchain system. In the blockchain system, the intelligent processing data may be understood as code that can be understood and executed by a blockchain node (for example, a consensus node). The blockchain node (for example, the consensus node) may invoke the intelligent processing data to perform any logic and obtain a result. In this embodiment of this disclosure, intelligent processing data deployed on a consensus node may be collectively referred to as service processing data. The service processing data herein may be code that is deployed on a consensus node and that is configured for performing a corresponding service. For example, an entity object (for example, a user that requests to perform a service) may initiate a processing data invocation request to a consensus node (for example, the consensus node 130*a* shown in FIG. 1) through a client on an object terminal held by the entity object. In this way, after obtaining the processing data invocation request, the consensus node (for example, the consensus node 130*a* shown in FIG. 1) may read and invoke service processing data already deployed on the consensus node (for example, the consensus node 130*a* shown in FIG. 1). The blockchain system may include one or more pieces of intelligent processing data. The intelligent processing data (for example, service processing data) may be distinguished by a processing data identifier (for example, an identifier file (ID), a name, a processing data address, or a processing data function name (which may also be referred to as a processing data method name)). A processing data invocation request initiated by a client may also carry an identifier file or a name of intelligent processing data, to specify intelligent processing data that a blockchain needs to run. For example, if the intelligent processing data specified by the client in the processing data invocation request is processing data that needs to read data, after obtaining the processing data invocation request, a related consensus node may invoke the specified intelligent processing data to access a local storage to read data. The data read by the consensus node by invoking the specified intelligent processing data is included in the foregoing read/write status data.

In some embodiments, for a service that needs to be added to the blockchain and that is submitted by a client to a consensus node through a service node, after invoking intelligent processing data (namely, service execution data) to perform the service, consensus nodes may further verify (to be specific, perform consensus voting) whether execution results for the service are consistent. If the execution results for the service are consistent, the execution results for the service may be stored to respective local ledgers as service data obtained by performing the service, and the service data obtained by executing the service is returned to the client through the service node. The client herein may be a client deployed on the service node or a client independently deployed on another computer device. A specific deployment mode of the client is not limited herein.

For ease of understanding and differentiation, in this embodiment of this disclosure, based on different functions of the service network 110 and the verification network 120 deployed at the service layer, service nodes in the service network 110 may be collectively referred to as second-type service nodes, and service nodes selected from the service network 110 to constitute the verification network 120 are collectively referred to as first-type service nodes. When the verification network 120 is constructed by using the first-type service nodes, nodes (namely, the first-type service nodes) in the verification network 120 may be collectively referred to as verification nodes. The verification nodes may perform the foregoing data verification operation on a non-ordinary service (for example, a data verification service that is determined based on a data location request transmitted by a service node and that is configured for data verification). In addition, the second-type service node herein may be understood as a service node that is deployed in the service network 110 and that can perform a corresponding operation (for example, the foregoing data submission operation or clearing and synchronization operation) on an ordinary service (for example, the foregoing service). For example, for a service node (namely, any second-type service node) in the service network 110, the service node is mainly configured to submit the foregoing service to a consensus node when performing a data submission operation at the service layer. In addition, the service node (the second-type service node) in the service network 110 may be further mainly configured to: when performing a clearing and synchronization operation for a service submitted by the service node, transmit, to the consensus node, a request (namely, the foregoing clearing and synchronization request) for synchronizing, through clearing, service data related to the service node. The clearing and synchronization request is configured for indicating the consensus node to synchronize, to the service node (the second-type service node) in the service network 110 through clearing, the service data related to the service node. For the first-type service nodes selected from the service network 110, when the verification network 120 is constructed by using the first-type service nodes, the first-type service nodes in the verification network 120 may be collectively referred to as verification nodes. In this way, before a verification node deployed in the verification network 120 performs a data verification operation at the service layer, the verification node may pre-synchronize, from the blockchain maintained by a consensus node, a service data identifier of service data (for example, a data hash value of the service data) that is close to an address space of the verification node, and further store the service data identifier of the service data that is synchronized from the blockchain and that is close to the address space of the verification node. In this way, when subsequently performing a data verification operation at the service layer, the verification node may provide (for example, to a service node in the service network) a data verification service for the service data. In other words, in this embodiment of this disclosure, any one of M verification nodes deployed in the verification network is the foregoing verification execution node configured to perform a data verification operation, where M is a positive integer.

The first-type service nodes for constructing the verification network 120 are service nodes that are selected from a plurality of service nodes in the service network and that meet a verification network joining condition. Any one of the plurality of service nodes deployed in the service network is a second-type service node configured to perform a clearing and synchronization operation. To be specific, the second-type service node herein is essentially a service node in the service network that can perform a corresponding operation (for example, the clearing and synchronization operation) for the foregoing ordinary service. Alternatively, in a broad sense, at the service layer, the service nodes that are selected from the plurality of nodes in the service network and that meet the joining condition may be configured to not only perform a data verification operation for a data verification service in the verification network, but also perform a corresponding operation (for example, may perform a clearing and synchronization operation periodically or according to a requirement, where a specific occasion for performing the clearing and synchronization operation is not limited herein) for an ordinary service in the service network. The service data in this embodiment of this disclosure may specifically include: a service execution result obtained by performing a service, and read/write status data associated with the service. The read/write status data herein may include but is not limited to: read status data that is read and invoked when intelligent processing data is invoked to perform a service, and write status data obtained after the intelligent processing data is invoked to perform the service. When a consensus node invokes the intelligent processing data to perform a next service of the service, the consensus node may use the write status data of the service as read status data of the next service, to obtain write status data of the next service. The service and the next service may be services in the same block generated through packaging by the consensus node, or may be services in different blocks. This is not limited herein.

Based on this, to implement a secure and efficient data verification operation in the "service network-consensus network" hierarchical structure, in this embodiment of this disclosure, the verification network 120 may be constructed in the hierarchical structure, and a verification node in the verification network 120 provides a data verification service for any service node in the service network 110 at the same service layer. In other words, in this embodiment of this disclosure, the verification network 120 may be deployed at the service layer at which the service network 110 is located, and the verification node in the verification network 120 may perform the data verification operation for a data verification service provided by the verification node.

For a specific structure of the service network in this embodiment of this disclosure, refer to the service network 110 shown in FIG. 1. An ordinary service provided by a service node in the service network 110 is independent of a data verification service provided by a verification node in the verification network 120. Therefore, at the same service layer, the verification node in the verification network 120 may be configured to maintain a secure and efficient data verification process. This can improve addressing efficiency for the verification node and can ensure privacy of service data stored in the service network 110.

A plurality of service nodes may be deployed in the service network 110 shown in FIG. 1. A quantity of service nodes deployed in the service network 110 is not limited herein. For example, as shown in FIG. 1, the service network 110 may specifically include a service node 110*a*, a service node 110*b*, a service node 110*c*, . . . , and a service node 110*n*. These service nodes are all included in second-type service nodes in the service network 110. The service nodes in the service network 110 may be specifically SPV nodes, and therefore may also be referred to as service SPV nodes.

A plurality of verification nodes may be deployed in the verification network 120 shown in FIG. 1. A quantity of verification nodes deployed in the verification network 120 is not limited herein. For example, as shown in FIG. 1, the verification network 120 may specifically include a verification node 120*a*, a verification node 120*b*, a verification node 120*c*, . . . , and a verification node 120*m*. These verification nodes are all included in first-type service nodes in the service network 110. The verification nodes in the verification network 120 may be specifically SPV nodes, and therefore may also be referred to as verification SPV nodes. The verification network in this embodiment of this disclosure may be a network that runs based on a specific addressing algorithm (for example, the Chord algorithm). Addressing among a plurality of verification nodes may be implemented by using the addressing algorithm, and related verification is performed after the addressing succeeds.

A verification node in the verification network 120 is a first-type service node for performing a data verification operation, and the first-type service node herein is essentially a service node that is selected from the plurality of service nodes deployed in the service network 110 and that meets the verification network joining condition. However, for ease of description, subsequently, a first-type service node in the verification network 120 is referred to as a verification node, and an SPV node (namely, a first-type service node) selected as a verification node and an SPV node (namely, an ordinary service node) not selected as a verification node in the service network 110 are collectively referred to as service SPV nodes or service nodes. A service node in the service network 110 and a verification node in the verification network 120 may access each other. For example, a service node in the service network 110 may transmit a request for verifying service data (for example, the foregoing data location request) to any verification node. For another example, if specific original data information of service data needs to be verified, a corresponding verification node may further quickly access, based on a node address of a service node that is obtained through addressing, a service node in the service network 110 that stores the original data information.

In this embodiment of this disclosure, a plurality of service nodes for constructing the service network 110 at the service layer are all second-type service nodes, and a quantity of service nodes (namely, first-type service nodes) that are selected from the plurality of service nodes in the service network 110 and that can meet the verification network joining condition is not fixed, but is always dynamically changing. Therefore, when the verification network 120 is constructed at the same service layer by using the service nodes (namely, the first-type service nodes) that meet the verification network joining condition, a quantity (for example, a value of M) of verification nodes in the verification network 120 is also dynamically changing. For example, a verification node in the verification network 120 needs to be stably online for a long time and can be run by an official or authoritative alliance member. Therefore, when it is detected that any service node in the service network 110 meets a specified verification network joining condition, the service node may join the verification network 120 as a first-type service node. Otherwise, the service node is configured to provide an ordinary SPV service (namely, the foregoing ordinary service) as an ordinary service node. Similarly, if a service node goes offline for a specific reason after joining the verification network 120 for a period of time and then goes online again and accesses the service network 110 as a new service node, when it is detected that the service node going offline again does not meet the verification network joining condition, the service node going offline again cannot join the verification network 120 again. On the contrary, if it is subsequently detected that the service node in the service network 110 meets the verification network joining condition again, the service node may obtain an opportunity to join the verification network 120 again. The verification network joining condition may specifically include the following condition: Before a service node joins the verification network 120, it is found through statistics collection that current online duration of the service node in the service network 120 meets a specific threshold of continuous online duration (to be specific, continuous online duration of the service node is greater than an online duration threshold, for example, five days), a ping return delay is less than a delay threshold (for example, 10 ms), or the like. This is not limited in this embodiment of this disclosure.

This embodiment of this disclosure provides a service data verification method based on an addressing algorithm. A core lies is that, in the "service network-consensus network" hierarchical structure, the verification network 120, in addition to the service network 110, is introduced into the service layer, so that data verification can be performed among a plurality of verification SPV nodes in the introduced verification network 120. The data verification herein specifically includes directed data addressing and verification.

The directed data addressing means that a verification node in the verification network 120 may pre-query for a node mapping identifier with a shortest distance from a service data identifier of service data in a specified order in a mapping space based on a resource location table, and then may use, as a verification node found through addressing, a verification node corresponding to a found node mapping identifier with a shortest distance from the service data identifier of the service data. In this case, a node address of the verification node found through addressing may be configured for locating a node address of a service node that currently stores the service data. The verification may include at least one or more of the following: for example, Merkle root verification based on a Merkle path associated with the service data, signature verification based on a node signature set associated with a target block to which target service data belongs, and original text verification based on original data information (referred to as original text) of the target service data. The original text verification means that a verification node currently found through addressing may further quickly and securely obtain, based on a node address of a service node that is located from a node address of the verification node, original data information (referred to as original text) of the service data that is currently stored at the address of the service node, and generate, based on the obtained original data information (referred to as original text), verification proof information for representing authenticity and reliability of the service data. The verification proof information herein may be configured for indicating data integrity and authenticity of service data that is pre-synchronized, through clearing, by a currently located service node from the blockchain.

The addressing algorithm may be the Chord algorithm, which can provide high efficiency and overall security for data verification. For ease of subsequent understanding and description, in this embodiment of this disclosure, any entity object (for example, an individual user, an enterprise user, or an organization) with a service data verification requirement may be referred to as a service object. In addition, in this embodiment of this disclosure, any service node in the service network 110 that interacts with the service object may be referred to as a first service node (for example, the service node 110*a*). To be specific, the first service node herein may be any service node in the current service network 110. When the service object wants to verify authenticity of on-chain service data (namely, target service data), the first service node may entrust any verification node (namely, a verification execution node, for example, the verification node 120*a*) in the verification network 120 to provide an authenticity verification proof to the service object. The first service node herein is included in the service network 110. The verification execution node herein is any verification node randomly selected from the verification network 120 to perform a data verification operation. The target service data in this embodiment of this disclosure may include target service data obtained by performing a target service. The target service data herein may include one or more of a target service execution result and/or target read/write status data. This is not limited herein. The target service herein may be a service initiated by an entity object (which may be referred to as a service initiating object, and may be the same as or different from the foregoing service object) through a second service node (for example, the foregoing ordinary service node). The second service node (for example, the service node 110*b*) is included in the service network.

The second service node and the first service node may be the same service node or different service nodes. This is not limited herein. Similarly, it is assumed that a quantity of verification nodes in the verification network is M (M is a positive integer). The M verification nodes are determined based on service nodes (namely, first-type service nodes) that are selected from the service network and that meet the verification network joining condition.

In this embodiment of this disclosure, a verification node among the M verification nodes that is entrusted by a service object to verify target service data may be referred to as a verification execution node, and the verification execution node may be any verification node (for example, the verification node 120*a*) among the M verification nodes. For example, the verification execution node may be the first verification node randomly selected from the M verification nodes to receive a data location request and perform data verification.

For another example, the verification execution node may alternatively be a verification node that is selected from the M verification nodes according to a preset rule and that has longest online duration. In this case, the verification node with the longest online duration may be configured to receive a data location request and perform data verification as the verification execution node. In some embodiments, when a plurality of verification nodes with longest online duration are selected from the M verification nodes, one verification node may alternatively be randomly selected from the verification nodes with the longest online duration as the verification execution node herein. In other words, a specific implementation of selecting the verification execution node from the M verification nodes is not limited in this embodiment of this disclosure.

For the verification execution node, if no data related to or matching a target service data identifier of target service data carried in a data location request is found at a node address (namely, a first node address) of the verification execution node, jumping may be further performed to a next verification node of the verification execution node based on a resource location table maintained by the verification execution node, to continue to perform a query. The next verification node of the verification execution node is an adjacent verification node, and an adjacent node mapping identifier recorded in the resource location table maintained by the verification execution node is a node mapping identifier of the adjacent verification node. In a mapping space, a node mapping identifier corresponding to the first node address is a first node mapping identifier. For ease of understanding, in this embodiment of this disclosure, an adjacent node mapping identifier selected by traversing, in the first order, adjacent node mapping identifiers that are greater than the first node mapping identifier and that are recorded in the resource location table may be used as a target adjacent verification node mapping identifier, and a synchronous data identifier of on-chain synchronous data information that is synchronized from the blockchain and that is stored at a target adjacent verification node address corresponding to the target adjacent verification node mapping identifier is referred to as a target synchronous data identifier of target on-chain synchronous data information. The target synchronous data identifier herein is included in service data identifiers of service data that are synchronized from the blockchain. In this way, when performing data verification based on the resource location table, the verification execution node can determine whether the target service data identifier is within a spatial range determined based on the first node mapping identifier and the target adjacent verification node mapping identifier. If a determining result is yes, the verification execution node may determine that the target adjacent verification node mapping identifier is a node mapping identifier with a shortest distance from the target service data identifier in the first order, and then may forward the data location request obtained by the verification execution node to a verification node (namely, a target adjacent verification node) corresponding to the target adjacent verification node mapping identifier, so that the target adjacent verification node performs data verification on the target service data. A node address of the target adjacent verification node herein is the target adjacent verification node address.

A service submitted by a service node in the service network to a consensus node may include but is not limited to a bill service (for example, an electronic bill-related service such as an electronic bill issuance service, an electronic bill transfer service, an electronic bill write-off service, or an electronic bill archiving service), a derivative bill service (for example, a credit service, a loss service, an enterprise qualification service, a credit reporting service, a social service, a credit purchase service, a tax refund service, or a lottery service) associated with a bill service, a file service (for example, an electronic file-related service such as an electronic file issuance service, an electronic file transfer service, an electronic file amendment service, or an electronic file archiving service), or a derivative file service (for example, an institutional cooperation service, an enterprise qualification service, a prescription statistics service, a qualification examination service, or a government management service) associated with a file service. The foregoing target service may be any service (for example, the electronic bill issuance service) requested by a service initiating object. Correspondingly, service data generated by the consensus node by executing the service (for example, the foregoing target service data) may include but is not limited to an electronic bill associated with an electronic bill issuance task in the bill service, some bill information (for example, a bill number or a title) that is accessible upon authorization in the electronic bill, general bill-associated assets (for example, credit reporting information or tax information) associated with the electronic bill, an electronic file associated with the file service, some file information (for example, certificate information in an electronic certificate) that is accessible upon authorization in the electronic file, or general file-associated assets (for example, qualification information or a prescription statistics result) associated with the electronic file. In addition, read/write status data (for example, the foregoing target read/write status data) associated with the service data may include a data status of the service initiating object that is obtained after service processing data in the blockchain is invoked to perform the service (for example, a service read/write set obtained after the service is performed).

Correspondingly, the service processing data for performing the service may include but is not limited to electronic bill issuance processing data, electronic bill transfer processing data, electronic bill write-off processing data, electronic bill archiving processing data, derivative bill service processing data, tax application processing data, electronic file issuance processing data, electronic file transfer processing data, electronic file amendment processing data, electronic file archiving processing data, derivative file service processing data, and the like. This is not limited herein.

In this embodiment of this disclosure, a blockchain node may be configured, by using a consensus node (for example, the consensus network 200$a$) in the consensus network, for any role (for example, any individual user, any enterprise, any institution, and other entity objects) that accesses the hierarchical chain network. Therefore, the service node 110$a$, the service node 110$b$, the service node 110$c$, the service node 110$d$, . . . , and the service node 110$n$ in the service network 110 shown in FIG. 1 each may have a one-to-one correspondence with a corresponding role (for example, the foregoing service initiating object or service object) that needs to access the hierarchical chain network. For example, a service initiating object that requests to perform a service is an enterprise user. In this case, a blockchain node associated with each enterprise user may be the same blockchain node (for example, the service node 110$c$ shown in FIG. 1 may exchange data with service terminals corresponding to a plurality of enterprise users). For example, in a blockchain electronic bill scenario, a bill service (for example, an electronic bill-related service such as an electronic bill issuance service, an electronic bill transfer service, an electronic bill write-off service, or an electronic bill archiving service) requested by each enterprise user may be collectively referred to as a service (the foregoing service). When the enterprise user is a billing enterprise A that requests to perform billing through the consensus network 200$a$, the billing enterprise A may exchange data with a consensus node (for example, the consensus node 130$a$) in the consensus network 200$a$ through the service node 110$c$ shown in FIG. 1, to request to complete a corresponding service. Similarly, a billing enterprise B may also exchange data with a consensus node (for example, the consensus node 130$a$) in the consensus network 200$a$ through the service node 110$c$ shown in FIG. 1, to request to complete a corresponding service. By analogy, a billing enterprise C may also exchange data with a consensus node (for example, the consensus node 130$a$) in the consensus network 200$a$ through the service node 110$c$ shown in FIG. 1, to request to complete a corresponding service.

For ease of understanding, in this embodiment of this disclosure, for example, the service is a bill service (for example, the electronic bill issuance service). When a service node associated with a service initiating object (for example, the billing enterprise A) receives a service request associated with the service, the service node may forward the service request initiated by the service initiating object to a consensus node in the consensus network, so that the consensus node performs service validity verification on the service request initiated by the service initiating object. In this way, the consensus node can add a service (for example, the bill service) requested by the service initiating object to a service pool when the service validity verification succeeds, so that service data associated with the service (for example, the bill service) can be subsequently packaged into a block, to perform block consensus among consensus nodes in the consensus network. After the block consensus succeeds, block data (the block data herein includes at least the service data of the service) of the block may be written to a local cache and a local storage, so that block data of a plurality of blocks can be subsequently stored in parallel based on the foregoing distributed storage. In other words, block data of a plurality of blocks can be stored to the blockchain in parallel. Therefore, the service node associated with the service initiating object (for example, the billing enterprise A) can synchronize, through clearing, the service data of the service from the blockchain when subsequently performing a clearing and synchronization operation.

The Chord algorithm is a consistent hash algorithm, and is mainly configured for responding to address management and addressing operations for a large number of nodes in a network. Each node may map its own address to a global address space (the global address space herein may be the foregoing mapping space), and may record nodes with different distances from the node in the global address space based on some corresponding routing table designs. In this way, node discovery and addressing capabilities are available through the entire network. Address management is node mapping processing for each node (a verification node in this case). In this embodiment of this disclosure, the Chord algorithm is a P2P protocol for resolving data location problems in a service network. A data resource that a service object searches for may be found through jumping between a plurality of nodes.

Based on this, in this embodiment of this disclosure, a verification execution node (for example, the verification node 120$a$) in the verification network may obtain a data location request transmitted by a service object for target service data through a first service node (for example, the service node 110$a$). Further, the verification execution node may determine a first node mapping identifier of the verification execution node from a mapping space corresponding to the verification network in response to a target service data identifier of target service data being identified from the data location request, and then may perform, in an order in which node mapping identifiers in the mapping space are sorted (for example, a first order obtained through sorting in ascending order), data verification on the target service data identifier based on a resource location table associated with a first node address of the verification execution node, to obtain a first data verification result.

The mapping space is a global address space for performing node mapping processing and addressing operations on M verification nodes in the verification network (namely, all verification nodes in the verification network). In the global address space, a node mapping identifier is obtained by performing address mapping on a node address of a verification node. Therefore, when the mapping space is a ring mapping space (to be specific, a mapping space in a ring shape), an addressing direction herein may be determined based on a direction indicated by the first order in the mapping space. To be specific, the addressing direction may be specifically a clockwise direction determined when the verification execution node performs an addressing operation in the ring mapping space. The clockwise direction is a direction obtained or displayed after node mapping identifiers in the ring mapping space are sorted in ascending order by the verification execution node during node mapping processing. The addressing operation herein means that the verification execution node may search, in a current direction by using a nonlinear search method, for a node address corresponding to a node mapping identifier with a shortest distance from the target service data identifier in the ring mapping space corresponding to the current verification network, and then may determine whether a node mapping identifier with a shortest distance from the target service data identifier can be found in the current direction. If such a node mapping identifier is found, the node address found in the addressing direction may be considered as a node address of a verification node that is found through addressing in the verification network. The node address found in the addressing direction is a node address of a successor node of the verification execution node. In this case, the node address of the successor node of the verification execution node is an adjacent node address, and a verification node corresponding to the adjacent node address may be collectively referred to as an adjacent verification node. Base on this, in this embodiment of this disclosure, an adjacent verification node that is found in the addressing direction based on the resource location table and that is configured to receive a data location request may be referred to as a target adjacent verification node. An adjacent node address of each adjacent verification node herein may be configured for storing a synchronous data identifier of on-chain synchronous data information that is synchronized from a blockchain corresponding to the consensus network and that is close to an address space of the adjacent verification node. In this case, the synchronous data identifier stored at the adjacent node address may include the target service data identifier of the target service data.

In other words, adjacent node addresses corresponding to adjacent node mapping identifiers in the resource location table are configured for storing service data identifiers of service data that are synchronized from the blockchain corresponding to the consensus network. These service data identifiers obtained through synchronization include a target synchronous data identifier. The target synchronous data identifier herein is a target synchronous data identifier of target on-chain synchronous data information that is synchronized from the blockchain and that is stored at a target adjacent verification node address corresponding to a target adjacent verification node mapping identifier. The adjacent node address is a node address located after the first node address in the addressing direction.

In some embodiments, when the first data verification result indicates that a synchronous data identifier of on-chain synchronous data information does not include the target service data identifier, the verification execution node may further use, as a second node mapping identifier, a node mapping identifier that is found in a second order (to be specific, an order opposite to the first order) in a node routing list maintained by the verification execution node and that has a shortest distance from the target service data identifier, and then may forward the data location request carrying the target service data identifier to a target verification node (for example, the verification node 120*d*) corresponding to the second node mapping identifier. The target verification node herein is a verification node that is found by the verification execution node in the second order in the node routing list and that is configured to receive a data location request. Therefore, after obtaining the data location request, the target verification node may further perform data verification (for example, the foregoing verification) on the target service data based on a second node address corresponding to the second node mapping identifier (to be specific, a routing node mapping identifier that is stored in the node routing list and that is determined based on a node mapping identifier of the target verification node) when the target verification node determines that the second node mapping identifier is a node mapping identifier with a shortest distance from the target service data identifier in the addressing direction, to verify authenticity of the target service data. A node address (namely, the second node address) of the target verification node may be configured for storing a target service data identifier of target service data that is close to an address space of the target verification node, and may be further configured for storing a node address (for example, an Internet Protocol (IP) address) of a service node associated with the target service data identifier. The node address (for example, the IP address) of the service node is configured for indicating the target verification node to quickly locate a service node that currently stores the target service data in the service network. In this way, when the target verification node needs to verify original text of the target service data stored on the service node, the target verification node may access the original text of the target service data based on the node address (for example, the IP address) of the service node that is stored at the second node address, to verify the original text of the target service data.

In this embodiment of this disclosure, the verification network is deployed at the service layer at which the service network is located, a service object can randomly initiate a data location request for specific service data (for example, the target service data) to any verification node (for example, the verification execution node) in the verification network. In this case, the verification node (for example, the verification execution node) may quickly find, based on a resource location table and a node routing list that are maintained by the verification node, a verification node (for example, the target adjacent verification node or the target verification node) corresponding to a node mapping identifier that is currently known to the verification node (for example, the verification execution node) and that has a shortest distance from a service data identifier (for example, the target service data identifier) of the service data, and may forward the data location request to the verification node (for example, the target adjacent verification node or the target verification node) found through addressing. In this way, the verification node (for example, the target adjacent verification node or the target verification node) found through addressing can continue to perform search by using a nonlinear search method similar to that used by the verification execution node, until a verification node with a shortest distance from the target service data identifier is found in the first order in the entire verification network. Then addressing for a verification node in the verification network is completed. Subsequently, the verification node finally found through addressing may perform related verification on the service data. Compared with a manner of directly performing point-by-point verification in the service network, in the nonlinear search method used in this embodiment of this disclosure, addressing can be implemented through jumping to a few verification nodes in the verification network, so that an addressing distance is effectively shortened. This can improve addressing efficiency for a verification node, and therefore can improve verification efficiency for service data by using a verification node that is quickly found through addressing.

Figure 2:
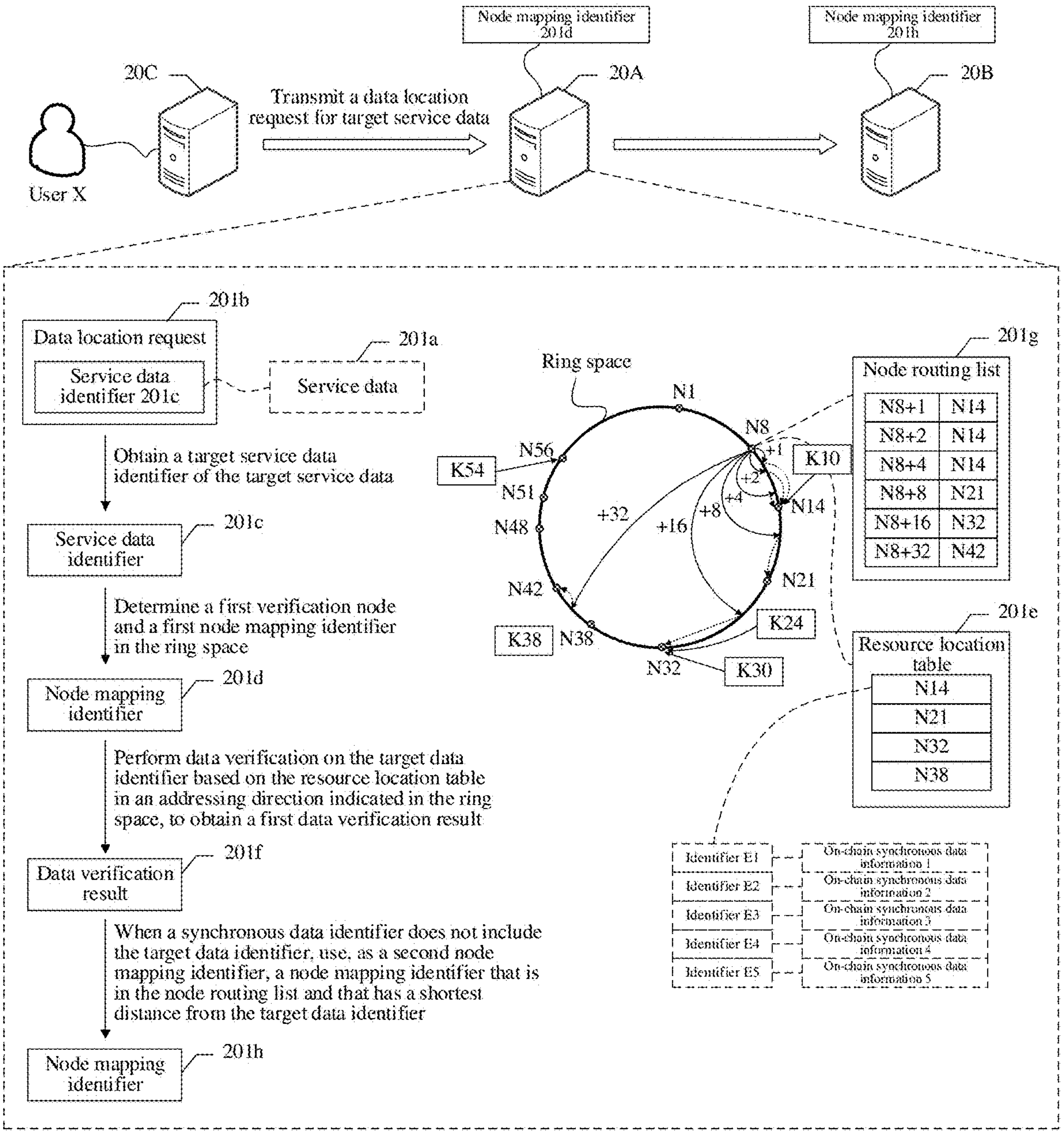
FIG. 2 is a schematic diagram of a data processing scenario based on a hierarchical chain network according to an embodiment of this disclosure.

For ease of understanding, further, FIG. 2 is a schematic diagram of a data processing scenario based on a hierarchical chain network according to an embodiment of this disclosure. A verification node 20A shown in FIG. 2 may serve as the foregoing verification execution node. The verification node 20A may be any verification node (for example, the verification node 120*a*) in a verification network (for example, the verification network 120 shown in FIG. 1). A verification node 20B shown in FIG. 2 may serve as the foregoing target verification node. To be specific, when a mapping space includes a ring mapping space, the verification node 20B may be any verification node (for example, the verification node 120*c*) deployed after the verification execution node in a ring mapping space corresponding to the verification network 120 shown in FIG. 1. For ease of understanding, in this embodiment of this disclosure, a verification node deployed after the verification execution node in an addressing direction indicated in the ring mapping space may be collectively referred to as a successor node of the verification execution node, and a verification node deployed before the target verification node is referred to as a predecessor node of the target verification node. In other words, the target verification node herein may be a successor node of the verification execution node, and the verification execution node may be a predecessor node of the target verification node. The ring mapping space corresponding to the verification network (for example, the verification network 120 shown in FIG. 1) is included in a mapping space. The mapping space herein is a global address space in which node mapping processing (namely, node management) and addressing operations are performed on M verification nodes that constitute the verification network (for example, the verification network 120 shown in FIG. 1). In addition, node identifiers (for example, node mapping identifiers) in the global address space are obtained by mapping node addresses of the M verification nodes to the mapping space. Therefore, after the node mapping identifiers obtained through mapping are sorted in ascending order in the mapping space, an order obtained through sorting in ascending order may be used as a first order. Then a smallest node mapping identifier and a largest node mapping identifier may be connected head to tail in the first order to obtain the ring mapping space. This can ensure that a node mapping identifier of the verification execution node is smaller than a node mapping identifier of the target verification node in the addressing direction (for example, the foregoing clockwise direction) indicated by the ring mapping space. In other words, when a second verification node is a successor node of the verification execution node, a node address of the target verification node may be collectively referred to as an adjacent node address, and a node mapping identifier corresponding to the adjacent node address is greater than a node mapping identifier corresponding to a node address (namely, a first node address) of the verification execution node. In addition, a user X shown in FIG. 2 may serve as the foregoing service object, and a service node 20C associated with the user X may serve as the foregoing first service node. The service node 20C may be any service node (for example, the service node 110*a*) in a service network (for example, the service network 110 shown in FIG. 1). The service node 20C may be a service node determined when a service terminal used by the user X accesses the service network as a service node (for example, the service network 110 shown in FIG. 1), or the service node 20C may be a service node corresponding to the service terminal used by the user X. This is not limited herein.

The service node 20C is included in the service network (for example, the service network 110 shown in FIG. 1), and the verification node 20A and the verification node 20B are included in the verification network (for example, the verification network 120 shown in FIG. 1). The verification node 20A and the verification node 20B herein are essentially service nodes that are selected from the service network (for example, the service network 110 shown in FIG. 1) and that meet the foregoing verification network joining condition.

If a service scenario is the foregoing blockchain electronic scenario, when the user X obtains service data (namely, target service data, for example, an electronic bill, where the electronic bill herein may be service data 201*a* shown in FIG. 2) and expects to verify authenticity of the service data 201*a* in a chain, the user A first needs to perform addressing in the verification network, to finally find, through addressing, a verification node that can verify authenticity of the service data 201*a*. If verification needs to involve original text, the verification node finally found through addressing may further access a specific service node (the original text of the service data 201*a* is synchronized to the service node) on which the service data 201*a* is located. The service data 201*a* may include a related service execution result or related read/write status data. In some embodiments, the service data 201*a* herein may alternatively include both service data and read/write status data. This is not limited herein. In this embodiment of this disclosure, for ease of differentiation, specific service data in the service data may be referred to as target service data. Similarly, read/write status data in the target service data may be referred to as target read/write status data.

For example, it is assumed that the service data 201*a* is service data associated with a specific service (for example, an asset transfer service). In this case, in an asset transfer scenario, service data in the service data 201*a* may include service data A1 generated when a user 1 transfers virtual assets (for example an electronic bill) to the user 2, and read/write status data A2 related to the service data A1 may include but is not limited to remaining assets of the user 1 and remaining assets of the user 2 that are recorded by intelligent processing data after the user 1 invokes the intelligent processing data to transfer a specific amount of virtual assets to the user 2.

To implement efficient addressing, an addressing algorithm used in the verification network may be specifically the Chord algorithm or another available addressing algorithm. In this embodiment of this disclosure, an example in which the addressing algorithm is the Chord algorithm is used for description. The Chord algorithm is usually configured for building a distributed hash table (DHT) for a structured peer-to-peer network. A main idea of the DHT is to make access to a network resource as simple and fast as reading and writing for a hash table. First, each file index is denoted as a (K, V) pair. K is referred to as a keyword, and may be a hash value of a file name (or other description information of a file). V is an IP address of a node on which the file is actually stored (or other description information of the node). All file index entries (namely, all (K, V) pairs) constitute a large file index hash table. Provided that a K value of a target file is inputted, all node addresses at which the file is stored can be found from the table. Then the large file index hash table is divided into many local small blocks, and local hash tables of the local small blocks are distributed to all verification nodes in the verification network according to a specific rule, so that each verification node is responsible for maintaining one of the local small blocks. In this way, when a verification node (for example, the foregoing verification execution node) needs to query the file, a query message only needs to be routed to a corresponding verification node (for example, the foregoing target verification node) (a local hash table maintained by the verification node includes a (K, V) pair to be found).

Based on this, in an implementation, if the verification network is constructed in this embodiment of this disclosure, to improve addressing efficiency for a verification node in the verification network that is to verify authenticity of a corresponding stored file, when the addressing algorithm includes the Chord algorithm, a node address (namely, Node, which may include an IP address and a port number (Port) of a node) of each verification node in the verification network and service data (namely, Key) stored on each service node in the service network may be further mapped to the same mapping space by using the Chord algorithm, to ensure consistent hashing.

To ensure non-repeatability of hashing, in this embodiment of this disclosure, a specified hash mapping function (for example, Secure Hash Algorithm 1 (SHA-1)) may be pre-selected based on the obtained Chord algorithm, and a hash space (namely, the foregoing global address space) with a space size of $2^m$ is pre-generated/built for M verification nodes in the currently constructed verification network by using the hash mapping function. A value range of the entire hash space is 0 to $2^m-1$, and each hash value is an integer with a hash length of m bits. Then, in this embodiment of this disclosure, a node address of each of the M verification nodes may be mapped to the hash space by using the agreed-upon hash mapping function. Then a hash space (namely, the foregoing global address space) including node mapping identifiers of the M verification nodes may be used as a mapping space. Then the node mapping identifiers obtained through mapping may be sorted in ascending order in the mapping space, and an order obtained through sorting in ascending order is used as a first order of the mapping space. In other words, the mapping space herein includes the node mapping identifiers respectively corresponding to the M verification nodes, and the node mapping identifiers are obtained by respectively mapping node addresses of the M verification nodes to the mapping space.

For example, in an implementation, in this embodiment of this disclosure, after the node mapping identifiers obtained through mapping are sorted in ascending order, a smallest node mapping identifier and a largest node mapping identifier obtained after the sorting may be connected head to tail, to determine the constructed mapping space in a ring shape as a ring mapping space. The ring shape herein may specifically include but is not limited to a closed shape such as a triangle, a quadrangle, a pentagon, a hexagon, a circle, or an ellipse. A specific closed shape is not limited herein.

In this embodiment of this disclosure, based on different specific service scenarios, it can be ensured that different services in the same service scenario (for example, an electronic bill issuance service and an electronic bill transfer service in a blockchain electronic bill scenario) can share a ring mapping space in the same shape. Alternatively, in this embodiment of this disclosure, ring mapping spaces in different shapes may be adaptively constructed based on different service scenarios and specific services, to improve efficiency of directed data addressing. For example, a ring mapping space in a circular shape may be used in the blockchain electronic bill scenario, and a ring mapping space in another shape may be used in another service scenario.

For another example, in an implementation, when the ring shape is specifically a circle, the constructed ring mapping space in a circular shape may be further determined as a hash ring, and each node mapping identifier on the hash ring may be specifically determined based on a hash value (for example, an address hash value) obtained by hashing a node address of a verification node. For example, each node mapping identifier on the hash ring may be a hash value with a length of m bits. For another example, each node mapping identifier on the hash ring may be a decimal integer value obtained by performing decimal conversion on a hash value with a length of m bits.

For another example, in this embodiment of this disclosure, when the addressing algorithm is the Chord algorithm, these hash values (for example, address hash values) on the hash ring may alternatively be connected head to tail to form a virtual ring, referred to as a Chord ring. In this way, the hash values (for example, address hash values) can be sorted clockwise by magnitude on the Chord ring, so that both node addresses and service data are mapped to the Chord ring. In this way, it can be assumed that a status of the entire peer-to-peer network a virtual ring.

The Chord ring herein is included in the hash ring, the hash ring is included in the ring mapping space, and the ring mapping space is included in the mapping space. A clockwise direction formed through clockwise sorting by magnitude on the Chord ring is an addressing direction indicated by the Chord ring for directed data addressing. Therefore, in the clockwise direction, a node located before any verification node (for example, a node x) may be referred to as a predecessor node of the node x. The 1st predecessor node may be referred to as a direct predecessor node. Similarly, a node located after the node x may be referred to as a successor node of the node x. The 1st successor node may be referred to as a direct successor node.

In this embodiment of this disclosure, a hash mapping function matching a corresponding service scenario may be determined based on an addressing algorithm, and then hash transformation may be performed on corresponding data (for example, a node address and/or service data of the foregoing verification node) based on hash transformation characteristics of the hash mapping function, to obtain a hash value with a hash length of m bits. However, before the data is mapped, to be specific, mapped to the mapping space, in this embodiment of this disclosure, a hash space (namely, the foregoing global address space) with a space size of $2^n$ may be pre-constructed by using a specific hash mapping function. In this way, if a verification network is introduced into a service layer, the pre-constructed hash space (namely, the foregoing global address space) with a space size of $2^m$ may be used as a mapping space, so that the corresponding data (for example, the node address and/or the service data of the foregoing verification node) can be mapped to the mapping space.

For another example, in this embodiment of this disclosure, address mapping may alternatively be performed on node addresses of all verification nodes (namely, the M verification nodes) in the verification network by using the same addressing algorithm, so that a new global address space is obtained after the node addresses of the verification nodes are mapped to the pre-constructed global address space. In this embodiment of this disclosure, the new global address space may be referred to as a mapping space.

In any one of the foregoing mapping modes, identifiers can be organized and sorted in a specified order (for example, the foregoing first order) in the mapping space obtained through mapping. Correspondingly, when the mapping space includes a ring mapping space (namely, the foregoing mapping space in a ring shape), if directed data addressing needs to be performed in the ring mapping space, an addressing direction may be determined based on a direction indicated by the first order. For example, in this embodiment of this disclosure, based on identifiers (for example, node mapping identifiers) in the mapping space, these node mapping identifiers may be re-organized and re-sorted in ascending order along the ring mapping space, and a clockwise direction formed through sorting in ascending order in the ring mapping space is used as the addressing direction.

In addition, when the ring mapping space is specifically a consistent hash ring (namely, the foregoing ring mapping space in a circular shape), a size of a ring space of the hash ring is still $2^m$, where m is a positive integer. In other words, non-overlapping identifiers of a maximum of $2^m$ pieces of data that are mapped to the hash ring may be recorded and identified in the ring space of the hash ring. For example, when the data herein is node addresses of verification nodes, non-overlapping node mapping identifiers of a maximum of $2^m$ verification nodes that are mapped to the hash ring may be recorded and identified in the ring space of the hash ring. In addition, when the data herein is the foregoing stored service data, non-overlapping service data identifiers of a maximum of $2^m$ pieces of service data that are mapped to the hash ring may be recorded and identified in the ring space of the hash ring.

In this embodiment of this disclosure, after a consensus node in a consensus network stores service data of a service to a blockchain, the consensus node may hash the service data of the service based on the foregoing hash mapping function, and then may identify and display, in the ring space of the hash ring, a service data identifier of the service data that is obtained through hashing.

In some embodiments, to prevent hashing of a large amount of service data from affecting computing performance of consensus performance of a consensus node, in this embodiment of this disclosure, after a consensus node in the consensus network stores service data of a service to the blockchain, a service node may alternatively be authorized to synchronize, from the blockchain through clearing, service data related to a service submitted by the service node and original data information of the service data. In this way, after storing and processing the service data and the original data information of the service data, the service node can also hash the service data based on the foregoing hash mapping function, so that a service data identifier of the service data that is subsequently obtained through hashing can be identified and displayed in the ring space of the hash ring.

In this embodiment of this disclosure, the same service data is identified and displayed at the same spatial position in a ring space of the same hash ring after being processed by using the same hash mapping function.

Values of identifiers (for example, the foregoing node mapping identifiers and service data identifiers) actually mapped to the ring space of the hash ring subsequently are all included in a spatial range corresponding to the ring space. A range value in the spatial range may be specifically 0 to $2^m-1$ that is determined based on the foregoing hash mapping function.

For ease of understanding, for example, the ring mapping space herein is specifically a hash ring. To be specific, FIG. 2 shows a ring space of a hash ring whose spatial influence parameter is m (for example, m=6). In this case, the spatial influence parameter (for example, m=6) of the ring space of the hash ring is configured for indicating that, for a node mapping identifier (for example, an identifier N8 shown in FIG. 2) of a verification node that is mapped to the ring space, a node routing list maintained by the verification node includes a maximum of m routing entries. In addition, the spatial influence parameter herein is further configured for indicating that a node mapping identifier of each verification node is a hash length of a hash value obtained by hashing a node address of each verification node. For example, the hash length herein may be a fixed-length sequence value indicated by the foregoing specific hash mapping function. For example, a quantity of binary bits in the fixed-length sequence value is m bits.

A value of m is not limited in this embodiment of this disclosure. For example, m may be set to 256 in some embodiments. In this way, the node address of each verification node in the verification network can be mapped to the ring space, to obtain a node mapping identifier (namely, NodeID, for example, a node mapping identifier 201*d* corresponding to the verification node 20A shown in FIG. 2 may be specifically the identifier N8 in the ring space) corresponding to a specific position in the ring space. Similarly, service data stored on a service node may also be mapped to the ring space to obtain a data identifier (namely, KeyID) corresponding to a specific position in the ring space. Both the node mapping identifier and the data identifier have a length of m bits. In other words, the node mapping identifier and the data identifier are assigned to a ring with a size of $2^m$ for service data assignment (to a specific verification node), verification node distribution, and service data positioning. For ease of understanding and differentiation, in this embodiment of this disclosure, a node address of the foregoing verification execution node may be referred to as a first node address, and a node mapping identifier obtained by mapping the first node address to the ring mapping space is referred to as a first node mapping identifier. Similarly, a node address of the foregoing target verification node may be referred to as a second node address, and a node mapping identifier obtained by mapping the second node address to the ring mapping space is referred to as a second node mapping identifier, and so on. Similarly, a data identifier obtained by mapping the target service data to the ring mapping space may be referred to as a target service data identifier. The following describes a specific process of addressing in the verification network with reference to FIG. 2.

In this embodiment of this disclosure, the verification network includes a total of M verification nodes (M is a positive integer). For example, as shown in FIG. 2, it is assumed that M=10, to be specific, the verification network includes 10 verification nodes (including the verification node 20A and the verification node 20B), a ring space of a hash ring corresponding to the verification network is a ring with a size of $2^6$ (namely, m=6), and a value range of each identifier (for example, a node mapping identifier of a verification node) in the ring mapping space is 0 to $2^6-1$. In this case, after node addresses of the 10 verification nodes are mapped to the ring space of the hash ring, node mapping identifiers of the verification nodes may be identified and displayed at corresponding spatial positions in the ring space of the hash ring. Because m is equal to 6 herein, in this embodiment of this disclosure, after address mapping (namely, hash mapping or hashing) is performed on a node address of each verification node, a hash value of each verification node that is obtained through address mapping (namely, hash mapping or hashing) may be used as a node mapping identifier of each verification node. In other words, the address mapping in this embodiment of this disclosure means hashing the node address of each verification node by using a hash algorithm selected by the Chord algorithm. In this way, a hash value with a specific hash length (namely, m bits) that is obtained through hashing is used as a node mapping identifier, and then a correspondence (namely, a mapping relationship) between a node mapping identifier and a corresponding node address may be established in the ring space of the hash ring. Then node mapping identifiers of the verification nodes may be identified and displayed at corresponding spatial positions in the ring space of the hash ring.

In some embodiments, in an implementation, the node mapping identifier herein may alternatively be an integer obtained by performing number system conversion (for example, decimal conversion) on a hash value with a specific hash length (for example, m bits in the binary system).

In this embodiment of this disclosure, the node mapping identifier of each verification node is generated or determined based on a hash value with a hash length of 6 bits. For ease of understanding, in the ring space of the hash ring herein, the node mapping identifier of each verification node may be, for example, an address hash value with a hash length of m bits that is obtained by mapping the node address of each verification node to the ring space of the hash ring. Therefore, obtained 10 node mapping identifiers (namely, 10 address hash values with a length of 6 bits) may be displayed in the ring space of the hash ring in ascending order based on a specified addressing direction (for example, a clockwise direction). For example, the 10 node mapping identifiers are sequentially denoted as an identifier N1, an identifier N8, an identifier N14, an identifier N21, an identifier N32, an identifier N38, an identifier N42, an identifier N48, an identifier N51, and an identifier N56 in the clockwise direction. In other words, when the 10 node mapping identifiers are sorted in ascending order in this embodiment of this disclosure, the address hash values with a length of 6 bits are directly compared with each other in a mathematical sense. For example, the address hash values with a length of 6 bits may be used as binary integers with a length of 6 bits for binary integer comparison.

In addition, similarly, assuming that there are currently a total of five pieces of service data (including the service data 201*a*), the five pieces of service data may be mapped to the ring space of the hash ring to obtain a service data identifier of each piece of service data, and each service data identifier is also a 6-bit binary integer. Then, in this embodiment of this disclosure, the service data identifier of each piece of service data may be assigned to a verification node corresponding to a node mapping identifier with a shortest distance from the data identifier in the addressing direction (for example, the clockwise direction) indicated by the ring space of the hash ring. In other words, any verification node may be configured to store a data identifier close to a node mapping identifier of the verification node. Specifically, a data identifier KeyID may be assigned to a verification node corresponding to the 1st NodeID with NodeID≥KeyID. In this case, the verification node may be referred to as a successor node of service data corresponding to the data identifier KeyID. To be specific, in the ring space of the hash ring, the verification node is the 1st verification node in the addressing direction counted from the KeyID, and may be denoted as a successor (KeyID). For example, assuming that service data identifiers of the five pieces of service data are an identifier K10, an identifier K24, an identifier K30, an identifier K38, and an identifier K54, assignment of service data identifiers and positioning of service data may be performed based on the service data identifiers. For example, as shown in FIG. 2, a successor node of service data corresponding to the identifier K10 is a verification node corresponding to the identifier N14, in other words, the identifier K10 is assigned to the verification node corresponding to the identifier N14. In this case, the verification node corresponding to the identifier N14 is subsequently responsible for addressing for the service data corresponding to the identifier K10. To be specific, when the verification node corresponding to the identifier N14 is subsequently found through addressing based on the identifier K10 in the verification network, a service node that currently stores the service data corresponding to the identifier K10 can be quickly located and found through addressing based on the verification node corresponding to the identifier N14.

Based on this, as shown in FIG. 2, the user X may transmit a data location request (for example, a data location request 201*b*) for the service data 201*a* to the verification node 20A in the verification network through the associated service node 20C. After receiving the data location request 201*b*, the verification node 20A may obtain a data identifier (namely, the foregoing target service data identifier, for example, a service data identifier 201*c*) of the service data 201*a* from the data location request 201*b*. The service data identifier 201*c* is obtained by pre-mapping the service data 201*a* to the ring space of the hash ring shown in FIG. 2. In addition, a node address (namely, the foregoing first node address) of the verification node 20A may be further pre-mapped to the ring space of the hash ring shown in FIG. 2 to obtain a node mapping identifier (namely, the foregoing first node mapping identifier, for example, a node mapping identifier 201*d*) of the verification node 20A. In addition, a node address (namely, the foregoing second node address) of the verification node 20B may be pre-mapped to the ring space shown in FIG. 2 to obtain a node mapping identifier (namely, the foregoing second node mapping identifier, for example, a node mapping identifier 201*h*) of the verification node 20B.

Further, the verification node 20A may obtain a resource location table (for example, a resource location table 201*e*) associated with a node address corresponding to the node mapping identifier 201*d*. The resource location table may be configured for recording an adjacent node mapping identifier greater than the node mapping identifier 201*d*. A node address of a verification node corresponding to the adjacent node mapping identifier may be referred to as an adjacent node address. The adjacent node address is a node address located after the node address of the verification node 20A in the addressing direction. In other words, the verification node corresponding to the adjacent node mapping identifier is a successor node of the verification node 20A. A specific quantity of adjacent node mapping identifiers stored in the resource location table is not limited in this embodiment of this disclosure. The adjacent node address may also be configured for storing a service data identifier assigned to the adjacent node address. For example, the adjacent node address corresponding to the adjacent node mapping identifier may be configured for storing a service data identifier of service data that is synchronized from the blockchain and that has a short distance from the adjacent node mapping identifier. For ease of differentiation, the service data identifier of the service data that is synchronized from the blockchain herein may be collectively referred to as a synchronous data identifier, and service data corresponding to the synchronous data identifier may be collectively referred to as on-chain synchronous data information. The synchronous data identifier herein is synchronized by the verification node corresponding to the adjacent node mapping identifier from the blockchain corresponding to the consensus network. The on-chain synchronous data information may be obtained by a related service node by performing clearing and synchronization through a consensus node during a clearing and synchronization operation.

For example, as shown in FIG. 2, it is assumed that the node mapping identifier 201*d* of the verification node 20A is the identifier N8, and the resource location table 201*e* associated with a node address of the identifier N8 includes four adjacent node mapping identifiers: the identifier N14, the identifier N21, the identifier N32, and the identifier N38. Verification nodes corresponding to the four adjacent node mapping identifiers are all successor nodes of the verification node 20A. In addition, an adjacent node address corresponding to each adjacent node mapping identifier (namely, node addresses of the successor nodes) may be configured for storing a synchronous data identifier of service data (namely, on-chain synchronous data information) related to the adjacent node mapping identifier. For example, the adjacent node mapping identifier is the identifier N14. Service data identifiers of five pieces of service data may be synchronized to the verification node corresponding to the identifier N14. A service data identifier of each piece of service data is a synchronous data identifier of corresponding on-chain synchronous data information. For example, as shown in FIG. 2, service data identifiers of five pieces of service data that are stored at a node address of the verification node corresponding to the identifier N14 are an identifier E1 of on-chain synchronous data information 1, an identifier E2 of on-chain synchronous data information 2, an identifier E3 of on-chain synchronous data information 3, an identifier E4 of on-chain synchronous data information 4, and an identifier E5 of on-chain synchronous data information 5.

Further, when the node mapping identifier 201*d* of the verification node 20A is the identifier N8, the verification node 20A may perform data verification on a service data identifier (namely, a target service data identifier, for example, the target service data identifier is specifically the service data identifier 201*c* shown in FIG. 2) of the service data 201*a* based on the resource location table 201*e* in the addressing direction (for example, the clockwise direction) indicated by the ring space of the hash ring, to obtain a corresponding data verification result (namely, a first data verification result, for example, a data verification result 201*f*). In this embodiment of this disclosure, the data verification result (namely, the first data verification result, for example, the data verification result 201*f*) may be configured for indicating whether a service data identifier synchronized from the blockchain by a verification node (namely, a successor node of the verification node 20A) in the resource location table 201*e* includes the target service data identifier.

The data verification is intended to determine whether the successor node of the verification node 20A holds the service data identifier 201*c* that is currently searched for. For example, assuming that the service data identifier 201*c* of the service data 201*a* is the identifier K24 in the ring space shown in FIG. 2, the verification node 20A with the identifier N8 may first search the resource location table 201*e* for a node mapping identifier, namely, the identifier N14, of a direct successor node of the verification node 20A. In this case, it can be found that the identifier K24 that needs to be searched for does not fall between the identifier N8 and the identifier N14 (in other words, the identifier K24 is beyond a spatial range of (N8, N14]). In this case, it can be determined that the identifier K24 does not exist on the verification node corresponding to the identifier N14. To be specific, the five service data identifiers synchronized to the verification node corresponding to the identifier N14 do not include the target service data identifier. For example, the five synchronous data identifiers (namely, the identifier E1 to the identifier E5) synchronized to the verification node corresponding to the identifier N14 shown in FIG. 2 do not include the identifier K24. When the direct successor node of the verification node 20A fails, data verification related to the direct successor node cannot be performed. In this case, data verification may be sequentially tried on subsequent verification nodes based on the resource location table 201*e*. For example, when it is detected that the verification node corresponding to the identifier N14 fails, the verification node 20A may determine, through a similar process, whether a next successor node (namely, a verification node corresponding to the identifier N21) holds the identifier K24.

In this embodiment of this disclosure, the verification node 20A herein may be a verification execution node that currently receives the data location request, and a resource location table associated with a node address of the verification execution node may be the resource location table 201*e* shown in FIG. 2. In the ring space of the hash ring, node mapping identifiers of all verification nodes are sorted in ascending order, and an order obtained through sorting in ascending order is a first order. A direction indicated by the first order is an addressing direction for directed data addressing. In the ring space shown in FIG. 2, the addressing direction may be specifically a clockwise direction starting from the verification node 20A (namely, the verification execution node).

In some embodiments, when the data verification result 201*f* indicates that a synchronous data identifier stored on the direct successor node (for example, the verification node corresponding to the identifier N14) of the verification node 20A includes the service data identifier 201*c*, the addressing ends, and the verification node 20A may directly forward the data location request 201*b* to the direct successor node, so that the direct successor node of the verification node 20A verifies authenticity of the service data 201*a* as a verification node found through addressing.

In some embodiments, if the data verification result 201*f* indicates that a synchronous data identifier stored on the direct successor node (for example, the verification node corresponding to the identifier ID N14) of the verification node 20A does not include the service data identifier 201*c*, the verification node 20A may further continue to perform addressing based on a node routing list (finger table) maintained by the verification node 20A. For example, as shown in FIG. 2, when the node mapping identifier 201$d$ of the verification node 20A (namely, the verification execution node) is the identifier N8 in the ring space shown in FIG. 2, the node routing list maintained by the verification node 20A (namely, a node routing list corresponding to the verification execution node) may be a node routing list 201$g$ shown in FIG. 2. K routing node mapping identifiers recorded in the node routing list 201$g$ are node mapping identifiers of verification nodes that have preset distances from the node mapping identifier of the verification node 20A in the ring space of the hash ring.

For example, the node routing list 201$g$ may be configured for storing node mapping identifiers of verification nodes that have preset distances from the node mapping identifier of the verification node 20A (namely, the verification execution node) (for example, when a node mapping identifier of each verification node in the ring space is a binary hash value, the preset distances herein may be distances, from the node mapping identifier of the verification node 20A (namely, the verification execution node), that are expressed by using the same base number with different powers, for example, distances of 2^(1, 2, 3, . . . , m)) in the addressing direction indicated in the ring space, with the node mapping identifier of the current verification node 20A (namely, the verification execution node) as a starting point. Then the node mapping identifiers of the verification nodes that have the preset distance from the node mapping identifier of the verification node 20A (namely, the verification execution node) may be collectively referred to as routing node mapping identifiers.

In other words, the node routing list 201$g$ in FIG. 2 may be configured for not only recording K (K is a positive integer less than or equal to m, and m herein is the foregoing spatial influence parameter) routing node mapping identifiers, but also recording a preset distance between each routing node mapping identifier and the node mapping identifier of the verification node 20A (namely, the verification execution node) (for example, the preset distance herein may specifically include 2^1 (namely, 2 to the power of 1), 2^2 (namely, 2 to the power of 2), 2^3 (namely, 2 to the power of 3), . . . , and 2^m (namely, 2 to the power of m)). In this embodiment of this disclosure, when the node routing list 201$g$ is configured for data verification, jumping between some verification nodes can be quickly and efficiently implemented based on the routing node mapping identifiers in the node routing list 201$g$. This can reduce routing complexity during data verification to some extent.

A piece of routing information (namely, a routing entry) in the node routing list 201$g$ is determined based on a routing node mapping identifier and a preset distance between the routing node mapping identifier and the node mapping identifier of the verification node 20A (namely, the verification execution node). Because a maximum spatial size of the ring space of the hash ring is $2^m$, the node routing list can store a maximum of m pieces of routing information. Therefore, complexity of the routing algorithm is O(log N). Assuming that a value of the node mapping identifier 201$d$ is n, an $i^{th}$ piece of routing information in the node routing list stores a node mapping identifier of an $((n+2^{i-1}) \bmod 2^m)^{th}$ successor node of the verification node 20A. To be specific, distances between node mapping identifiers of successor nodes stored in the node routing list and the node mapping identifier of the verification node 20A progressively increase according to a multiple based on the base number of the foregoing power exponent, for example, proportionally progressively increase according to a multiple of 2. The modulo operation is performed because successors of the last verification node are the first several verification nodes. For example, in the ring space shown in FIG. 2, a next verification node (for example, a verification node corresponding to the identifier N1) of a verification node (for example, a verification node corresponding to the identifier N56) with a largest node mapping identifier in the addressing direction is defined as the $1^{st}$ verification node. $1 \le i \le m$, where i herein indicates the $i^{th}$ piece of routing information maintained in the node routing list. In this embodiment of this disclosure, the same node mapping identifier (namely, each routing node mapping identifier) in the node routing list may correspond to one or more positions in the ring space. Based on this, a value of a quantity (for example, K) of routing node mapping identifiers maintained in the node routing list is to less than or equal to m (namely, a spatial influence size of the ring mapping space).

For example, as shown in the node routing list 201$g$ in FIG. 2, the node routing list 201$g$ stores six pieces of routing information. A column on the left records positions N8+1 (namely, $2^{1-1}$) to N8+32 (namely, $2^{6-1}$) in the ring mapping space, and a column on the right records a node mapping identifier of a verification node that actually exists at each position in the ring mapping space. In this embodiment of this disclosure, for ease of differentiation, a node mapping identifier stored in the node routing list may be referred to as routing node mapping identifier. For example, the first piece of routing information in the node routing list 201$g$ is N8+1-N14, which may indicate that the verification node corresponding to the identifier N14 is responsible for a resource (for example, a data identifier) at the $1^{st}$ position after the verification node corresponding to the identifier N8 in the addressing direction. This recording mode has the following advantages:

(1) Each verification node includes only information about a few verification nodes in an entire network. (2) Each verification node knows more positions that a verification node closer to the verification node is responsible for. For example, the verification node corresponding to the identifier N8 knows three positions (namely, N8+1, N8+2, and N8+4) that the verification node corresponding to the identifier N14 is responsible for, and knows only one position (namely, N8+8) that the verification node corresponding to the identifier N21 is responsible for.

Based on this, during addressing based on the node routing list 201$g$, the verification node 20A may first find a node mapping identifier (for example, the node mapping identifier 201$h$) with a shortest distance from the service data identifier 201$c$ in an opposite direction of the addressing direction (also referred to as a direction opposite to the addressing direction, to be specific, an opposite direction of the foregoing clockwise direction may be specifically a counterclockwise direction), and use the node mapping identifier as a second node mapping identifier. The node mapping identifier 201$h$ found in this case is smaller than the service data identifier 201$c$. Then jumping may be performed to a verification node (namely, a target verification node) corresponding to the node mapping identifier 201$h$ to continue to perform search.

For ease of understanding, an example in which the node mapping identifier 201$d$ is the identifier N8 and the service data identifier 201$c$ is the identifier K24 is still used for description. As shown in FIG. 2. Among six routing node mapping identifiers (namely, the identifier N14, the identifier N14, the identifier N14, the identifier N21, the identifier N32, and the identifier N42) included in the node routing list 201*g*, it can be found that a routing node mapping identifier with a shortest distance from the identifier K24 in the counterclockwise direction is the identifier N21. In this case, the identifier N21 is smaller than the identifier K24. To be specific, N8+8-N21 meets a condition that the identifier N21 falls with a spatial range of (N8, K24]. In this case, the node mapping identifier 201*h* is the identifier N21. Assuming that the node mapping identifier of the verification node 20B shown in FIG. 2 is also the identifier N21, the verification node 20B may serve as a target verification node. Then the verification node 20A may forward the data location request 201*b* carrying the service data identifier 201*c* (namely, the identifier K24) to the verification node 20B. After receiving the data location request 201*b*, the verification node 20B also performs an addressing process similar to that performed by the verification node 20A, until a node mapping identifier with a shortest distance from the service data identifier 201*c* is found in the addressing direction. Then the addressing ends, and a verification node finally found through addressing may be configured to further verify authenticity of the service data 201*a*.

Alternatively, in this embodiment of this disclosure, a verification node (for example, the verification node 20B) found by the verification node 20A (namely, the verification execution node) through addressing may serve as a new verification execution node in a next round of data verification, so that the verification node performs a new round of directed data addressing and verification according to the specific process in which the verification node 20A performs data verification as the verification execution node during the previous round of data verification. For example, as shown in FIG. 2, similarly, when the verification node 20B corresponding to the identifier N21 serves as a new verification execution node, whether a direct successor node (namely, a verification node corresponding to the identifier N32) of the new verification execution node holds the identifier K24 that is currently searched for may be first determined based on a resource location table maintained by the new verification execution node. In this case, the verification node 20B finds that the identifier K24 falls between the identifier N21 and the identifier N32 (in other words, the identifier K24 falls within a spatial range of (N21, N32]). Therefore, it can be determined that the identifier N32 is a node mapping identifier with a shortest distance from the identifier K24 in the addressing direction. In other words, the identifier K24 that is currently searched for exists on the verification node corresponding to the identifier N32. Therefore, the verification node corresponding to the identifier N32 may be a verification node finally found through addressing. Then the verification node (for example, the verification node 120*d* shown in FIG. 1) finally found through addressing may verify authenticity of service data (namely, the service data 201*a*) corresponding to the identifier K24.

Alternatively, in some embodiments, when the node mapping identifier 201*h* of the verification node 20B is a node mapping identifier with a shortest distance from the service data identifier 201*c* in the addressing direction, the verification node 20B may verify authenticity of the service data 201*a*, and may return a verification proof for the service data 201*a* to the user X. In addition, when original text verification is involved, the verification node 20B may further access a specific service node on which the service data 201*a* is located.

In the hierarchical chain network, this embodiment of this disclosure provides a service data verification framework and protocol based on the Chord algorithm, so that data verification can be efficiently performed among a plurality of verification nodes through routing. This can improve addressing efficiency for a verification node and therefore improve verification efficiency for service data. In addition, in this embodiment of this disclosure, a data verification scheme is designed for a double-layer chain system of a blockchain, and an independent verification network is designed. The verification network is a stable, decentralized, and highly fault-tolerant network, and may be separated from a service network in which a service SPV node (namely, a service node) is located, to provide a stable blockchain data verification service while ensuring privacy of service data. In addition, the verification network is further isolated from a consensus network. This can prevent a query request from repeatedly entering the consensus network and affecting core performance of the consensus network. In addition, computing resources of the service network can be fully utilized.

The method provided in this embodiment of this disclosure may be applied to transfer of virtual assets (for example, electronic bills, game coins, and game diamonds), transfer of electronic files (for example, electronic contracts and electronic official documents), or other service scenarios in which service data verification is required.

In addition, service data of entity objects such as users, enterprises, and institutions (for example, billing information, credit reporting information, or tax refund information of a user, loss information or enterprise qualification information of an enterprise, or contract information, certificate information, or prescription information of a user or an enterprise) may be involved in specific implementations of this disclosure. When the foregoing embodiments of this disclosure are applied to a specific product or technology, permission or consent from service objects such as users, enterprises, and institutions is required, and collection, use, and processing of related data need to comply with related laws, regulations, and standards in related countries and regions.

In the "service network-consensus network" hierarchical structure, for any verification execution node configured for data verification, when the verification execution node obtains a target service data identifier from a data location request for target service data, the verification execution node determines a first node mapping identifier of the verification execution node in a mapping space; performs, in a first order indicated in the mapping space, data verification on the target service data identifier based on a resource location table corresponding to the verification execution node; when a service data identifier synchronized from a blockchain by a verification node corresponding to an adjacent node mapping identifier in the resource location table does not include the target service data identifier, further searches for a node mapping identifier with a shortest distance from the target service data identifier in a second order opposite to the first order based on a node routing list corresponding to the verification execution node, and uses the node mapping identifier as a second node mapping identifier; and then forwards the data location request to a target verification node corresponding to the second node mapping identifier. When the second node mapping identifier is a node mapping identifier with a shortest distance from the target service data identifier in the first order, the target verification node verifies authenticity of the target service data. For specific implementations of the foregoing descriptions, refer to embodiments corresponding to FIG. 3 to FIG. 8 below.

Figure 3:
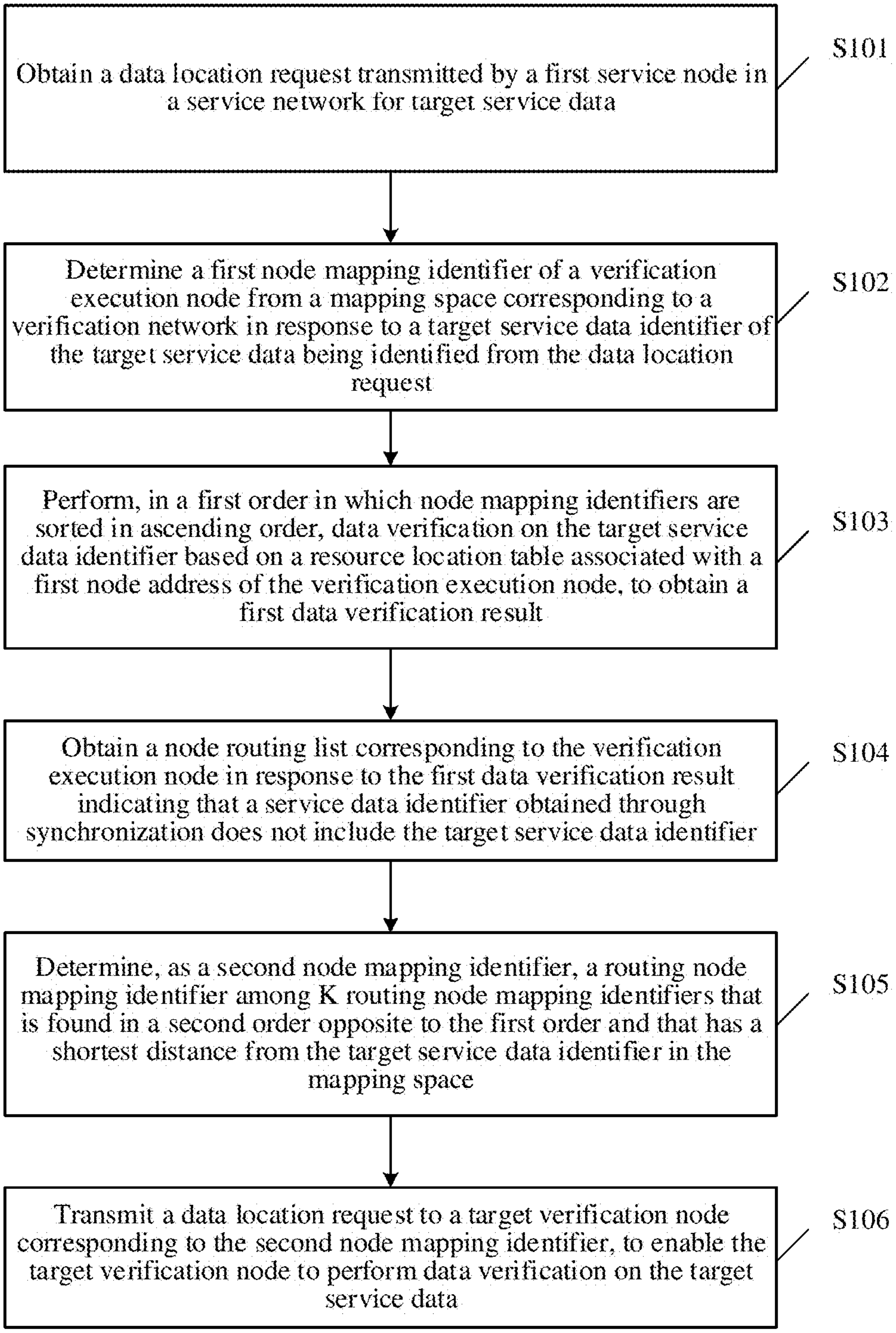
FIG. 3 is a schematic flowchart of a data processing method based on a hierarchical chain network according to an embodiment of this disclosure.

Further, FIG. 3 is a schematic flowchart of a data processing method based on a hierarchical chain network according to an embodiment of this disclosure. As shown in FIG. 3, the method may be performed by a verification execution node. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network, where M is a positive integer. The verification execution node is included in the M verification nodes. The verification execution node herein may be any verification node randomly selected from the M verification nodes for receiving a data location request transmitted by a service object. For example, the verification execution node may be the verification node 120*a* in the verification network 120 shown in FIG. 1. This method may specifically include the following operation S101 to operation S106.

Operation S101: Obtain a data location request transmitted by a first service node in the service network for target service data.

When a service object obtains target service data of a target service, the service object may entrust any verification node in the verification network to provide a proof of authenticity for the service object if the service object wants to verify authenticity of the target service data in the blockchain. Therefore, the service object may transmit a data location request for the target service data to the verification execution node in the verification network through a first service node in the service network, and the verification execution node may receive the data location request correspondingly. The first service node may be any one of a plurality of service nodes included in the service network. For example, the first service node may be any service node (for example, the service node 110*a*) in the service network 110 shown in FIG. 1.

In this embodiment of this disclosure, the verification network providing a service different from that provided by the service network is introduced into the service layer, so that a stable and efficient data verification service can be further provided through the verification network while privacy of service data synchronized, through clearing, by service nodes (namely, the foregoing second-type service nodes) in the service network is ensured. For example, for each service node in the service network, when the service node performs a corresponding operation (for example, the service node may perform a clearing and synchronization operation) through a service provided by the service network, the service node synchronizes, through clearing, service data related to the service node from the blockchain corresponding to the consensus network. The service data herein may include but is not limited to a service execution result and read/write status data. Therefore, service data stored on different service nodes in the same service network may vary. Similarly, for each verification node in the verification network, when the verification node performs another operation (for example, the verification node may perform a data verification service) through another service provided by the verification network, the verification node may asynchronously synchronize, from the blockchain corresponding to the consensus network, a service data identifier (for example, a hash value of a service execution result and a hash value of read/write status data) of service data within a spatial range corresponding to a node mapping identifier of a node address of the verification node. Therefore, when a request is initiated to verify authenticity of service data in the blockchain, a corresponding addressing process may be performed through the verification network introduced into the service layer, to find a verification node that can verify authenticity of the service data and a service node that can verify original data information of the service data.

In this embodiment of this disclosure, the target service data is determined after a consensus node in the consensus network invokes target service processing data in the blockchain to perform a target service. Specifically, when the consensus node in the consensus network obtains a target service requested by a service initiating object, the consensus node may perform the target service to obtain corresponding service data. For example, in an electronic bill issuance scenario, it is assumed that a patient goes to a hospital located in a region A for treatment. The consensus node in the consensus network may receive a target service submitted by a service node (for example, a second service node associated with the patient) in the region A. The target service herein may be specifically a service for indicating the consensus node to issue an electronic bill for virtual assets spent on the current treatment. Then corresponding service data may be generated based on the electronic bill. The second service node herein is included in the service network. For example, the second service node may be any service node (for example, the service node 110*b*) in the service network 110 shown in FIG. 1. For example, the second service node and the first service node may be the same service node or different service nodes. This is not limited herein.

Further, when the consensus node obtains a service list including a target service from a related service pool, the consensus node may invoke target service processing data deployed in the blockchain to pre-perform these services in the service list. Specifically, the consensus node may invoke the target service processing data to pre-perform the target service in this block. For example, the consensus node may read a read data set corresponding to the target service based on the target service processing data, and then may perform the target service based on the read data set to obtain a service execution result corresponding to the target service, and then may obtain target service data (for example, service data B1) corresponding to the target service based on the service execution result. After performing the target service, the consensus node may further write the service execution result to a write data set corresponding to the target service. Then the consensus node may use a service read/write set (including the read data set and the write data set) obtained by performing the target service as target read/write status data (for example, read/write status data B2) corresponding to the target service. Further, the consensus node may package the service list and all service data (for example, the service execution result, the read data set, and the write data set) related to the services in the service list or a part of the service data (for example, the service execution result) into a target block, and writes the target block to the blockchain corresponding to the consensus network after the target block passes consensus. Data content packaged into a block is not limited in this embodiment of this disclosure. The consensus node may store the finally obtained target block to a node memory of the consensus node.

The target service may be any service, for example, a bill service, a derivative bill service associated with a bill service, a file service, or a derivative file service associated with a file service that is mentioned above as an example.

In this embodiment of this disclosure, one or more of the target service execution result or the target read/write status data is used as target service data. After the target service data is successfully added to the blockchain, the consensus node may authorize the second service node to synchronize the target service data through clearing. To be specific, the second service node may further return the target service data synchronized through clearing to the foregoing service object.

Operation S102: Determine a first node mapping identifier of the verification execution node from a mapping space corresponding to the verification network in response to a target service data identifier of the target service data being identified from the data location request.

The mapping space includes node mapping identifiers respectively corresponding to the M verification nodes, and the node mapping identifiers are obtained by respectively mapping node addresses of the M verification nodes to the mapping space.

The mapping space herein is essentially the foregoing global address space for performing node mapping processing on the M verification nodes. In the global address space (namely, the mapping space) obtained through node mapping processing, a node mapping identifier is obtained by performing address mapping on a node address of a verification node.

Alternatively, to implement efficient data verification, in this embodiment of this disclosure, a hash mapping function suitable for a current service scenario may be selected based on the current service scenario, and then the global address space may be pre-constructed by using the selected hash mapping function. The pre-constructed global address space may be collectively referred to as a mapping space. In this way, a node address of a verification node and service data stored on a service node can be subsequently mapped to the mapping space based on the same hash mapping function, to ensure consistent hashing. A size of the mapping space may alternatively be an $m^{th}$ power of a preset base number, for example, $2^m$, where m is a positive integer, and a value range of the mapping space is 0 to $2^m-1$. For example, in an implementation, a value of the mapping space may be a virtual space that starts with the smallest value 0 and ends with the largest value $2^m-1$.

The target service data identifier is obtained by mapping the target service data to the mapping space corresponding to the verification network. For example, in this embodiment of this disclosure, for the consensus node in the consensus network, when obtaining target service data, the consensus node may obtain a hash mapping function associated with the mapping space, and then may hash the target service data based on the hash mapping function to obtain a corresponding target service data identifier. In this embodiment of this disclosure, the hash mapping function may be specifically a common hash mapping function such as SHA-1 or SHA256. To be specific, for input data with any length, an output is a fixed-length hash value. For example, SHA256 generates a hash value (namely, a hash sequence) with a length of 256 bits. Correspondingly, when SHA256 is used as the hash mapping function, m=256 (to be specific, 256 herein may be configured for representing a sequence length of a hash sequence obtained through hash mapping by using the hash mapping function). To be specific, when the mapping space is pre-constructed by using the hash mapping function, a size of the mapping space is $2^{256}$. During practical application, an appropriate hash mapping function may be selected according to a service requirement.

For a hash value (namely, a hash sequence) with a length of 256 bits, a value of each bit in the hash value (namely, the hash sequence) is represented by a binary 0 or 1. Therefore, an identifier (for example, the foregoing node mapping identifier and/or data identifier), at each position in the mapping space, that is calculated by using a currently specified hash mapping function (for example, SHA256) is included in the value range of the mapping space (for example, the value range may be 0 to $2^{256}-1$). To be specific, a value of each node mapping identifier and/or a value of each data identifier are/is a value(s) within the value range of the mapping space. In the mapping space, a smallest value (for example, 0) in the value range is essentially an integer value obtained when values of the 256 bits in the hash sequence are all 0, and a largest value (for example, $2^{256}-1$) in the value range is essentially an integer value obtained when values of the 256 bits in the hash sequence are all 1.

In this embodiment of this disclosure, when a mapping space is constructed by using a hash mapping function, a size of the mapping space (namely, a size of a value range of the mapping space) is determined based on a sequence length (namely, m, for example, m=256) of a hash sequence that is specified by the hash mapping function. Based on this, in this embodiment of this disclosure, the m (to be specific, the sequence length of the hash sequence that is specified by the hash mapping function) herein may be referred to as a spatial influence parameter of the hash mapping space. This is because the spatial influence parameter herein is further configured for subsequently limiting a maximum quantity of routing entries in a node routing list corresponding to the verification execution node to be m.

The target service data identifier herein may be a hash value of some or all of data in the target service data. For example, in some embodiments, when the target service data includes only the target service execution result, the target service data identifier may be correspondingly a hash value of some or all of data in the target service execution result. In some embodiments, when the target service data includes only the target read/write status data, the target service data identifier may be correspondingly a hash value of some or all of data in the target read/write status data. In some embodiments, when the target service data includes both the target service execution result and the target read/write status data, the target service data identifier may be correspondingly a hash value of some or all of data in the target service execution result and the target read/write status data. This is not limited in this disclosure.

For example, when service data is specifically an electronic bill P, a service data identifier corresponding to the service data may be a hash value, namely, hash (P), of the whole electronic bill P, or may be a hash value of specified bill information (for example, a bill number) in the electronic bill P. In addition, the consensus node may further synchronize or configure a target service data identifier of a target service data to a verification node corresponding to a node mapping identifier with a shortest distance from the target service data identifier in the mapping space, so that the verification node corresponding to the node mapping identifier with the shortest distance from the target service data identifier can prestore the synchronized or configured target service data identifier to a node address of the verification node.

Then, for a service object that needs to verify authenticity of the target service data in the blockchain, when obtaining the target service data that needs to be verified, the service object may map the target service data to the mapping space through the first service node, to obtain the target service data identifier of the target service data, and then may transmit a data location request for the target service data to the verification execution node based on the obtained target service data identifier. Therefore, when performing operation S102, the verification execution node may identify and obtain the target service data identifier of the target service data from the data location request, and may use a node mapping identifier of the verification execution node in the mapping space as the first node mapping identifier.

A node mapping identifier of any verification node is obtained by mapping a node address of the verification node to the mapping space.

The verification execution node is used as an example. The verification execution node may first obtain its node address as a first node address, and then may map the first node address to the mapping space to obtain the first node mapping identifier of the verification execution node. The first node address may be specifically an IP address of the verification execution node. Specifically, the verification execution node may obtain a hash mapping function (for example, SHA-1 or SHA256) associated with the mapping space, and then may hash the first node address based on the hash mapping function, so that a hash value (for example, the foregoing address hash value) obtained through hashing may be determined as the first node mapping identifier of the verification execution node. A process of obtaining node mapping identifiers of other verification nodes in the verification network is similar.

Alternatively, in this embodiment of this disclosure, after the mapping space is pre-constructed based on the hash mapping function, a node address of each verification node in the verification network may be further mapped to the pre-constructed mapping space, and then node mapping identifiers of these verification nodes may be respectively identified at corresponding spatial positions in the mapping space. In other words, to improve data verification efficiency, in this embodiment of this disclosure, when the node mapping identifiers of these verification nodes are respectively identified at the corresponding spatial positions in the mapping space, mapping relationships may be further established between the node mapping identifiers of the verification nodes at the spatial positions and node addresses of the corresponding verification nodes, and the mapping relationships may be uniformly stored in a mapping relationship table. In this way, when the verification execution node receives a data location request transmitted by a service node (namely, the first service node), the verification execution node may quickly query whether a node mapping identifier that has a mapping relationship with a node address of the verification execution node exists in the pre-constructed mapping relationship table. If such a node mapping identifier exists, the verification execution node may directly use the found node mapping identifier that has a mapping relationship with the node address of the verification execution node as the first node mapping identifier. On the contrary, if no such a node mapping identifier exists, the node address (namely, the first node address) of the verification execution node may be hashed by using the same hash mapping function, so that a hash value (for example, the foregoing address hash value) obtained through hashing can be determined as the first node mapping identifier of the verification execution node.

In some embodiments, in addition to an IP address of a verification node, a node mapping identifier of the verification node may alternatively be obtained by mapping node description information of the verification node to a ring mapping space. The node description information herein is unique to each verification node, for example, may be a node private key of the verification node.

Operation S103: Perform, in a first order obtained by sorting node mapping identifiers in ascending order, data verification on the target service data identifier based on a resource location table associated with the first node address of the verification execution node, to obtain a first data verification result.

In this embodiment of this disclosure, the resource location table associated with the node address (namely, the first node address) of the verification execution node may be directly obtained in the first order obtained by sorting (for example, in ascending order) the node mapping identifiers in the mapping space. In this way, data verification can be performed on the target service data identifier based on the obtained resource location table to determine whether a service data identifier synchronized from the blockchain to an adjacent node address corresponding to an adjacent node mapping identifier in the resource location table includes the target service data identifier. If the target service data identifier is not included, operation S104 may be performed. On the contrary, if the target service data identifier is included, to be specific, when the first data verification result indicates that the service data identifier synchronized from the blockchain to the adjacent node address corresponding to the adjacent node mapping identifier includes the target service data identifier, an adjacent verification node corresponding to the adjacent node address to which the target service data identifier is synchronized may be used as a target adjacent verification node. Then the data location request carrying the target service data identifier may be forwarded to the target adjacent verification node. The data location request is configured for indicating the target adjacent verification node to perform data verification on the target service data. A node address of the target adjacent verification node is a target adjacent verification node address.

The service data identifier obtained through synchronization includes a target synchronous data identifier. The target synchronous data identifier is a target synchronous data identifier of target on-chain synchronous data information that is synchronized from the blockchain and that is stored at the target adjacent verification node address corresponding to a target adjacent verification node mapping identifier. In this case, a specific process of performing data verification in the mapping space is described as follows: If the target service data identifier falls within a spatial range determined based on the first node mapping identifier and the target adjacent verification node mapping identifier, the verification execution node may determine that the target adjacent verification node mapping identifier is a node mapping identifier with a shortest distance from the target service data identifier in the first order, and determine that the target synchronous data identifier includes the target service data identifier. The distance herein is a hash distance obtained by performing an exclusive OR operation on the target adjacent verification node mapping identifier and the target service data identifier when the target adjacent verification node mapping identifier and the target service data identifier are hash values with a same length. In some embodiments, if the target service data identifier is beyond the spatial range determined based on the first node mapping identifier and the target adjacent verification node mapping identifier, the verification execution node may determine that the target synchronous data identifier does not include the target service data identifier. In other words, in this embodiment of this disclosure, the verification execution node may further use, as the first data verification result, a data verification result obtained when the target synchronous data identifier includes the target service data identifier or a data verification result obtained when the target synchronous data identifier does not include the target service data identifier.

Alternatively, in an implementation, in this embodiment of this disclosure, when the mapping space includes a ring mapping space, an addressing direction of the ring mapping space may be further determined based on a direction indicated by the first order in the mapping space. The ring mapping space may be specifically a mapping space in a ring shape that is formed by connecting a smallest node mapping identifier and a largest node mapping identifier head to tail after the node mapping identifiers in the mapping space are sorted in ascending order. In this case, the addressing direction of the ring mapping space may be a clockwise direction obtained by sorting node mapping identifiers in the ring mapping space in ascending order.

In other words, the addressing direction herein is a direction (namely, the clockwise direction) obtained after the node mapping identifiers in the ring mapping space are organized and sorted (for example, sorted in ascending order). Similarly, in the ring mapping space, the resource location table maintained by the verification execution node may be configured for recording an adjacent node mapping identifier. An adjacent node address corresponding to the adjacent node mapping identifier may be configured for storing a synchronous data identifier of on-chain synchronous data information that is synchronized from the blockchain corresponding to the consensus network. The adjacent node mapping identifier herein is a node mapping identifier greater than the first node mapping identifier in the addressing direction.

The adjacent node mapping identifier is obtained by performing node mapping processing on a node address (namely, the adjacent node address) of an adjacent verification node. The adjacent verification node is essentially a successor node of the verification execution node in the addressing direction indicated in the ring mapping space.

Each verification node in the verification network may maintain a predecessor node list and a successor node list that are associated with a node address of the verification node. In this way, a predecessor node and a successor node can be quickly located, and a node status of the predecessor node and the successor node can be periodically detected. The node status herein includes an effective state and an ineffective state. The effective state is configured for describing a state in which a predecessor node and a successor node of a current verification node are effective. The ineffective state is configured for describing a state in which a predecessor node and a successor node of a current verification node are ineffective. In this embodiment of this disclosure, an addressing process is performed in the addressing direction (for example, the clockwise direction) indicated in the ring mapping space. Therefore, a successor node list maintained by the verification execution node may be used as the resource location table associated with the first node address of the verification execution node. In this case, the resource location table is configured for recording an adjacent node mapping identifier. The adjacent node mapping identifier herein is a node mapping identifier corresponding to a node address of a successor node (namely, the adjacent verification node) of the verification execution node, and the successor node (namely, the adjacent verification node) of the verification execution node is determined based on the successor node list maintained by the verification execution node. In other words, the successor node list may be configured for storing the node mapping identifier of the successor node of the verification execution node.

Alternatively, in this embodiment of this disclosure, the resource location table associated with the first node address of the verification execution node may be determined based on the successor node list maintained by the verification execution node. For example, the resource location table herein may be configured for storing an adjacent node mapping identifier of a successor node of the verification execution node, and the successor node of the verification execution node herein is determined based on the successor node list maintained by the verification execution node in the addressing direction. The addressing direction herein is the clockwise direction determined when the verification execution node performs an addressing operation in the ring mapping space. The clockwise direction is a direction obtained by sorting node mapping identifiers in a global address space in ascending order when the verification execution node performs node mapping processing.

In other words, the successor node of the verification execution node herein may be a successor node in the successor node list maintained by the verification execution node in the addressing direction, and a node mapping identifier of the successor node in the successor node list may be an adjacent node mapping identifier of the corresponding successor node that is recorded in the resource location table. To be specific, the successor node list herein may be configured for storing a node address of the successor node of the verification execution node, and may also store, in association, a node mapping identifier corresponding to the node address of the successor node of the verification execution node. Based on this, the verification execution node may perform data verification on the target service data identifier based on the resource location table, to obtain the first data verification result.

In this embodiment of this disclosure, the adjacent node address corresponding to the adjacent node mapping identifier in the resource location table may be configured for storing a service data identifier of service data that is synchronized from the blockchain corresponding to the consensus network. Specifically, the service data identifier of the service data herein may be a synchronous data identifier of on-chain synchronous data information, and the adjacent node address is a node address located after the first node address in the addressing direction. To be specific, a verification node corresponding to the adjacent node mapping identifier stored in the resource location table is a successor node of the verification execution node, and a synchronous data identifier of on-chain synchronous data information that is stored at the adjacent node address corresponding to the adjacent node mapping identifier may be a service data identifier of corresponding service data that the successor node can find through addressing. The synchronous data identifier may be synchronized or configured by the consensus node to these successor nodes.

For ease of understanding, for specific details about the adjacent node address corresponding to the adjacent node mapping identifier in the resource location table in this embodiment of this disclosure, refer to the resource location table **201*e* shown in FIG. 2. The resource location table 201*e* shown in FIG. 2 indicates that, when a verification node corresponding to the identifier N8 is a verification execution node, adjacent verification nodes recorded in a resource location table maintained by the verification execution node are four successor nodes (namely, verification nodes corresponding to the identifier N14, the identifier N21, the identifier N32, and the identifier N38) of the verification execution node. The verification node corresponding to the identifier N14 further stores synchronous data identifiers (namely, the identifier E1 to the identifier E5**) of five pieces of on-chain synchronous data information.

Specifically, if a service data identifier that the verification execution node needs to search for is the target service data identifier, after obtaining the first node mapping identifier and the target service data identifier the verification execution node may first query whether the $1^{st}$ successor node in the resource location table has stored the target service data identifier currently searched for. The $1^{st}$ successor node in the resource location table is a next verification node of the verification execution node in the addressing direction. This means that the verification execution node may query whether a next verification node of the verification execution node (namely, a direct successor node of the verification execution node) in the addressing direction indicated in the ring mapping space has stored the target service data identifier currently searched for. If the direct successor node of the verification execution node has stored the target service data identifier currently searched for, it can be indirectly determined that the target service data identifier currently searched for is stored at a node address of the direct successor node of the verification execution node. Then, when the direct successor node of the verification execution node is used as a verification node found through addressing, the current round of addressing ends (to be specific, the node address of the direct successor node that is found this time and at which the target service data identifier is stored may be used as a node address of a target verification node finally found through addressing). Further, the data location request currently obtained by the verification execution node may be forwarded to the direct successor node of the verification execution node. In this way, the direct successor node of the verification execution node can generate a verification proof for authenticity verification of the target service data based on on-chain synchronous data information that is related to the target service data identifier and that is synchronized from the blockchain (namely, proof data of the target service data that is synchronized from the blockchain), and return the verification proof to the service object. In this way, the service object can determine, based on the currently obtained verification proof, that the target service data that currently needs to be verified exists in the blockchain. On the contrary, if the direct successor node of the verification execution node does not store the target service data identifier currently searched for, addressing may continue. To be specific, in this case, the verification execution node may further query whether the $2^{nd}$ successor node (the $2^{nd}$ successor node herein may be a next verification node of the direct successor node, to be specific, a next verification node of the direct successor node is a next verification node of a next verification node of the verification execution node) in the resource location table has stored the target service data identifier currently searched for. By analogy, in this embodiment of this disclosure, whether each successor node in the resource location table has stored the target service data identifier currently searched for may be queried through traversal, until it is determined that a successor node corresponding to each adjacent node mapping identifier in the resource location table does not store the target service data identifier currently searched for. In this case, it can be indirectly determined that service data identifiers synchronized by these successor nodes do not include the target service data identifier. In other words, synchronous data identifiers of on-chain synchronous data information that are synchronized by these successor nodes do not include the target service data identifier. In this case, operation S104 may be further performed.

In an implementation, in this embodiment of this disclosure, according to the first order obtained by sorting the node mapping identifiers in the mapping space in ascending order, a mapping space in a ring shape that is formed by connecting a smallest node mapping identifier and a largest node mapping identifier in the first order head to tail is determined as the ring mapping space. In this way, the verification execution node may further obtain, in the addressing direction (for example, the clockwise direction) indicated in the ring mapping space, the resource location table associated with the first node address of the verification execution node. Therefore, a node mapping identifier of one or more successor nodes of the verification execution node that is recorded in the resource location table may be collectively referred to as an adjacent node mapping identifier. Then an adjacent node mapping identifier may be selected, through traversal, from these adjacent node mapping identifiers recorded in the resource location table as a target adjacent verification node mapping identifier. Further, the verification execution node may perform data verification on the target service data identifier based on the first node mapping identifier and the target adjacent verification node mapping identifier to obtain the first data verification result. In this embodiment of this disclosure, in the addressing direction, a next verification node of the verification execution node may be referred to as a direct verification node of the verification execution node, or a first adjacent verification node of the verification execution node. In this case, an adjacent node mapping identifier of the first adjacent verification node that is recorded in the resource location table maintained by the verification execution node may be collectively referred to as a first adjacent node mapping identifier. Similarly, by analogy, in this embodiment of this disclosure, in the addressing direction, a next verification node of the direct verification node may be further referred to as a second adjacent verification node of the verification execution node. In this case, an adjacent node mapping identifier of the second adjacent verification node that is recorded in the resource location table maintained by the verification execution node may be collectively referred to as a second adjacent node mapping identifier.

It is assumed that a quantity of adjacent node mapping identifiers in the resource location table is N (to be specific, the resource location table stores node mapping identifiers of N successor nodes of the verification execution node), and N is a positive integer greater than 1. In this case, a specific process of determining a target adjacent verification node mapping identifier from the adjacent node mapping identifiers included in the resource location table may be described as follows: An adjacent node mapping identifier corresponding to the node address immediately after the first node address is searched for in the first order among the N adjacent node mapping identifiers in the mapping space, and the found adjacent node mapping identifier corresponding to the node address immediately after the first node address may be used as a first adjacent node mapping identifier. Further, the verification execution node may obtain a node status of a first adjacent verification node corresponding to the first adjacent node mapping identifier, and if the node status of the first adjacent verification node is an effective state, use the first adjacent node mapping identifier as a target adjacent verification node mapping identifier. On the contrary, if the node status of the first adjacent verification node is an ineffective state, the verification execution node determines a target adjacent verification node mapping identifier in the first order from (N−1) adjacent node mapping identifiers other than the first adjacent node mapping identifier.

In some embodiments, when the mapping space includes a ring mapping space, the verification execution node in this embodiment of this disclosure may obtain a resource location table maintained by the verification execution node in the ring mapping space, and may determine N adjacent node mapping identifiers of the verification execution node in the ring mapping space based on the obtained resource location table. In this way, the verification execution node may search for an adjacent node mapping identifier corresponding to the node address immediately after the first node address in the addressing direction, and may use the found adjacent node mapping identifier corresponding to the node address immediately after the first node address as a first adjacent node mapping identifier, and then may obtain a node status of a first adjacent verification node (namely, a direct successor node of the verification execution node) corresponding to the first adjacent node mapping identifier. In some embodiments, if the node status of the first adjacent verification node is an effective state, the first adjacent verification node is normally online. In this case, the first adjacent node mapping identifier may be used as a target adjacent verification node mapping identifier. Alternatively, in some embodiments, if the node status of the first adjacent verification node is an ineffective state, the first adjacent verification node fails (for example, the node goes offline due to a power failure or a network failure). In this case, a target adjacent verification node mapping identifier may be determined from (N−1) adjacent node mapping identifiers other than the first adjacent node mapping identifier. To be specific, when the direct successor node of the verification execution node fails, the verification execution node may attempt to sequentially query successor nodes in the resource location table other than the direct successor node, to perform data verification on the target service data identifier. For example, similarly, the (N−1) adjacent node mapping identifiers include a second adjacent node mapping identifier corresponding to the node address immediately after a node address corresponding to the first adjacent node mapping identifier in the addressing direction. In this case, the verification execution node may obtain a node status of a second adjacent verification node corresponding to the second adjacent node mapping identifier. In some embodiments, if the node status of the second adjacent verification node is an effective state, the second adjacent node mapping identifier may be used as a target adjacent verification node mapping identifier. Alternatively, in some embodiments, if the node status of the second adjacent verification node is an ineffective state, a target adjacent verification node mapping identifier may be determine from a remaining adjacent node mapping identifier (if any) other than the first adjacent node mapping identifier and the second adjacent node mapping identifier by using a similar method.

For ease of understanding, still refer to FIG. 2. The resource location table 201*e* in FIG. 2 is used as an example. It is assumed that a first node mapping identifier of a current verification execution node is the identifier N8, and a resource location table associated with a node address (namely, the first node address) of the identifier N8 is the resource location table 201*e*. In this case, a resource location table associated with a first node address of the verification execution node may include four adjacent node mapping identifiers (namely, N=4): the identifier N14, the identifier N21, the identifier N32, and the identifier N38. An adjacent node mapping identifier corresponding to the node address immediately after the node address of the identifier N8 in the addressing direction is the identifier N14. In other words, a verification node corresponding to the identifier N14 is a direct successor node of a verification node corresponding to the identifier N8. Therefore, when a node status of the verification node corresponding to the identifier N14 is an effective state, the identifier N14 may be used as a target adjacent verification node mapping identifier. In some embodiments, when the node status of the verification node corresponding to the identifier N14 is an ineffective state, an attempt may be made to determine a target adjacent verification node mapping identifier from the remaining three adjacent node mapping identifiers (including the identifier N21, the identifier N32, and the identifier N38).

After the target adjacent verification node mapping identifier is determined, for ease of differentiation, an adjacent node address corresponding to the target adjacent verification node mapping identifier may be referred to as a target adjacent verification node address. The foregoing synchronous data identifier of the on-chain synchronous data information may include a target synchronous data identifier of target on-chain synchronous data information stored at the target adjacent verification node address. In this case, a specific process of performing data verification on the target service data identifier based on the first node mapping identifier and the target adjacent verification node mapping identifier may be as follows: If the target service data identifier falls within a spatial range determined based on the first node mapping identifier and the target adjacent verification node mapping identifier, it can be determined that the target adjacent verification node mapping identifier is a node mapping identifier with a shortest distance from the target service data identifier (in this case, the target adjacent verification node mapping identifier is greater than or equal to the target service data identifier) in the first order. In this case, the verification node corresponding to the target adjacent verification node mapping identifier is responsible for addressing the target service data, and it can be determined that a target synchronous data identifier synchronized by the verification node from the blockchain includes the target service data identifier currently searched for. Alternatively, in some embodiments, if the target service data identifier is beyond the spatial range determined based on the first node mapping identifier and the target adjacent verification node mapping identifier, it can be determined that the target synchronous data identifier does not include the target service data identifier.

Finally, the verification execution node may use, as the first data verification result, a data verification result obtained when the target synchronous data identifier includes the target data identifier or a data verification result obtained when the target synchronous data identifier does not include the target data identifier.

For ease of understanding, still refer to FIG. 2. It is assumed that the target adjacent verification node mapping identifier currently determined is the identifier N14. In this case, a node address corresponding to the identifier N14 is the target adjacent verification node address, a synchronous data identifier (namely, the identifier E1 to the identifier E5)

stored at the target adjacent verification node address is a target synchronous data identifier, and on-chain synchronous data information 1 to on-chain synchronous data information 5 that correspond to the identifier E1 to the identifier E5 are target on-chain synchronous data information. In addition, assuming that the first node mapping identifier is the identifier N8 and the target service data identifier is the identifier K24, a spatial range determined based on the identifier N8 and the identifier N14 may be denoted as (N8, N14] in the mapping space. In this case, it is found that the identifier K24 is beyond the spatial range. Therefore, it can be determined that the target synchronous data identifier (namely, the identifier E1 to the identifier E5) does not include the identifier K24, and search needs to be further performed in the first order.

In some embodiments, when the first data verification result indicates that the target synchronous data identifier includes the target service data identifier, it can be determined that the target adjacent verification node mapping identifier is a node mapping identifier with a shortest distance from the target service data identifier in the first order. In this case, the verification execution node may forward the data location request carrying the target service data identifier to the target adjacent verification node corresponding to the target adjacent verification node mapping identifier. The data location request may be configured for indicating the target adjacent verification node to verify authenticity of the target service data. For example, still refer to FIG. 2. It is assumed that the first node mapping identifier is the identifier N8, the target service data identifier is the identifier K10, and the target adjacent verification node mapping identifier currently determined is the identifier N14. In this case, it can be found that the identifier K10 falls within a spatial range (N8, N14] determined based on the identifier N8 and the identifier N14. In other words, the identifier N14 is a node mapping identifier with a shortest distance from the identifier K10 in the addressing direction. Therefore, the data location request may be forwarded to a verification node (namely, the foregoing target adjacent verification node) corresponding to the identifier N14.

Operation S104: Obtain a node routing list corresponding to the verification execution node in response to the first data verification result indicating that the service data identifier obtained through synchronization does not include the target service data identifier.

The node routing list is configured for recording K routing node mapping identifiers. The routing node mapping identifier is a node mapping identifier of a verification node that has a preset distance from the first node mapping identifier in the mapping space. K is a positive integer greater than 1, and K is less than or equal to a spatial influence parameter of the mapping space.

When the addressing algorithm includes the Chord algorithm, correctness of the entire verification network can be ensured based on correctness of a successor pointer on which the Chord algorithm depends. However, a verification node in the verification network may encounter node join, exit, exceptions, or the like. Therefore, each verification node may periodically query a successor node in a successor node list maintained by the verification node to determine whether a predecessor node of the successor node is updated. If the predecessor node is updated, the successor node of the verification node and a routing entry may also be updated. For robustness, each verification node stores not only the node routing list, but also N successor nodes in a successor node list maintained by the verification node. In this embodiment of this disclosure, an adjacent node mapping identifier of each successor node in the successor node list may be recorded in the resource location table. In this way, when a node status of a successor node in a successor node list maintained by a verification node is an ineffective state, an update may be notified to subsequent verification nodes by using a successor pointer associated with the successor node list. Then a successor node list and a node routing list maintained by each verification node in the verification network can be updated. Based on this, taking the verification execution node as an example, the verification execution node may periodically query a predecessor node of a successor node of the verification execution mode about whether the verification execution node is to update the successor node and a routing entry in a node routing list. A specific process may be as follows: The verification execution node may transmit a node query request to a first adjacent verification node (namely, a direct successor node of the verification execution node). The node query request may be configured for indicating the first adjacent verification node to return a predecessor node mapping identifier corresponding to the node address immediately before a node address corresponding to a first adjacent node mapping identifier in the first order. In other words, the first adjacent verification node needs to return a node mapping identifier of its direct predecessor node to the verification execution node. Further, if the verification execution node finds that the predecessor node mapping identifier is different from the first node mapping identifier, the verification execution node may update, based on the predecessor node mapping identifier, a resource location table and a node routing list that are maintained by the verification execution node. During verification, automatic go-online/offline, data maintenance, data addressing, routing, and other functions may be provided for verification nodes in the verification network based on the Chord protocol, to ensure integrity and availability of the entire verification network.

For ease of understanding, it is assumed that a verification node (which may be referred to as a new verification node) is newly added to the verification network, and a node mapping identifier of the new verification node is the identifier N26. The new verification node may first point to its successor node (for example, a verification node corresponding to the identifier N32), and then notify the verification node corresponding to the identifier N32. After receiving the notification, the verification node corresponding to the identifier N32 may identify the new verification node as its predecessor node. Then the new verification node and the verification node corresponding to the identifier N32 may modify their respective node routing lists. It is assumed that the node mapping identifier of the verification execution node is the identifier N21. In this case, when the verification execution node queries whether a direct predecessor node of a director successor node (namely, the verification node corresponding to the identifier N32, namely, the first adjacent verification node) of the verification execution node is still the verification execution node, the verification execution node finds that the direct predecessor node of the verification node corresponding to the identifier N32 is already the verification node corresponding to the identifier N26. In this case, the verification execution node may change its direct successor node to the verification node corresponding to the identifier N26, and notify the verification node corresponding to the identifier N26 that the verification execution node has set the verification node corresponding to the identifier N26 as a successor node. After receiving the notification, the verification node corresponding to the identifier N26 may set the verification node (namely, the verification execution node) corresponding to the identifier N21 as a predecessor node of the verification node corresponding to the identifier N26.

Operation S105: Determine, as a second node mapping identifier, a routing node mapping identifier among the K routing node mapping identifiers that is found in a second order opposite to the first order and that has a shortest distance from the target service data identifier in the mapping space.

When the first data verification result indicates that the synchronous data identifier of the on-chain synchronous data information does not include the target service data identifier, the verification execution node may continue to perform addressing in the mapping space based on the node routing list maintained by the verification execution node, until a node mapping identifier with a shortest distance from the target service data identifier is found in the second order related to the first order. In this case, the verification execution node uses the found node mapping identifier as the second node mapping identifier, so that operation S106 can be further performed. To be specific, the data location request carrying the target service data identifier may be forwarded to a target verification node corresponding to the second node mapping identifier, so that the target verification node can perform data verification on the target service data based on the data location request.

In some embodiments, when the mapping space includes a ring mapping space, an addressing direction of the ring mapping space is determined based on a direction indicated by the first order. Specifically, the verification execution node may determine a second order opposite to the first order in the ring mapping space, determine a direction indicated by the second order as an opposite direction of the addressing direction, search, among the K routing node mapping identifiers, for a routing node mapping identifier with a longest distance from the first node mapping identifier in the opposite direction of the addressing direction, and use the found routing node mapping identifier as a first routing node mapping identifier. If the first routing node mapping identifier falls within a spatial range determined based on the first node mapping identifier and the target service data identifier, it is determined that the first routing node mapping identifier is a node mapping identifier with a shortest distance from the target service data identifier in the opposite direction of the addressing direction, and the first routing node mapping identifier is used as the second node mapping identifier. On the contrary, if the first routing node mapping identifier is beyond the spatial range determined based on the first node mapping identifier and the target service data identifier, the second node mapping identifier is determined from (K−1) routing node mapping identifiers other than the first routing node mapping identifier.

It is assumed that the node routing list includes K routing node mapping identifiers, where K is a positive integer greater than 1 and less than or equal to a spatial influence parameter of the ring mapping space. The spatial influence parameter (namely, m) herein may be configured for finally determine a size of the ring mapping space. For example, the size of the ring mapping space may be configured for representing that a maximum quantity of non-overlapping node mapping identifiers subsequently mapped and identified in the ring mapping space is an $m^{th}$ power of a preset base number, for example, is $2^m$.

For example, when the size of the ring mapping space is $2^m$, a value of an identifier in the ring mapping space belongs to a value range of 0 to $2^m-1$. A value of m herein is essentially determined based on a sequence length of a hash sequence that is expressed as a binary integer and that needs to be obtained through conversion, the sequence length being specified by a hash mapping function associated with the ring mapping space. The node routing list herein stores node mapping identifiers that have distances, expressed by using the same base number with different powers, from a node mapping identifier (for example, the identifier N8 in the ring mapping space shown in FIG. 2) of a current verification node (for example, the foregoing verification execution node), with the node mapping identifier of the current verification node as a starting point. For example, the same base number with different powers herein may be expressed as preset distances such as 2^1, 2^2, 2^3, . . . , and 2^m. The distance herein is essentially a hash distance between positions of any two points (for example, two node mapping identifiers) in the ring mapping space, for example, a distance that can be obtained by performing an exclusive OR operation on the two node mapping identifiers in this embodiment of this disclosure.

Therefore, for a node mapping identifier (for example, the identifier N8 in the ring space shown in FIG. 2) of a current verification execution node, the spatial influence parameter of the ring mapping space may be further configured for limiting a maximum quantity of routing entries in a node routing list corresponding to the current verification execution node to be m. A routing entry may include a node mapping identifier of a verification node that has a preset distance from the node mapping identifier (namely, a first node mapping identifier) of the current verification execution node, and the same node mapping identifier may appear in one or more routing entries.

For example, when a spatial influence parameter of the address space is also m, for each verification node mapped to the ring mapping space, a node routing list maintained by each verification node only needs to include node mapping identifiers (namely, routing node mapping identifiers) of a few verification nodes in the entire verification network. For example, the node routing list maintained by each verification node only needs to include node mapping identifiers of verification nodes that have preset distances from a node mapping identifier of a current node in the ring mapping space. The preset distances between the node mapping identifiers of the verification nodes and the node mapping identifier of the current verification node may be distances of 2^(1, 2, 3, . . . , m). Therefore, a maximum quantity (namely, K) of routing node mapping identifiers stored in the node routing list may reach m. In this embodiment of this disclosure, the node routing list is introduced, so that a nonlinear search method (or referred to as a scalable resource location method) is provided to improve addressing efficiency.

Specifically, the verification execution node may first search, among the K routing node mapping identifiers, for a routing node mapping identifier with a longest distance from the first node mapping identifier, and may use the found routing node mapping identifier as a first routing node mapping identifier. In some embodiments, if the first routing node mapping identifier falls within a spatial range determined based on the first node mapping identifier and the target service data identifier, it can be determined that the first routing node mapping identifier is a node mapping identifier that is found in the second order and that has a shortest distance from the target service data identifier (in this case, the first routing node mapping identifier is smaller than the target service data identifier). This indicates that a verification node corresponding to the first routing node mapping identifier is a predecessor node closest to the target service data identifier in the node routing list. In this case, the first routing node mapping identifier may be used as the second node mapping identifier. Alternatively, in some embodiments, if the first routing node mapping identifier is beyond the spatial range determined based on the first node mapping identifier and the target service data identifier, a second routing node mapping identifier may be determined from (K−1) routing node mapping identifiers other than the first routing node mapping identifier. Similarly, the verification execution node may search, among the (K−1) routing node mapping identifiers other than the first routing node mapping identifier, for a routing node mapping identifier with a longest distance from the first node mapping identifier, and may use the found routing node mapping identifier as the second routing node mapping identifier. In some embodiments, if the second routing node mapping identifier falls within the spatial range determined based on the first node mapping identifier and the target service data identifier, it can be determined that the second routing node mapping identifier is a node mapping identifier with a shortest distance from the target service data identifier in the second order. In this case, the second routing node mapping identifier may be used as the second node mapping identifier. Alternatively, in some embodiments, if the second routing node mapping identifier is beyond the spatial range determined based on the first node mapping identifier and the target service data identifier, another routing node mapping identifier with a shortest distance from the target service data identifier in the second order may be determined by using a similar method from a remaining routing node mapping identifier (if any) other than the first routing node mapping identifier and the second routing node mapping identifier. Then the determined another routing node mapping identifier may be used as the second node mapping identifier. In other words, the verification execution node may perform search in the node routing list in a far-to-near order. Because convergence during the search is quite fast, search time can be effectively reduced, and routing complexity is also reduced. For ease of differentiation, in this embodiment of this disclosure, node mapping identifiers stored in the node routing list of the verification execution node may be collectively referred to as routing node mapping identifiers.

For ease of understanding, for a node routing list maintained by a verification execution node in the mapping space, the node routing list 201*g* in FIG. 2 is used as an example. It is assumed that a first node mapping identifier of a current verification execution node is the identifier N8, the target service data identifier is the identifier K38, and the node routing list 201*g* maintained by the verification execution node corresponding to the identifier N8 includes six routing node mapping identifiers (namely, the identifier N14, the identifier N14, the identifier N14, the identifier N21, the identifier N32, and the identifier N42). The routing node mapping identifiers herein may include duplicate node mapping identifiers. It can be found that a routing node mapping identifier in the node routing list 201*g* that has a longest distance from the identifier N8 is the identifier N42 (namely, a first routing node mapping identifier). In this case, for a routing entry N8+16-N42 in the node routing list, the identifier N42 is actually beyond a spatial range formed by the identifier N8 (namely, the first node mapping identifier) and the identifier K38 (namely, the target service data identifier). In other words, the identifier N42 does not fall within a spatial range of (N8, K38]. This indicates that the identifier N42 found in the second order is not a routing node mapping identifier with a shortest distance from the identifier K38. Further, the verification execution node may continue to perform search among the five remaining routing node mapping identifiers (namely, the identifier N14, the identifier N14, the identifier N14, the identifier N21, and the identifier N32. In this case, it can be found that a routing node mapping identifier with a longest distance from the identifier N8 is the identifier N32 (namely, a second routing node mapping identifier). In addition, for a routing entry N8+16-N32 in the node routing list, the identifier N32 is actually beyond the spatial range formed by the identifier N8 (namely, the first node mapping identifier) and the identifier K38 (namely, the target service data identifier). In other words, the identifier N32 does not fall within the spatial range of (N8, K38]. This indicates that the identifier N32 found in the second order is a node mapping identifier with a shortest distance from the identifier K38. In this case, the identifier N32 may be used as a second node mapping identifier. Further, the verification execution node may forward a data location request carrying the identifier K38 to a verification node (namely, a target verification node) corresponding to the identifier N32.

Operation S106: Transmit a data location request to a target verification node corresponding to the second node mapping identifier, to enable the target verification node to perform data verification on the target service data.

When the addressing in the mapping space ends, if the identifier N32 found in the second order is a node mapping identifier with a shortest distance from the identifier K38, the verification execution node may use the identifier N32 as the second node mapping identifier. In addition, in this embodiment of this disclosure, after a far-to-near addressing operation (to be specific, an operation performed during addressing calculation) is implemented in the second order based on the node routing list, it can be indirectly determined that the second node mapping identifier of the target verification node is a node mapping identifier with a shortest distance from the target service data identifier in the first order. In this case, the target verification node may be further configured to verify authenticity of the target service data. For a specific verification process, refer to related descriptions in an embodiment corresponding to FIG. 4.

In some embodiments, if the mapping space includes a ring mapping space, after addressing in the ring mapping space ends, the identifier N32 found in an opposite direction (namely, a counterclockwise direction of the ring mapping space) of the addressing direction is a node mapping identifier with a shortest distance from the identifier K38. In this case, the verification execution node may also use the identifier N32 as the second node mapping identifier. In addition, in this embodiment of this disclosure, after a far-to-near addressing operation (to be specific, an operation performed during addressing calculation) is implemented in the opposite direction of the addressing direction based on the node routing list, it can be indirectly determined that the second node mapping identifier of the target verification node is a node mapping identifier with a shortest distance from the target service data identifier in the addressing direction. In this case, the target verification node may be further configured to verify authenticity of the target service data. For a specific verification process, refer to related descriptions in an embodiment corresponding to FIG. 4.

Calculation of distances between different identifiers is involved in this embodiment of this disclosure. A data identifier and a node mapping identifier in the same mapping space (for example, the same ring mapping space) are hash values with a same length. Therefore, an exclusive OR operation may be performed on the two identifiers (namely, the data identifier and the node mapping identifier) to determine a hash distance between the two identifiers. A smaller difference between numbers corresponds to a smaller hash distance. In this embodiment of this disclosure, a routing node mapping identifier with a shortest distance from the target service data identifier may be determined based on a hash distance between the two identifiers.

In this embodiment of this disclosure, when the verification network is introduced into the service layer at which the service network is located, a data verification function may be provided for a plurality of service nodes in the service network through the M verification nodes in the verification network. In this way, for any service node (namely, the first service node) in the service network, the first service node can enable a service object to randomly initiate a data location request for specific service data to any verification node (for example, the verification execution node) in the verification network. For the verification execution node, after receiving the data location request that is transmitted by the first service node for the service data (namely, target service data), the verification execution node may further quickly find, based on a resource location table and a node routing list that are maintained by the verification node, a verification node (for example, the target verification node) corresponding to a node mapping identifier that is currently known to the verification node and that has a shortest distance from a service data identifier of the service data, and may forward the data location request to the target verification node. In this way, the target verification node can continue to perform search by using a nonlinear search method similar to that used by the verification execution node, until a verification node with a shortest distance from the target service data identifier is found in the entire verification network. Then the addressing operation in the verification network is completed. Subsequently, the finally found verification node (namely, the verification node finally found through addressing) may perform related verification on the service data. Compared with a point-by-point verification method, in the nonlinear search method used in this embodiment of this disclosure, addressing can be implemented through jumping to a few verification nodes deployed in the verification network, so that an addressing distance is effectively shortened. This can improve addressing efficiency for a verification node, and therefore can improve verification efficiency for service data. In addition, the verification network herein is deployed at the service layer, and the consensus network is deployed at the consensus layer, so that the verification network deployed at the service layer can be independent of the consensus network deployed at the consensus layer. In this way, network isolation between the verification network and the consensus network can effectively prevent a query request (namely, the data location request for querying the target service data) from repeatedly entering the consensus network and affecting core performance of the consensus network. Moreover, verification nodes (namely, the first-type service nodes) in the verification network herein are service nodes that are selected from a plurality of service nodes in the service network and that meet a verification network joining condition. Therefore, computing resources of the first-type service nodes that are selected from the service network and that meet the verification network joining condition can be fully utilized in the hierarchical chain network including the service layer and the consensus layer.

Figure 4:
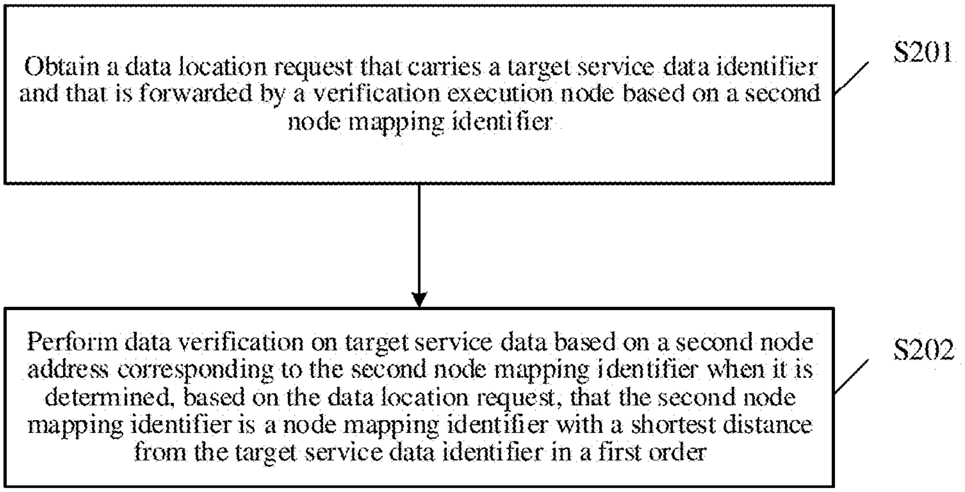
FIG. 4 is a schematic flowchart of another data processing method based on a hierarchical chain network according to an embodiment of this disclosure.

Further, FIG. 4 is a schematic flowchart of another data processing method based on a hierarchical chain network according to an embodiment of this disclosure. As shown in FIG. 4, the method may be performed by a target verification node. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network, where M is a positive integer. The target verification node is included in the M verification nodes. For example, the target verification node may be a verification node (for example, the verification node 120*b*) found by a verification execution node in the verification network 120 shown in FIG. 1 in the second order based on a node routing list maintained by the verification execution node. This method may specifically include the following operation S201 and operation S202.

Operation S201: Obtain a data location request that carries a target service data identifier and that is forwarded by the verification execution node based on a second node mapping identifier.

The verification execution node herein is included in the M verification nodes. The data location request herein is a request transmitted by a first service node for target service data corresponding to a target service data identifier. The first service node herein is any service node in the service network. The verification execution node may be configured to determine a first node mapping identifier of the verification execution node from a mapping space corresponding to the verification network in response to the target service data identifier being identified from the data location request, and perform, in a first order obtained by sorting node mapping identifiers in the mapping space in ascending order, data verification on the target service data identifier based on a resource location table associated with a first node address of the verification execution node, to obtain a first data verification result. The mapping space herein may include node mapping identifiers respectively corresponding to the M verification nodes. The node mapping identifiers herein are obtained by respectively mapping node addresses of the M verification nodes to the mapping space. The resource location table is configured for recording an adjacent node mapping identifier greater than the first node mapping identifier. An adjacent node address corresponding to the adjacent node mapping identifier is configured for storing a service data identifier of service data that is synchronized from a blockchain. The data verification result is configured for indicating whether the service data identifier obtained through synchronization includes the target service data identifier. The first data verification result is configured for indicating the verification execution node to: when it is determined that the service data identifier obtained through synchronization does not include the target service data identifier, obtain a node routing list corresponding to the verification execution node, and determine, as the second node mapping identifier, a routing node mapping identifier, among K routing node mapping identifiers recorded in the node routing list, that is found in a second order opposite to the first order and that has a shortest distance from the target service data identifier. K is a positive integer greater than 1, and K is less than or equal to a spatial influence parameter of the mapping space.

With reference to the embodiment corresponding to FIG. 3, when the verification execution node continues to perform addressing based on the node routing list, if it is determined that the second node mapping identifier of the target verification node is a node mapping identifier that is found in the second order and that has a shortest distance from the target service data identifier, the target verification node may receive the data location request that carries the target service data identifier and that is forwarded by the verification execution node.

In this embodiment of this disclosure, the verification execution nodes, the target verification nodes, and a target adjacent verification node are all verification nodes in the verification network, and these verification nodes (namely, the verification execution node, the target verification node, and the target adjacent verification node) are essentially verification nodes configured to perform data verification when the data location request is obtained at different moments.

In some embodiments, when the mapping space includes a ring mapping space, the verification execution node is further specifically configured to: when the target service data identifier is identified and obtained from the data location request, determine a first node mapping identifier of the verification execution node in the ring mapping space, and perform, in an addressing direction indicated in the ring mapping space, data verification on the target service data identifier based on a resource location table associated with a first node address of the first node mapping identifier, to obtain a first data verification result. The ring mapping space herein is a mapping space in a ring shape that is formed by connecting a smallest node mapping identifier and a largest node mapping identifier head to tail after the node mapping identifiers in the mapping space are sorted in ascending order. The addressing direction of the ring mapping space is determined based on a direction (for example, a clockwise direction along the ring mapping space) indicated by the first order obtained by sorting the node mapping identifiers in the mapping space in ascending order. When the resource location table is configured for recording adjacent node mapping identifiers, adjacent node addresses corresponding to these adjacent node mapping identifiers may be configured for storing service data identifiers of service data that are synchronized from the blockchain corresponding to the consensus network, for example, may be specifically synchronous data identifiers of on-chain synchronous data information that are synchronized from the blockchain. The adjacent node address herein may be a node address located after the first node address in the addressing direction, and the adjacent node mapping identifier is a node mapping identifier greater than the first node mapping identifier in the addressing direction. The first data verification result is configured for indicating the verification execution node to: when it is determined that the synchronous data identifiers of the on-chain synchronous data information do not include the target service data identifier, obtain a node routing list maintained by the verification execution node, and determine, as the second node mapping identifier of the target verification node, a routing node mapping identifier, among K routing node mapping identifiers included in the node routing list, that is found in an opposite direction of the addressing direction and that has a shortest distance from the target service data identifier. K is a positive integer greater than 1, and K is less than or equal to a spatial influence parameter of the ring mapping space.

For a specific addressing process for data verification on the verification execution node, refer to the embodiment corresponding to FIG. 3.

After receiving the data location request, the target verification node may also perform an addressing process similar to that performed by the verification execution node, for example, perform addressing based on a resource location table and a node routing list that are maintained by the target verification node.

Operation S202: Perform data verification on the target service data based on a second node address corresponding to the second node mapping identifier when it is determined, based on the data location request, that the second node mapping identifier is a node mapping identifier with a shortest distance from the target service data identifier in the first order.

After obtaining the data location request, the target verification node may perform addressing according to an addressing process similar to that performed by the verification execution node. Therefore, when performing addressing based on the data location request, the target verification node may further determine whether a node mapping identifier (namely, the second node mapping identifier) corresponding to the target verification node is a node mapping identifier with a shortest distance from the target service data identifier in the first order. Further, when it is determined that the second node mapping identifier is a node mapping identifier with a shortest distance from the target service data identifier in the first order, it can be determined that proof data for verifying authenticity of the target service data is stored at a node address of the target verification node. The proof data herein is on-chain verification information of the target service data that is synchronized from the blockchain.

The target service data is determined after a consensus node in the consensus network invokes target service processing data in the blockchain to perform a target service, and the target service data may include one or more of a target service execution result or target read/write status data that is associated with the target service. The target service herein is initiated by a second service node. For example, the target service herein may be a service submitted by the second service node to the consensus node. The second service node is included in the service network.

Each verification node in the verification network may synchronize a service data identifier of service data that is close to a node mapping identifier (or an address space) of the verification node, and may further synchronize on-chain verification information of the service data to verify authenticity of the service data. Based on this, the target verification node is used herein as an example for description. Specifically, the target verification node may obtain the target service data identifier and on-chain verification information of the target service data from the blockchain when the second node mapping identifier of the target verification node is a node mapping identifier with a shortest distance from the target service data identifier in the first order. For ease of differentiation, the on-chain verification information of the target service data herein may be referred to as target verification information. Then the target service data identifier and the target verification information that are obtained through synchronization may be stored.

In some embodiments, the target verification node may actively transmit a data synchronization request to the consensus node. After obtaining the second node mapping identifier of the target verification node from the data synchronization request, the consensus node may obtain a distance between the second node mapping identifier and the target service data identifier. If it is found that the second node mapping identifier is a node mapping identifier with a shortest distance from the target service data identifier in the first order, the consensus node may return, to the target verification node for storage, the target service data identifier and the target verification information of the target service data corresponding to the target service data identifier. Alternatively, in some embodiments, after the consensus node successfully adds the target service data to the blockchain, the consensus node may search for a node mapping identifier with a shortest distance from the target service data identifier in the first order among node mapping identifiers of all verification nodes that are recorded by the consensus node. When the found node mapping identifier is the second node mapping identifier, the consensus node may actively synchronize or configure the target service data identifier and the target verification information of the target service data to the target verification node corresponding to the second node mapping identifier for storage.

Each verification node may provide an external verification function. Therefore, after addressing is completed, a finally located verification node is a verification node that stores on-chain verification information (for example, verification information C2) for verifying authenticity of service data (for example, service data C1). The verification node may verify authenticity of the service data C1 based on the stored verification information C2.

Based on this, when the target verification node determines, based on the data location request, that the second node mapping identifier is a node mapping identifier with a shortest distance from the target service data identifier in the first order, the target verification node may perform data verification on the target service data based on the target verification information stored at the second node address, to obtain a second data verification result. Further, the target verification node may return, to a service object based on the second data verification result, first verification proof information corresponding to the target service data.

In some embodiments, when the mapping space includes a ring mapping space and the second node mapping identifier of the target verification node is a node mapping identifier with a shortest distance from the target service data identifier in an addressing direction, this can also indicate that the target verification information of the target service data is stored at the node address (namely, the second node address) of the target verification node. Therefore, the target verification node may perform data verification on the target service data based on the target verification information stored at the second node address, to obtain a second data verification result. Further, the target verification node may return, to a service object based on the second data verification result, first verification proof information corresponding to the target service data.

In this embodiment of this disclosure, verification nodes constitute, in the service network, the verification network by using a Chord DHT algorithm structure, and may be responsible for synchronizing on-chain verification information of service data corresponding to data identifiers close to node mapping identifiers (also referred to as node IDs) of the verification nodes. To be specific, a verification node in the verification network may synchronize on-chain verification information of service data corresponding to a data identifier within a spatial range (to be specific, a spatial range between a predecessor node and the verification node in the mapping space) that a node mapping identifier of the verification node falls within. The on-chain verification information includes but is not limited to a Merkle path of the service data, a node signature set related to the service data, time information such as a data timestamp or a validity period, data details (for example, some original text information required for the verification node), additional verification information required for data reading, and the like. Therefore, authenticity verification in this embodiment of this disclosure may include one or more verification methods, which are separately described below.

Alternatively, in an implementation, the target verification information may include a Merkle path associated with the target service data. The Merkle path herein is a path connecting the target service corresponding to the target service data to a Merkle tree root. The Merkle path includes a path hash value for participating in reconstruction of a Merkle tree corresponding to the Merkle tree root. Based on this, the target verification node may obtain the Merkle path from the target verification information stored at the second node address. In this way, when obtaining the service hash value of the target service data corresponding to this service (namely, the target service), the target verification node can further obtain, from the Merkle path, the path hash value for participating in reconstruction of the Merkle tree corresponding to the Merkle tree root. In this way, when obtaining the service hash value of the target service data and the path hash value in the Merkle path, the target verification node can further reconstruct the Merkle tree root based on the service hash value of the target service data and the path hash value in the Merkle path, and determine the reconstructed Merkle tree root as a verification tree root. Further, the target verification node may locate, based on the service hash value, a target block to which the target service data belongs, and then may determine a Merkle tree root obtained from block header information of the target block as a bench Merkle tree root. In other words, the target verification node in this embodiment of this disclosure may be further configured to synchronize, from the blockchain, the block header information of the target block to which the target service data belongs, and may further determine the Merkle tree root obtained from the block header information as the bench Merkle tree root, and then may compare the verification tree root with the bench Merkle tree root to obtain a tree root verification result. If the tree root verification result indicates that the verification tree root is consistent with the bench Merkle tree root, the target verification node may determine that tree root verification succeeds, to be specific, the target service data that the service object requests to verify actually exists in the blockchain. On the contrary, if the tree root verification result indicates that the verification tree root is inconsistent with the bench Merkle tree root, the target verification node may determine that tree root verification fails, to be specific, the target service data that the service object requests to verify does not exist in the blockchain. Subsequently, the target verification node may determine the second data verification result based on the tree root verification result.

In some embodiments, in an implementation, the target verification information may include a node signature set associated with the target block to which the target service data belongs. The node signature set may include node signature information obtained by each of G consensus nodes in the consensus network by signing the target block, where G is a positive integer. The G consensus nodes herein may constitute a consensus node committee. Correspondingly, the node signature set may also be referred to as a consensus node committee signature set (Quorum Certification, QC). The node signature set may include node signature information obtained by each consensus node participating in consensus among the G consensus nodes by signing the target block by using a node private key of the consensus node. Based on this, the target verification node may obtain node public keys respectively corresponding to the G consensus nodes, and then may perform node signature verification on the node signature information in the node signature set based on obtained G node public keys, to obtain a node signature verification result.

A node public key corresponding to a consensus node may be configured for verifying a piece of node signature information in the node signature set. For ease of understanding, verification of node signature information Q is used herein as an example for description. In a process of packaging the target block and adding it to the blockchain, a consensus node P may hash all block content (including the block header information and a block body) or a part of block content (for example, the block body) in the target block to obtain digest information H of the target block, and then may perform digital signing on the digest information H based on a node private key of the consensus node P to obtain the node signature information Q corresponding to the target block. Further, when obtaining the node signature information Q of the target block, the target verification node may obtain the node public key of the consensus node P, and then may perform node signature verification on the node signature information Q based on the node public key to obtain a corresponding signature verification sub-result. The target verification node may verify a digital signature in the node signature information Q based on the node public key of the consensus node P to obtain the digest information H of the target block, and may hash the same block content in the target block by using a hash algorithm same as that used by the consensus node P, to obtain digest information h of the target block. Further, the target verification node may compare the digest information H obtained through signature verification with the digest information h obtained through hashing, to obtain a signature verification sub-result. If the signature verification sub-result indicates that the digest information H is different from the digest information h, signature verification on the node signature information Q fails. If the signature verification sub-result indicates that the digest information H is the same as the digest information h, signature verification on the node signature information Q succeeds.

After node signature verification is performed on all the G pieces of node signature information in the node signature set, a signature verification sub-result corresponding to each pieces of node signature information can be obtained, and the G signature verification sub-results are used as a node signature verification result. When the G signature verification sub-results all indicate that the signature verification succeeds, the target verification node may determine that the signature verification on the node signature set succeeds. This indicates that the block content in the target block has not been maliciously tampered with and is true and effective. When the G signature verification sub-results include a signature verification sub-result indicating that the signature verification fails, the target verification node may determine that the signature verification on the node signature set fails. Subsequently, the target verification node may determine the second data verification result based on the node signature verification result.

In some embodiments, in an implementation, the target verification information may include first time association information associated with the target service data. The first time association information herein may include a data timestamp of the target service data. The data timestamp may be a service timestamp of the target service data, a timestamp present in data content of the target service data (for example, an issuance date in an electronic bill), or another verifiable timestamp. This is not limited in this embodiment of this disclosure. Based on this, the target verification node may obtain a verification timestamp of the target service data from the received data location request, and then may compare the verification timestamp with the data timestamp to obtain a timestamp verification result. If the timestamp verification result indicates that the verification timestamp is consistent with the data timestamp, the target verification node may determine that the timestamp verification succeeds, and the target service data is indeed service data at a specific moment. On the contrary, if the timestamp verification result indicates that the verification timestamp is inconsistent with the data timestamp, the target verification node may determine that the timestamp verification fails, and the target service data may have been tampered with or updated. Subsequently, the target verification node may determine the second data verification result based on the timestamp verification result.

In some embodiments, in an implementation, the target verification information may include second time association information associated with the target read/write status data. The second time association information herein may include a certificate validity period corresponding to a public key certificate of a consensus node in the consensus network. The target verification node needs to obtain a node public key of the consensus node when performing node signature verification on node signature information in the node signature set. The node public key may be obtained by synchronizing the public key certificate of the consensus node. Therefore, validity of the public key certificate needs to be verified before the node public key is used. Based on this, the target verification node may use, as a first public key certificate, the public key certificate of the consensus node that is synchronized from the blockchain. The first public key certificate includes a node public key for performing node signature verification on the node signature set associated with the target block to which the target service data belongs. Further, the target verification node may obtain usage duration of the first public key certificate, and then compare the usage duration of the first public key certificate with the certificate validity period to obtain a certificate validity verification result. In some embodiments, when the certificate validity verification result indicates that the usage duration is greater than or equal to the certificate validity period, the target verification node may determine that the first public key certificate is an invalid certificate. In this case, the target verification node may request the consensus node to update the certificate. Alternatively, in some embodiments, when the certificate validity verification result indicates that the usage duration is less than the certificate validity period, the target verification node may determine that the first public key certificate is a valid certificate. Subsequently, the target verification node may determine the second data verification result based on the certificate validity verification result. In addition, the second time association information herein may further include validity periods of some data states, and related verification may also be performed. These data states may change. After a data state expires, the state may still be updated in intelligent processing data (namely, the target service processing data) deployed in the blockchain.

Both the first time association information and the second time association information are included in time information associated with the target service data, and other time information may also be used for related verification. This is not limited herein.

In addition, if specific data is allowed to be verified, a corresponding service node registers its own node address (for example, an IP address) with the blockchain, and may authorize accessibility of its service data. A consensus node may also update, in real time, node addresses that have been registered with the blockchain. Correspondingly, a verification node in the verification network stores a node address of a service node corresponding to a data hash value of each piece of service data (namely, the foregoing service data identifier of service data) (in other words, stores a node address of a service node that stores service data corresponding to the data identifier). In this way, when original text of specific service data needs to be verified, the verification node may access a specific service node based on a stored node address of the service node. Based on this, taking the second service node as an example, the second service node stores original data information of the target service data that is synchronized from a consensus node. The original data information may be specific original content (for example, some fields, official seals, signatures, or pictures) of the target service data, rather than a processed overall hash value. For example, original data information of an electronic bill may include a bill number, a title, or the like of the electronic bill. Because the original data information is private data, an original text verification capability is provided only under authorization by a data owner (namely, the second service node). Assuming that the target verification information includes additional reading information. The additional reading information is determined after a consensus node invokes the target service processing data to perform permission registration on original text authorization information submitted by the second service node. To be specific, the second service node may submit the original text authorization information to the consensus node if the second service node authorizes access to and verification on the original data information of the target service data. The original text authorization information may include a node address, verification configuration information, and the like of the second service node. Then the second service node may register its node address with the target service processing data through the consensus node, and set data that supports original text verification. The additional reading information may be some additional information required for reading data from the second service node. For example, the second service node has set a large amount of service data that supports original text verification, and it may be difficult to perform blind search. In this case, original data information within a specific time period or a specific region that is specifically required may be searched for based on a reading time range or a reading region range indicated by the additional reading information. The additional reading information may further include other additional information. Specific content of the additional reading information is not limited herein.

When the data verification is original text verification on the original data information of the target service data, the target verification node may obtain a node address of a service node on which the original data information of the target service data is stored, and when the obtained node address of the service node is the node address of the second service node, may transmit, based on the additional reading information, an original text verification request for the target service data to the second service node corresponding to the service node address. Correspondingly, after receiving the original text verification request, the second service node may determine the original data information of the target service data based on the additional reading information, and may perform original text verification on the target service data based on the original data information to obtain a third data verification result, and may return, to the service object based on the third data verification result, second verification proof information corresponding to the target service data.

For example, for an electronic bill C, when a bill number of the electronic bill C needs to be verified, the second service node may obtain a verification bill number from a related original text verification request, and may obtain, based on additional reading information, an original bill number from original data information that is synchronized, through clearing, from the blockchain, and then may compare the verification bill number with the original bill number and use a comparison result obtained through the comparison as the third data verification result used for original text verification on the target service data (namely, the bill number of the electronic bill C).

Alternatively, in some embodiments, the target verification node may return the node address of the service node to the service object. Then the service object may re-initiate, through the first service node, an original text verification request for the target service data to the second service node corresponding to the node address of the service node.

In addition, assuming that no verification node storing the target verification information is finally found among the M verification nodes in the entire addressing process, the data location request carrying the target service data identifier may be forwarded to a consensus node in the consensus network, so that the consensus node verifies authenticity of the target service data.

Each consensus node is a full node and stores the required target verification information. Therefore, authenticity of the target service data can be verified without addressing in the consensus network. In this embodiment of this disclosure, the verification network is isolated from the consensus network. This can prevent a query request from repeatedly entering the consensus network and affecting core performance of the consensus network. In addition, computing resources of the service network can be fully utilized.

In view of reliability, when a consensus node transmits verification information of service data to a target verification node with a shortest hash distance from a service data identifier of the service data, the consensus node may also transmit the verification information of the same service data to other two or three verification nodes with a shortest hash distance from the service data identifier of the service data for backup storage. In this way, when a nearest verification node (for example, the target verification node) fails or verification information stored on the verification node is damaged, an attempt may be made to search another verification node (namely, a backup verification node) on which the verification information is backed up. For example, a verification node with a shortest hash distance from the service data identifier of the service data is the target verification node. If a node status of the target verification node is an ineffective state or the target verification information stored on the target verification node is damaged information, the data location request carrying the target service data identifier may be forwarded to a backup verification node. A node mapping identifier of the backup verification node herein is a node mapping identifier, other than the second node mapping identifier, that has a shortest distance from the target service data identifier in the addressing direction, and the backup verification node is configured to back up the target verification information. The data location request may be configured for indicating the backup verification node to perform data verification on the target service data based on the backed-up target verification information. Even if some service nodes fail and cannot perform original text verification, the verification network can still ensure long-term verifiability of service data and historical data through backup storage on several verification nodes.

In addition, this embodiment of this disclosure may further provide a data maintenance function for the verification network. The target verification node is still used as an example. Specifically, a verifiable timestamp (for example, a timestamp T1) of the target service data may be determined based on the target service processing data (for example, electronic bill processing data). Further, the target verification node may obtain a verification time limit event generated by a consensus node based on the verifiable timestamp of the target service data. When the verifiable timestamp in the verification time limit event is obtained, if it is detected that a data timestamp (for example, a timestamp T2) of the target service data is earlier than the verifiable timestamp, the target verification node may determine that the target service data is no longer verifiable. In this case, the target service data identifier and the target verification information that are stored on the target verification node may be cleared.

For example, it is assumed that electronic bill processing data in a blockchain electronic bill system determines that a verifiability time limit of an electronic bill is three years, in other words, an electronic bill is verifiable within three years. In this case, a consensus node periodically broadcasts a corresponding verification time limit event D1. A verification node D3 responsible for verifying an electronic bill D2 may determine a verifiable timestamp of the electronic bill D2 based on a verifiability time limit in the verification time limit event D1. For example, it is assumed that the verifiable timestamp is Jan. 1, 2020, and an issuance date of the electronic bill D2 is Dec. 1, 2019. In this case, the verification node D3 may clear a data identifier and verification information that are related to the electronic bill D2.

In the addressing algorithm used in this embodiment of this disclosure, addressing can be implemented through jumping to a few verification nodes. This can improve addressing efficiency for a verification node, and therefore can improve verification efficiency for service data. After addressing succeeds, a finally located verification node may verify authenticity of service data, and may access a related service node when original text needs to be verified. In this way, the verification network is separated from service SPV nodes. This can provide a stable blockchain data verification service while ensuring privacy of service data. In addition, during verification, functions of automatic go-online/offline, data maintenance, data addressing, and routing may be provided for nodes in the verification network based on the Chord protocol, to ensure integrity and availability of the entire verification network. Even if a service SPV node fails, the verification network can still ensure long-term verifiability of service data and historical data.

Figure 5:
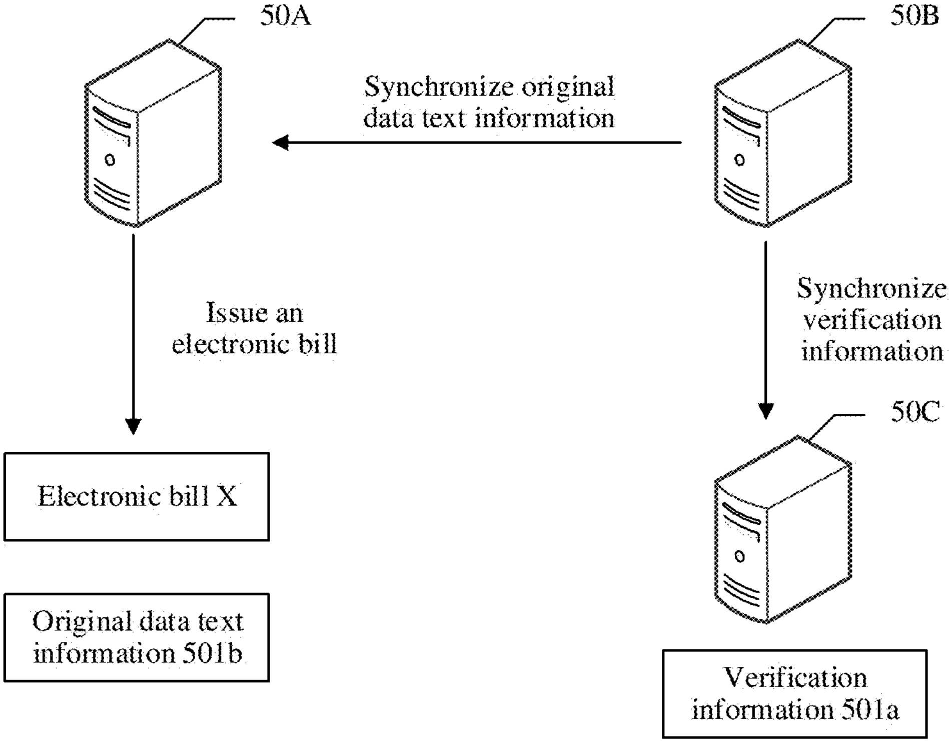
FIG. 5 is a schematic diagram of a scenario of blockchain electronic bill verification according to an embodiment of this disclosure.

For ease of understanding, further, FIG. 5 is a schematic diagram of a scenario of blockchain electronic bill verification according to an embodiment of this disclosure. A service node 50A shown in FIG. 5 may serve as the second service node. For example, the service node 50A may be any service node in the service network 110 shown in FIG. 1. A consensus node 50B may be any consensus node in the consensus network 200*a*. A verification node 50C may serve as the target verification node. For example, the verification node 50C may be any verification node in the verification network 120 shown in FIG. 1. As shown in FIG. 5, it is assumed that the service node 50A obtains an electronic bill X (namely, the target service data) after performing an invoicing service, and hash(X)=y, to be specific, a data identifier of the electronic bill X is y (namely, the target service data identifier). In this case, after writing the electronic bill X to a corresponding blockchain the consensus node 50B may asynchronously synchronize, through a peer-to-peer network, verification information 501*a* (namely, the target verification information, which may include a Merkle path, a node signature set, or the like associated with the electronic bill X) of the electronic bill X in the blockchain to the verification node 50C with a shortest hash distance from y. In this case, a node mapping identifier of the verification node 50C is a node mapping identifier with a shortest distance from y in an addressing direction indicated in a corresponding ring mapping space. Then the verification node 50C may store the verification information 501*a*. In view of reliability, in addition to the verification node 50C, the consensus node 50B also transmits the verification information 501*a* to two or three verification nodes (namely, the backup verification node) with a shortest hash distance from y for backup storage. The service node 50A synchronizes only original data information 501*b* (for example, a bill number or a title of electronic bill X) of the electronic bill X.

Figure 6:
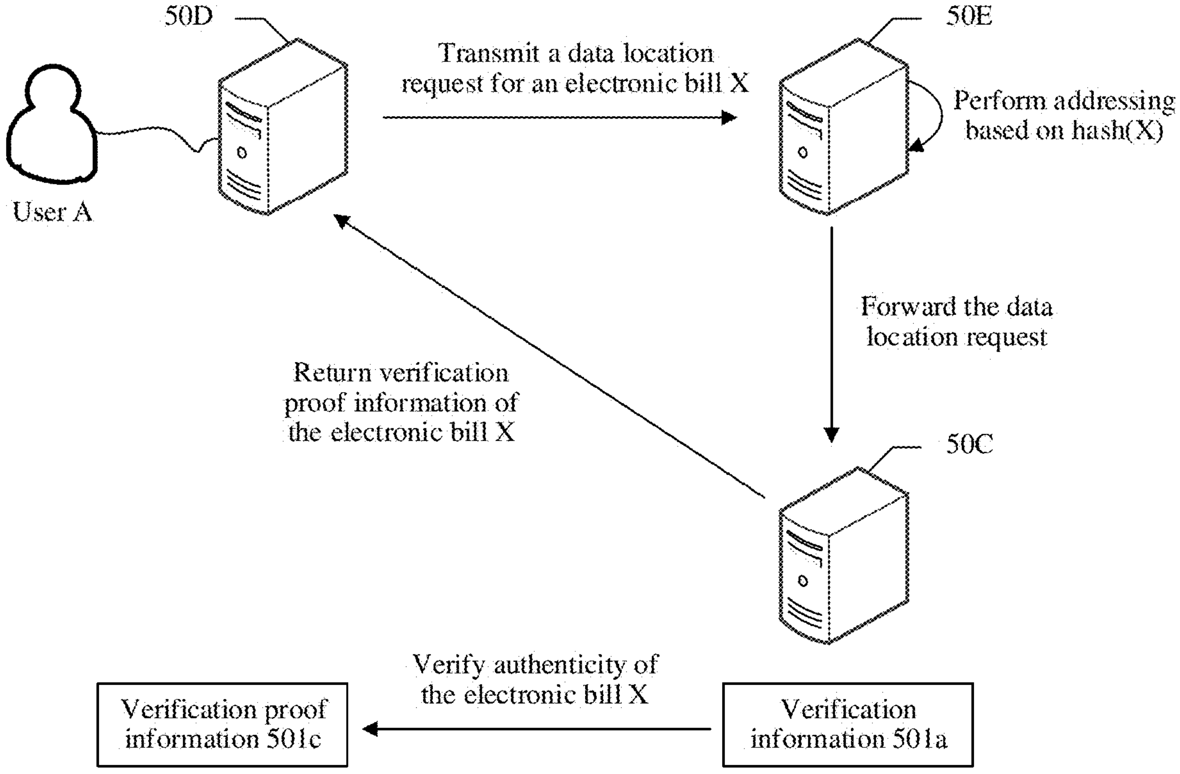
FIG. 6 is a schematic diagram of another scenario of blockchain electronic bill verification according to an embodiment of this disclosure.

Further, FIG. 6 is a schematic diagram of another scenario of blockchain electronic bill verification according to an embodiment of this disclosure. As shown in FIG. 6, with reference to the embodiment corresponding to FIG. 5, it is assumed that a user A (namely, the service object) obtains the electronic bill X and wants to verify authenticity of the electronic bill X in a chain (namely, the blockchain). In this case, the user A may transmit, through a service node 50D in the service network, a data location request for the electronic bill X to a verification node 50E in the verification network, to entrust the verification node 50E to provide the user A with a verification proof for authenticity of the electronic bill X. The service node 50D may serve as the first service node. For example, the service node 50D may be any service node in the service network 110 shown in FIG. 1. The verification node 50E may serve as the verification execution node. For example, the verification node 50E may be any verification node in the verification network 120 shown in FIG. 1.

After receiving the data location request for the electronic bill X, the verification node 50E may use the data identifier (namely, hash (X)) of the electronic bill X for addressing, to find the verification node 50C that stores the verification information 501*a* of the electronic bill X in the verification network, and then may forward the data location request to the verification node 50C. For a specific process of addressing, refer to the embodiment corresponding to FIG. 3. Further, the verification node 50C may perform data verification on the electronic bill X based on the stored verification information 501*a* to verify authenticity of the electronic bill X, and generate verification proof information 501*c*

(namely, a verification proof, where the verification proof may be specifically the first verification proof information) corresponding to the electronic bill X, and then return the verification information 501*c* to the service node 50D associated with the user A. For a specific process of authenticity verification, refer to related descriptions in the embodiment corresponding to FIG. 4.

A node address 501*d* of the service node 50A (namely, the node address of the service node, which may be specifically, for example, an IP address of the service node 50A) corresponding to the electronic bill X may be recorded on the verification node 50C. If the service node 50A (namely, the second service node) previously allows original text of the electronic bill X to be verified, data that supports original text verification has been registered and set in corresponding electronic bill processing data. Assuming that current verification on the electronic bill X involves the original text (for example, some fields in the original text, rather than the overall hash value, are to be verified), the verification node 50C may jump to the service node 50A to perform verification related to the original text.

Figure 7:
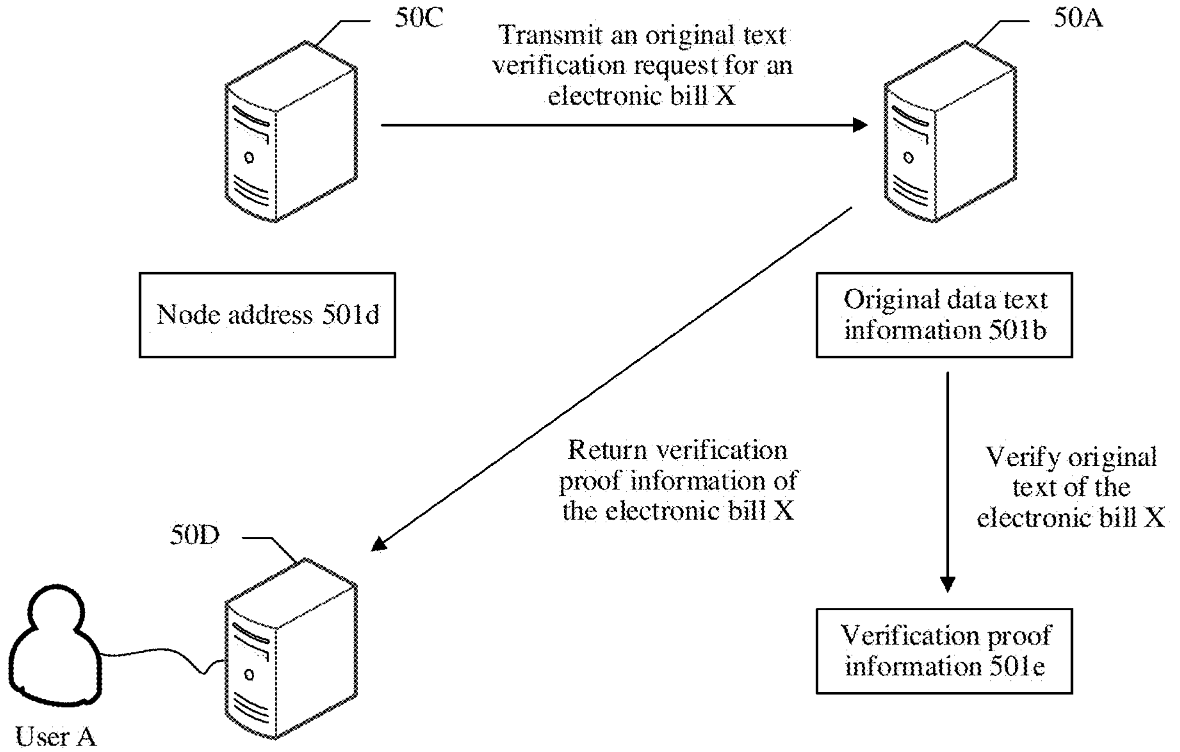
FIG. 7 is a schematic diagram of still another scenario of blockchain electronic bill verification according to an embodiment of this disclosure.

For ease of understanding, further refer to FIG. 7. FIG. 7 is a schematic diagram of still another scenario of blockchain electronic bill verification according to an embodiment of this disclosure. As shown in FIG. 7, with reference to the embodiments corresponding to FIG. 5 and FIG. 6, the verification node 50C may transmit an original text verification request for the electronic bill X to the service node 50A. Then the service node 50A may perform original text verification on the electronic bill X based on the original data information 501*b* of the electronic bill X, and may return, to the service node 50D associated with the user A, verification proof information 501*e* (namely, a verification proof, where in this case, the verification proof may be the second verification proof information) corresponding to the electronic bill X. For a specific process of original text verification, refer to related descriptions in the embodiment corresponding to FIG. 4.

In addition, if no effective verification node storing the verification information 501*a* of the electronic bill X is found through addressing, fallback is performed to request a consensus node (for example, the consensus node 50B) in the consensus network to verify authenticity of the electronic bill X. Then the consensus node may use related verification information in the blockchain to verify authenticity of the electronic bill X.

The verification network in this embodiment of this disclosure includes SPV nodes that are stably online for a long time and may be run by an official or authoritative alliance member. Before a node joins the verification network, the node needs to meet the following condition (namely, the verification network joining condition): Continuous online duration meets a specific threshold, a ping return delay is less than 10 ms, or the like. Otherwise, the node performs only general SPV functions without joining the Chord DHT verification network. In addition, an SPV node that joins the verification network can obtain a verification reward based on a quantity of times of providing a verification service.

In addition, a verifiability time limit (for example, verifiable within three years) of an electronic bill may be determined by electronic bill processing data in the system. In this case, the consensus network periodically broadcasts the verifiability time limit, and a verification node in the verification network may clear data based on the verifiability time limit.

In the addressing algorithm used in this embodiment of this disclosure, addressing can be implemented through jumping to a few verification nodes. This can improve addressing efficiency for a verification node, and therefore can improve verification efficiency for service data. After addressing succeeds, a finally located verification node may verify authenticity of service data, and may access a related service node when original text needs to be verified. In this way, the verification network is separated from service SPV nodes. This can provide a stable blockchain data verification service while ensuring privacy of service data. In addition, during verification, functions of automatic go-online/offline, data maintenance, data addressing, and routing may be provided for nodes in the verification network based on the Chord protocol, to ensure integrity and availability of the entire verification network. Even if a service SPV node fails, the verification network can still ensure long-term verifiability of service data and historical data.

Figure 8:
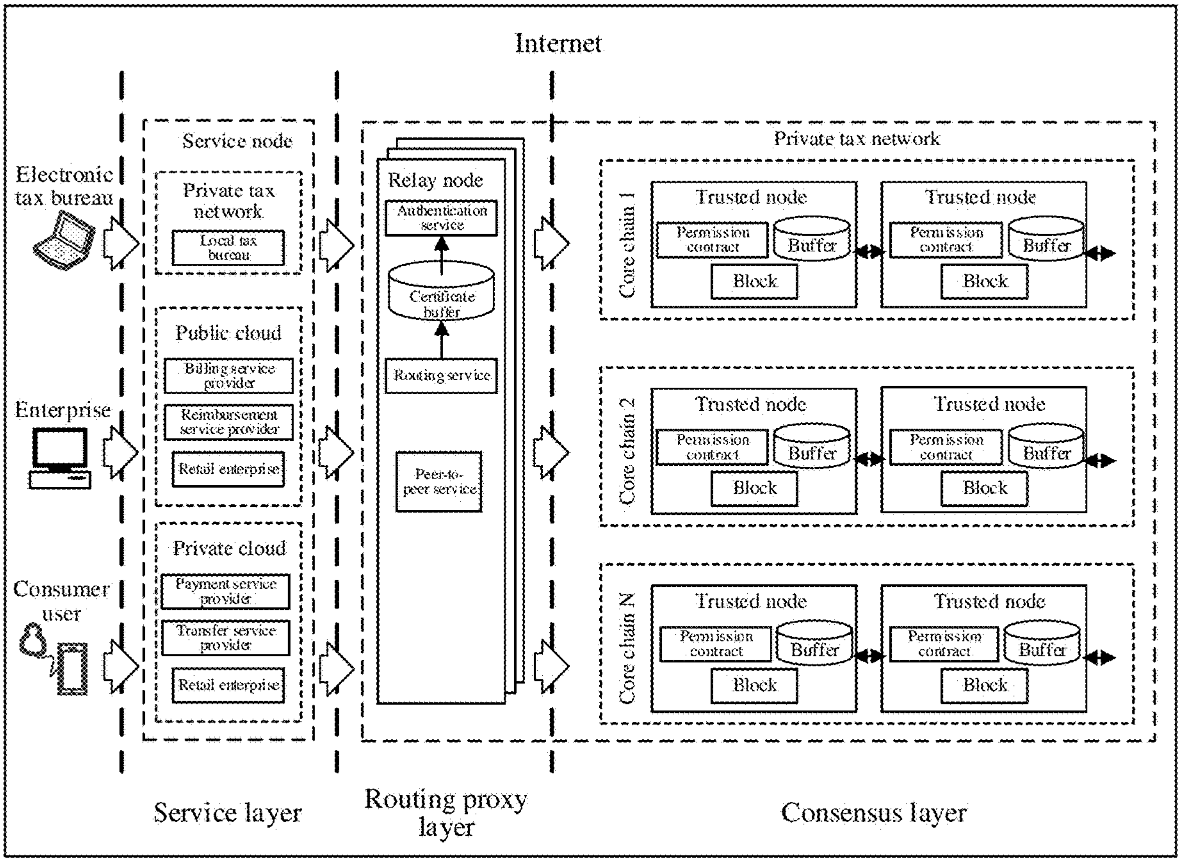
FIG. 8 is a diagram of a system architecture in a blockchain electronic bill scenario according to an embodiment of this disclosure.

For ease of understanding, further, FIG. 8 is a diagram of a system architecture in a blockchain electronic bill scenario according to an embodiment of this disclosure. As shown in FIG. 8, in this embodiment of this disclosure, a service layer, a routing proxy layer, and a consensus layer constitute an entire blockchain service system. A core chain 1, a core chain 2, . . . , and a core chain N shown in FIG. 8 are target blockchains maintained by tax bureaus in different regions. In this embodiment of this disclosure, service data (for example, service data Y) may include a service execution result and read/write status data that are generated during execution of a bill service (for example, an electronic bill transfer service).

When a blockchain is used in some scenarios of government agencies (for example, a tax system) or commercial organizations, to improve confidentiality and security of data, a hierarchical blockchain structure of "service network-consensus network" (namely, the hierarchical chain network) in the embodiments of this disclosure may be used, to adapt to specific requirements (for example, separation between internal and external networks or between a service network and an office network) of practical network layouts of blockchain production lines in related industries, and ensure efficient execution of a core consensus algorithm.

The service layer is located in a witness network (namely, the service network). Service nodes at the service layer may include a terminal device corresponding to an electronic tax bureau, a terminal device corresponding to an enterprise user, and a terminal device corresponding to a consumer user. The electronic tax bureau may be a local tax bureau in a private tax bureau network. The enterprise user may be a billing service provider, a reimbursement service provider, a retail enterprise (for example, KA enterprises, namely, a large retail customer and a key retail enterprise customer), or the like in a public cloud. The consumer user may be a payment service provider, a transfer service provider, a retail enterprise, or the like in a private cloud. A plurality of service nodes in the service network are all second-type service nodes, and a first-type service node herein is a service node selected from the plurality of service nodes included in the service network to perform a data verification service. To be specific, the first-type service node herein is mainly configured to synchronize a service data identifier of service data (for example, a hash value of the service data) that is close to an address space (which may be indicated by a corresponding node mapping identifier) of the node, and provide a verification function. The second-type service node is mainly configured to synchronize, through a consensus node, service data related to the second-type service node when performing the foregoing clearing and synchronization operation.

N relay nodes (namely, routing nodes) at the routing proxy layer may be used for network isolation between the service layer and the consensus layer. Each relay node may have a peer-to-peer service, a routing service, a certificate buffer, and an authentication service. The peer-to-peer service is a service in a peer-to-peer network. Based on a specific network protocol, no central node is required among network nodes in the peer-to-peer network to maintain a network status. Instead, each node maintains a node status of the entire network or a connection status of a neighboring node through broadcast interaction with the neighboring node. The routing service is a basic function of a node and may be used for communication between nodes. A certificate associated with the certificate buffer may be a public key certificate system (Public Key Infrastructure, PKI). In the certificate system, a certificate is an identity of a public key owner and is issued by a certificate authority (CA). The authentication service may be configured to verify a data format of received data, node validity, and the like. In this embodiment of this disclosure, the relay node may forward service data submitted by the second-type service node (for example, the second service node) to the consensus node.

The consensus node (namely, an accounting node) at the consensus layer may be a trusted node in a private tax network. Each consensus node has a packaging capability. To be specific, the consensus node may package service data that has passed consensus into a block, and store related read/write status data; or package a service execution result and read/write status data into a block, to successfully write the data to a target blockchain at the consensus layer.

In this embodiment of this disclosure, when the verification network is introduced into the service layer at which the service network is located, a data verification function may be provided for any service node in the service network through M verification nodes in the verification network. For a verification execution node in the verification network, when the verification execution node continues to perform addressing based on the node routing list, if it is determined that a second node mapping identifier of a target verification node is a node mapping identifier that is found in a second order and that has a shortest distance from a target service data identifier, the target verification node may receive a data location request that carries the target service data identifier and that is forwarded by the verification execution node. Then the target verification node may further verify authenticity of target service data when determining, based on the data location request, that the second node mapping identifier is a node mapping identifier with a shortest distance from the target service data identifier in an addressing direction. In this embodiment of this disclosure, a node mapping processing and an addressing operations may be performed in the verification network deployed at the service layer, to help the verification execution node to quickly locate the target verification node in a ring mapping space corresponding to the verification network, and then addressing can be implemented through jumping to the target verification node. This can improve addressing efficiency for a verification node, and therefore can improve verification efficiency for service data. Further, after the addressing succeeds, the target verification node may further verify authenticity of service data, and may access a related service node when original text needs to be verified. The verification network is separated from the service network in which service SPV nodes are located, to provide a stable blockchain data verification service through the verification network while ensuring privacy of service data stored on service nodes in the service network. In addition, during verification, it can be ensured, based on the Chord protocol, that verification nodes in the verification network can implement functions such as automatic go-online/offline, data maintenance, data addressing, and routing, to ensure integrity and availability of the entire verification network.

Figure 9:
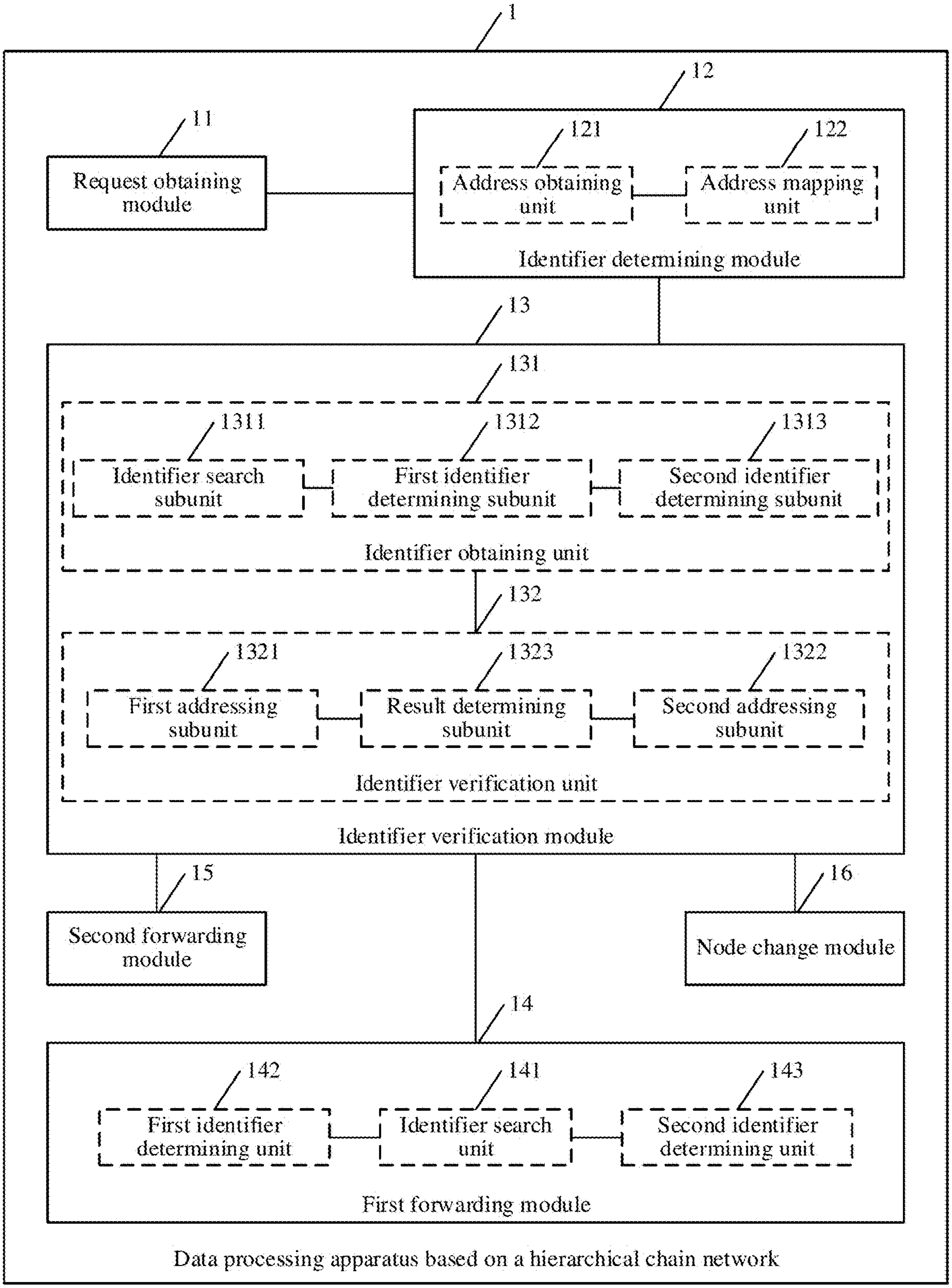
FIG. 9 is a schematic structural diagram of a data processing apparatus based on a hierarchical chain network according to an embodiment of this disclosure.

FIG. 9 is a schematic structural diagram of a data processing apparatus based on a hierarchical chain network according to an embodiment of this disclosure. As shown in FIG. 9, the data processing apparatus 1 based on the hierarchical chain network may be applied to a verification execution node. The verification execution node is a verification node for performing data verification among M verification nodes. For example, the verification execution node may be the verification node 120*a* in the embodiment corresponding to FIG. 1. The data processing apparatus 1 based on the hierarchical chain network may be a computer program (including program code) that is run on a blockchain node (for example, the verification node 120*a*). For example, the data processing apparatus 1 based on the hierarchical chain network is application software. The data processing apparatus 1 based on the hierarchical chain network may be configured to perform corresponding operations in the data processing method based on the hierarchical chain network in the embodiments of this disclosure. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network, where M is a positive integer. The M verification nodes include a verification execution node for performing data verification. The method is performed by the verification execution node included in the M verification nodes.

As shown in FIG. 9, the data processing apparatus 1 based on the hierarchical chain network may include a request obtaining module 11, an identifier determining module 12, an identifier verification module 13, a first forwarding module 14, a second forwarding module 15, and a node change module 16.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The request obtaining module 11 is configured to obtain a data location request transmitted by a first service node in the service network for target service data.

The identifier determining module 12 is configured to determine a first node mapping identifier of the verification execution node from a mapping space corresponding to the verification network in response to a target service data identifier of the target service data being identified from the data location request. The mapping space includes node mapping identifiers respectively corresponding to the M verification nodes. The node mapping identifiers are obtained by respectively mapping node addresses of the M verification nodes to the mapping space.

The mapping space includes a ring mapping space, and the target service data identifier is obtained by mapping the target service data to the ring mapping space.

The identifier determining module 12 may include an address obtaining unit 121 and an address mapping unit 122.

The address obtaining unit 121 is configured to obtain a first node address of the verification execution node when the target service data identifier of the target service data is identified from the data location request.

The address mapping unit 122 is configured to map the first node address to the ring mapping space to obtain the first node mapping identifier of the verification execution node.

The address mapping unit 122 is specifically configured to obtain a hash mapping function associated with the ring mapping space, and hash the first node address based on the hash mapping function to obtain the first node mapping identifier of the verification execution node.

The hash mapping function is further configured for hashing the target service data to obtain the target service data identifier of the target service data.

For specific implementations of the address obtaining unit 121 and the address mapping unit 122, refer to the descriptions of operation S102 in the embodiment corresponding to FIG. 3.

The identifier verification module 13 is configured to perform, in a first order obtained by sorting the node mapping identifiers in ascending order, data verification on the target service data identifier based on a resource location table associated with a first node address of the verification execution node, to obtain a first data verification result. The resource location table is configured for recording an adjacent node mapping identifier greater than the first node mapping identifier. An adjacent node address corresponding to the adjacent node mapping identifier is configured for storing a service data identifier of the service data that is synchronized from the blockchain. The data verification result is configured for indicating whether the service data identifier obtained through synchronization includes the target service data identifier.

The identifier verification module 13 includes an identifier obtaining unit 131 and an identifier verification unit 132.

The identifier obtaining unit 131 is configured to obtain, in the first order obtained by sorting the node mapping identifiers in ascending order, the resource location table associated with the first node address of the verification execution node.

The identifier obtaining unit 131 is further configured to determine a target adjacent verification node mapping identifier from adjacent node mapping identifiers included in the resource location table.

A quantity of adjacent node mapping identifiers is N, and N is a positive integer greater than 1.

The identifier obtaining unit 131 may include an identifier search subunit 1311, a first identifier determining subunit 1312, and a second identifier determining subunit 1313.

The identifier search subunit 1311 is configured to search, in the first order among the N adjacent node mapping identifiers, for an adjacent node mapping identifier corresponding to the node address next to the first node address, and use the found adjacent node mapping identifier corresponding to the node address next to the first node address as a first adjacent node mapping identifier.

The first identifier determining subunit 1312 is configured to obtain a node status of a first adjacent verification node corresponding to the first adjacent node mapping identifier, and if the node status of the first adjacent verification node is an effective state, use the first adjacent node mapping identifier as the target adjacent verification node mapping identifier.

The second identifier determining subunit 1313 is configured to: if the node status of the first adjacent verification node is an ineffective state, determine the target adjacent verification node mapping identifier in the first order from (N−1) adjacent node mapping identifiers other than the first adjacent node mapping identifier.

For specific implementations of the identifier search subunit 1311, the first identifier determining subunit 1312, and the second identifier determining subunit 1313, refer to the descriptions of operation S103 in the embodiment corresponding to FIG. 3.

The identifier verification unit 132 is configured to perform data verification on the target service data identifier based on the first node mapping identifier and the target adjacent verification node mapping identifier to obtain the first data verification result.

The service data identifier obtained through synchronization includes a target synchronous data identifier. The target synchronous data identifier is a target synchronous data identifier of target on-chain synchronous data information that is synchronized from the blockchain and that is stored at the target adjacent verification node address corresponding to a target adjacent verification node mapping identifier.

The identifier verification unit 132 may include a first addressing subunit 1321, a second addressing subunit 1322, and a result determining subunit 1323.

The first addressing subunit 1321 is configured to: if the target service data identifier falls within a spatial range determined based on the first node mapping identifier and the target adjacent verification node mapping identifier, determine that the target adjacent verification node mapping identifier is a node mapping identifier with a shortest distance from the target service data identifier in the first order, and determine that the target synchronous data identifier includes the target service data identifier. The distance is a hash distance obtained by performing an exclusive OR operation on the target adjacent verification node mapping identifier and the target service data identifier when the target adjacent verification node mapping identifier and the target service data identifier are hash values with a same length.

The second addressing subunit 1322 is configured to: if the target service data identifier is beyond the spatial range determined based on the first node mapping identifier and the target adjacent verification node mapping identifier, determine that the target synchronous data identifier does not include the target service data identifier.

The result determining subunit 1323 is configured to use, as the first data verification result, a data verification result obtained when the target synchronous data identifier includes the target service data identifier or a data verification result obtained when the target synchronous data identifier does not include the target service data identifier.

For specific implementations of the first addressing subunit 1321, the second addressing subunit 1322, and the result determining subunit 1323, refer to the descriptions of operation S103 in the embodiment corresponding to FIG. 3.

For specific implementations of the identifier obtaining unit 131 and the identifier verification unit 132, refer to the descriptions of operation S103 in the embodiment corresponding to FIG. 3.

The first forwarding module 14 is configured to obtain a node routing list corresponding to the verification execution node in response to the first data verification result indicating that the service data identifier obtained through synchronization does not include the target service data identifier. The node routing list is configured for recording K routing node mapping identifiers. The routing node mapping identifier is a node mapping identifier of a verification node that has a preset distance from the first node mapping identifier in the mapping space. K is a positive integer greater than 1, and K is less than or equal to a spatial influence parameter of the mapping space.

The first forwarding module 14 is further configured to determine, as a second node mapping identifier, a routing node mapping identifier among the K routing node mapping identifiers that is found in a second order opposite to the first order and that has a shortest distance from the target service data identifier in the mapping space.

The first forwarding module 14 is further configured to transmit a data location request to a target verification node corresponding to the second node mapping identifier, to enable the target verification node to perform data verification on the target service data.

The first forwarding module 14 may include an identifier search unit 141, a first identifier determining unit 142, and a second identifier determining unit 143.

The identifier search unit 141 is configured to: determine a second order opposite to the first order in the ring mapping space, determine a direction indicated by the second order as an opposite direction of the addressing direction, search, among the K routing node mapping identifiers, for a routing node mapping identifier with a longest distance from the first node mapping identifier in the opposite direction of the addressing direction, and use the found routing node mapping identifier as a first routing node mapping identifier.

The first identifier determining unit 142 is configured to: if the first routing node mapping identifier falls within a spatial range determined based on the first node mapping identifier and the target service data identifier, determine that the first routing node mapping identifier is a node mapping identifier with a shortest distance from the target service data identifier in the opposite direction of the addressing direction, and use the first routing node mapping identifier as the second node mapping identifier.

The second identifier determining unit 143 is configured to: if the first routing node mapping identifier is beyond the spatial range determined based on the first node mapping identifier and the target service data identifier, determine the second node mapping identifier from (K−1) routing node mapping identifiers other than the first routing node mapping identifier.

For specific implementations of the identifier search unit 141, the first identifier determining unit 142, and the second identifier determining unit 143, refer to the descriptions of operation S105 in the embodiment corresponding to FIG. 3.

The second forwarding module 15 is configured to: when the first data verification result indicates that the target synchronous data identifier includes the target service data identifier, forward the data location request carrying the target service data identifier to a target adjacent verification node corresponding to the target adjacent verification node mapping identifier. The data location request is configured for indicating the target adjacent verification node to perform data verification on the target service data. A node address of the target adjacent verification node is the target adjacent verification node address.

The node change module 16 is configured to: transmit a node query request to a first adjacent verification node, the node query request being configured for indicating the first adjacent verification node to return a predecessor node mapping identifier corresponding to the node address located before a node address corresponding to a first adjacent node mapping identifier in the first order; and if the predecessor node mapping identifier is different from the first node mapping identifier, update, based on the predecessor node mapping identifier, a resource location table and a node routing list maintained by the verification execution node.

For specific implementations of the request obtaining module 11, the identifier determining module 12, the identifier verification module 13, the first forwarding module 14, the second forwarding module 15, and the node change module 16, refer to the descriptions of operation S101 to operation S106 in the embodiment corresponding to FIG. 3.

Figure 10:
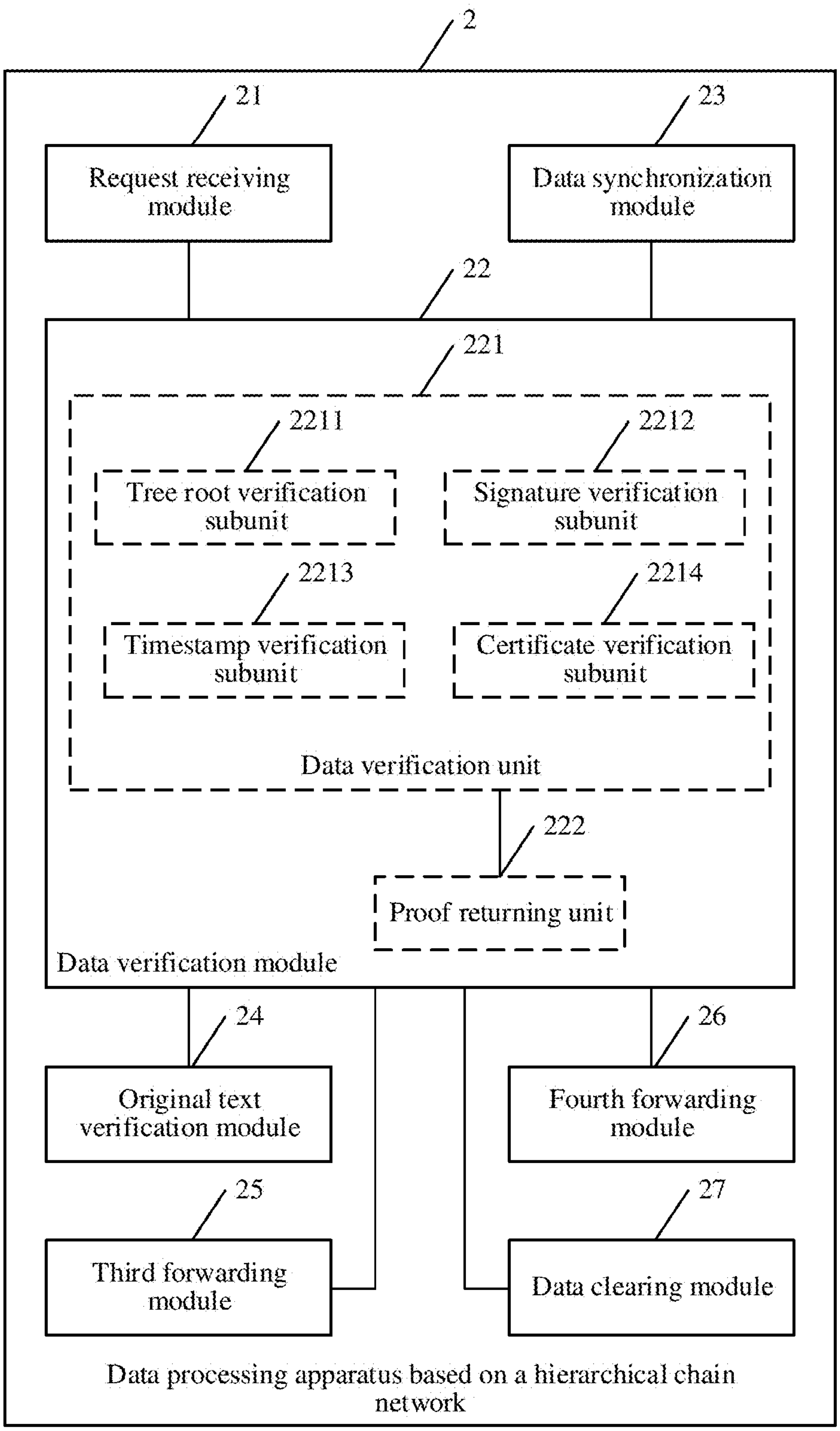
FIG. 10 is a schematic structural diagram of another data processing apparatus based on a hierarchical chain network according to an embodiment of this disclosure.

FIG. 10 is a schematic structural diagram of another data processing apparatus based on a hierarchical chain network according to an embodiment of this disclosure. As shown in FIG. 10, the data processing apparatus 2 based on the hierarchical chain network may be applied to a target verification node. The target verification node may be specifically any verification node in a verification network (for example, the verification network 120). For example, the target verification node may be the verification node 120*b* in the embodiment corresponding to FIG. 1. The data processing apparatus 2 based on the hierarchical chain network may be a computer program (including program code) that is run on a blockchain node (for example, the verification node 120*b*). For example, the data processing apparatus 2 based on the hierarchical chain network is application software. The data processing apparatus 2 based on the hierarchical chain network may be configured to perform corresponding operations in the data processing method based on the hierarchical chain network in the embodiments of this disclosure. The hierarchical chain network includes a verification network, a service network, and a consensus network. Both the verification network and the service network are deployed at a service layer of the hierarchical chain network. The consensus network is deployed at a consensus layer independent of the service layer. A blockchain maintained by the consensus network is configured to store service data of a service submitted by a service node in the service network. M verification nodes are deployed in the verification network, where M is a positive integer. The target verification node is included in the M verification nodes.

As shown in FIG. 10, the data processing apparatus 2 based on the hierarchical chain network may include a request receiving module 21, a data verification module 22, a data synchronization module 23, an original text verification module 24, a third forwarding module 25, a fourth forwarding module 26, and a data clearing module 27.

The request receiving module 21 is configured to obtain a data location request that carries a target service data identifier and that is forwarded by a verification execution node based on a second node mapping identifier. The verification execution node is included in the M verification nodes. The data location request is a request transmitted by a first service node for target service data corresponding to the target service data identifier.

The first service node is any service node in the service network. The verification execution node is configured to determine a first node mapping identifier of the verification execution node from a mapping space corresponding to the verification network in response to the target service data identifier being identified from the data location request, and perform, in a first order obtained by sorting node mapping identifiers in the mapping space in ascending order, data verification on the target service data identifier based on a resource location table associated with a first node address of the verification execution node, to obtain a first data verification result. The mapping space includes node mapping identifiers respectively corresponding to the M verification nodes. The node mapping identifiers are obtained by respectively mapping node addresses of the M verification nodes to the mapping space. The resource location table is configured for recording an adjacent node mapping identifier greater than the first node mapping identifier. An adjacent node address corresponding to the adjacent node mapping identifier is configured for storing a service data identifier of the service data that is synchronized from the blockchain. The data verification result is configured for indicating whether the service data identifier obtained through synchronization includes the target service data identifier. The first data verification result is configured for indicating the verification execution node to: when it is determined that the service data identifier obtained through synchronization does not include the target service data identifier, obtain a node routing list corresponding to the verification execution node, and determine, as the second node mapping identifier, a routing node mapping identifier, among K routing node mapping identifiers recorded in the node routing list, that is found in a second order opposite to the first order and that has a shortest distance from the target service data identifier. K is a positive integer greater than 1, and K is less than or equal to a spatial influence parameter of the mapping space.

The data verification module 22 is configured to perform data verification on the target service data based on a second node address corresponding to the second node mapping identifier when it is determined, based on the data location request, that the second node mapping identifier is a node mapping identifier with a shortest distance from the target service data identifier in the first order.

The mapping space includes a ring mapping space, and an addressing direction of the ring mapping space is determined based on a direction indicated by the first order. The data verification module 22 may include a data verification unit 221 and a proof returning unit 222.

The data verification unit 221 is configured to: when it is determined, based on the data location request, that the second node mapping identifier is a node mapping identifier with a shortest distance from the target service data identifier in the addressing direction, perform data verification on the target service data based on the target verification information stored at the second node address, to obtain a second data verification result.

The data verification unit 221 may include a tree root verification subunit 2211, a signature verification subunit 2212, a timestamp verification subunit 2213, and a certificate verification subunit 2214.

In an implementation, the target verification information includes a Merkle path associated with the target service data. The Merkle path is a path connecting a target service corresponding to the target service data to a Merkle tree root. The Merkle path includes a path hash value for participating in reconstruction of a Merkle tree corresponding to the Merkle tree root.

The tree root verification subunit 2211 is configured to obtain the Merkle path from the target verification information stored at the second node address, obtain the path hash value from the Merkle path during obtaining of a service hash value of the target service data corresponding to the target service, reconstruct the Merkle tree root based on the service hash value of the target service data and the Merkle path, and determine the reconstructed Merkle tree root as a verification tree root.

The tree root verification subunit 2211 is further configured to locate, based on the service hash value, a target block to which the target service data belongs, determine a Merkle tree root obtained from block header information of the target block as a bench obtained Merkle tree root, and compare the verification tree root with the bench Merkle tree root to obtain a tree root verification result.

The tree root verification subunit 2211 is further configured to determine the second data verification result based on the tree root verification result.

In an implementation, the target verification information includes a node signature set associated with the target block to which the target service data belongs. The node signature set includes G pieces of node signature information associated with G consensus nodes in the consensus network. One piece of node signature information is obtained by one consensus node by signing the target block. G is a positive integer.

The signature verification subunit 2212 is configured to obtain node public keys respectively corresponding to the G consensus nodes, and perform node signature verification on the G pieces of node signature information based on the obtained G node public keys, to obtain a node signature verification result. A node public key corresponding to one consensus node is configured for performing node signature verification on one piece of node signature information.

The signature verification subunit 2212 is further configured to determine the second data verification result based on the node signature verification result.

In an implementation, the target verification information includes first time association information associated with the target service data. The first time association information includes a data timestamp of the target service data.

The timestamp verification subunit 2213 is configured to obtain a verification timestamp of the target service data from the data location request, and compare the verification timestamp with the data timestamp to obtain a timestamp verification result.

The timestamp verification subunit 2213 is further configured to determine the second data verification result based on the timestamp verification result.

In an implementation, the target verification information includes second time association information associated with target read/write status data. The second time association information includes a certificate validity period corresponding to a public key certificate of a consensus node in the consensus network.

The certificate verification subunit 2214 is configured to use, as a first public key certificate, the public key certificate of the consensus node that is synchronized from the blockchain. The first public key certificate includes a node public key for performing node signature verification on the node signature set associated with the target block to which the target service data belongs.

The certificate verification subunit 2214 is further configured to obtain usage duration of the first public key certificate, and compare the usage duration of the first public key certificate with the certificate validity period to obtain a certificate validity verification result.

The certificate verification subunit 2214 is further configured to determine the second data verification result based on the certificate validity verification result.

For specific implementations of the tree root verification subunit 2211, the signature verification subunit 2212, the timestamp verification subunit 2213, and the certificate verification subunit 2214, refer to the descriptions of operation S202 in the embodiment corresponding to FIG. 4.

The proof returning unit 222 is configured to return, to a service object based on the second data verification result, first verification proof information corresponding to the target service data.

For specific implementations of the data verification unit 221 and the proof returning unit 222, refer to the descriptions of operation S202 in the embodiment corresponding to FIG. 4.

The target service data is determined after a consensus node in the consensus network invokes target service processing data in the blockchain to perform a target service. The target service data includes one or more of a target service execution result or target read/write status data that is associated with the target service. The target service is initiated by a second service node. The second service node is included in the service network.

The data synchronization module 23 is configured to: when the second node mapping identifier is a node mapping identifier with a shortest distance from the target service data identifier in the first order, obtain the target service data identifier and target verification information of the target service data from the blockchain, and storing the target service data identifier and the target verification information to the second node address corresponding to the second node mapping identifier. The target verification information is on-chain verification information, obtained from the blockchain, of the target service data.

Original data information of the target service data that is synchronized from the blockchain is stored on the second service node in the service network. The target verification information of the target service data includes additional reading information. The additional reading information is determined after a consensus node in the consensus network invokes target service processing data to perform permission registration on original text authorization information submitted by the second service node. The original text authorization information includes a node address of the second service node.

The original text verification module 24 is configured to: when the data verification is original text verification on the original data information of the target service data, obtain a node address of a service node on which the original data information of the target service data is stored.

The original text verification module 24 is further configured to: when the node address of the service node is the node address of the second service node, transmit, based on the additional reading information, an original text verification request for the target service data to the second service node corresponding to the service node address. The original text verification request is configured for indicating the second service node to: perform original text verification on the target service data based on the original data information of the target service data to obtain a third data verification result, and return, to the service object based on the third data verification result, second verification proof information corresponding to the target service data.

The third forwarding module 25 is configured to: when no verification node storing the target verification information is found among the M verification nodes, forward the data location request carrying the target service data identifier to a consensus node in the consensus network, so that the consensus node performs data verification on the target service data based on the data location request.

The fourth forwarding module 26 is configured to: if a node status of the target verification node is an ineffective state or the target verification information of the target service data that is stored on the target verification node is damaged information, forward the data location request carrying the target service data identifier to a backup verification node. A node mapping identifier of the backup verification node is a node mapping identifier, other than the second node mapping identifier, that has a shortest distance from the target service data identifier in the first order. The backup verification node is configured to back up the target verification information. The data location request is configured for indicating the backup verification node to perform data verification on the target service data based on the backed-up target verification information.

The target service processing data is configured for determining a verifiable timestamp of the target service data.

The data clearing module 27 is configured to obtain a verification time limit event generated by a consensus node in the consensus network based on the verifiable timestamp of the target service data, and when the verifiable timestamp in the verification time limit event is obtained, clear the target service data identifier and the target verification information if a data timestamp of the target service data is earlier than the verifiable timestamp.

For specific implementations of the request receiving module 21, the data verification module 22, the data synchronization module 23, the original text verification module 24, the third forwarding module 25, the fourth forwarding module 26, and the data clearing module 27, refer to the descriptions of operation S201 and operation S202 in the embodiment corresponding to FIG. 4.

Figure 11:
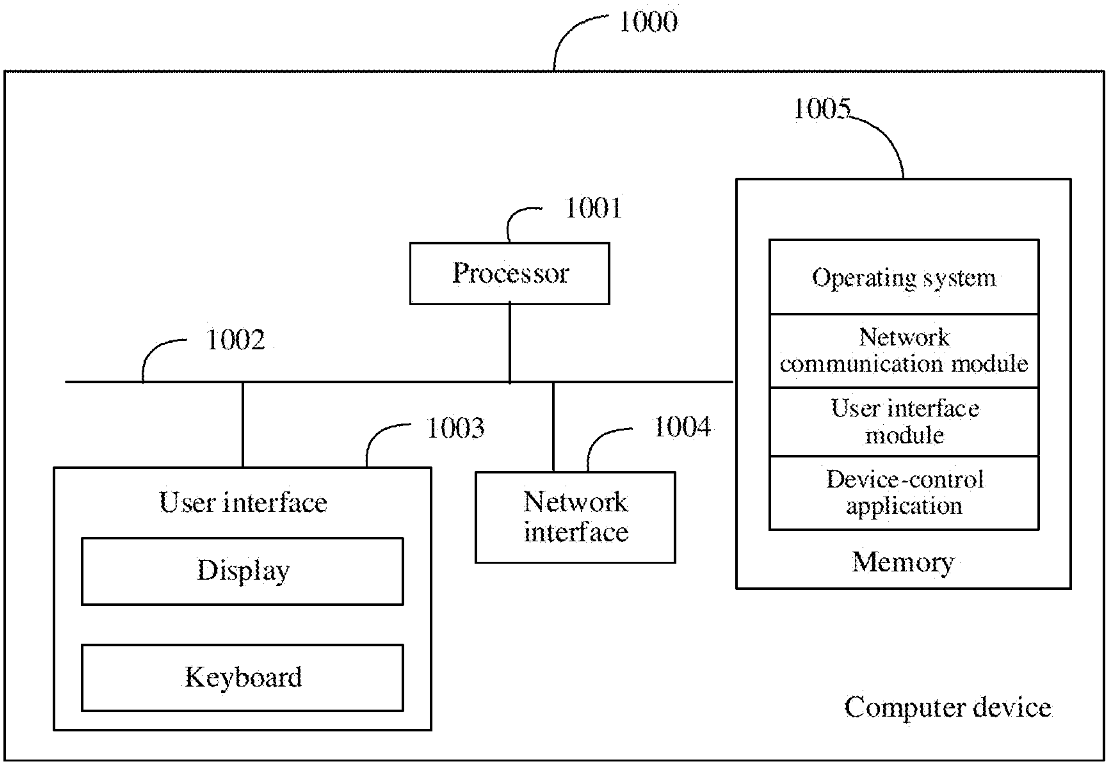
FIG. 11 is a schematic structural diagram of a computer device according to an embodiment of this disclosure.

FIG. 11 is a schematic structural diagram of a computer device according to an embodiment of this disclosure. As shown in FIG. 11, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In some embodiments, the network interface 1004 may include a standard wired interface and wireless interface (for example, a Wi-Fi interface). The memory 1005 may be a high-speed RAM memory, or may be a non-volatile memory, for example, at least one magnetic disk memory. In some embodiments, the memory 1005 may be at least one storage apparatus located away from the processor 1001. As shown in FIG. 11, the memory 1005 used as a computer-readable storage medium may include an operating system, a network communication module, a user interface module, and a device-control application.

In the computer device 1000 shown in FIG. 11, the network interface 1004 may provide a network communication function, the user interface 1003 is mainly configured to provide an input interface for a user, and the processor 1001 may be configured to invoke the device-control application stored in the memory 1005 to perform the descriptions of the data processing method based on the hierarchical chain network in the embodiment corresponding to either of FIG. 3 and FIG. 4. In addition, beneficial effects of the same method are not described herein again either.

In addition, embodiments of this disclosure further provide a computer-readable storage medium. The computer-readable storage medium stores a computer program to be executed by the data processing apparatus 1 based on the hierarchical chain network and the data processing apparatus 2 based on the hierarchical chain network, and the computer program includes program instructions. When the program instructions are executed by a processor, the descriptions of the data processing method based on the hierarchical chain network in the embodiment corresponding to either of FIG. 3 and FIG. 4 can be performed. For technical details that are not disclosed in the embodiment of the computer-readable storage medium in this disclosure, refer to the descriptions of the method embodiments of this disclosure.

The computer-readable storage medium may be an internal storage unit of the data processing apparatus based on the hierarchical chain network in any one of the foregoing embodiments or an internal storage unit of the computer device, for example, a hard disk drive or a memory of the computer device. Alternatively, the computer-readable storage medium may be an external storage device of the computer device, for example, a plug-in hard disk, a smart media card (SMC), a secure digital (SD) card, a flash card, or the like that is configured on the computer device. Further, the computer-readable storage medium may alternatively include both an internal storage unit of the computer device and an external storage device. The computer-readable storage medium is configured to store the computer program and other programs and data that are required by the computer device. The computer-readable storage medium may be further configured to temporarily store data that has been output or is to be output.

In addition, embodiments of this disclosure further provide a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the method provided in the embodiment corresponding to either of FIG. 3 and FIG. 4. For technical details that are not disclosed in the computer program product or the computer program embodiments of this disclosure, refer to the descriptions of the method embodiments of this disclosure.

Figure 12:
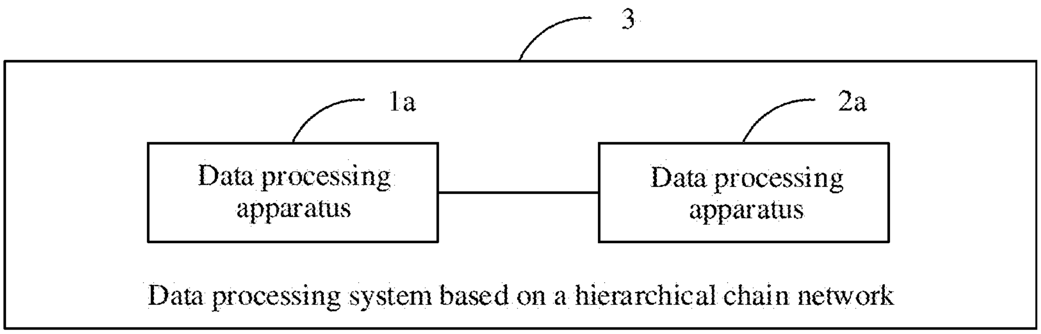
FIG. 12 is a schematic structural diagram of a data processing system based on a hierarchical chain network according to an embodiment of this disclosure.

Further, FIG. 12 is a schematic structural diagram of a data processing system based on a hierarchical chain network according to an embodiment of this disclosure. As shown in FIG. 12, the data processing system 3 based on the hierarchical chain network may include a data processing apparatus 1*a* and a data processing apparatus 2*a*. The data processing apparatus 1*a* may be the data processing apparatus 1 based on the hierarchical chain network in the embodiment corresponding to FIG. 9. The data processing apparatus 1*a* may be integrated in the verification node 20A in the embodiment corresponding to FIG. 2. The data processing apparatus 2*a* may be the data processing apparatus 2 based on the hierarchical chain network in the embodiment corresponding to FIG. 10. The data processing apparatus 2*a* may be integrated in the verification node 20B in the embodiment corresponding to FIG. 2. In addition, beneficial effects of the same method are not described herein again either. For technical details that are not disclosed in the embodiments of the data processing system based on the hierarchical chain network in this disclosure, refer to the descriptions of the method embodiments of this disclosure.

A person of ordinary skill in the art may be aware that, in combination with the examples described in embodiments disclosed in this specification, units and algorithm operations can be implemented by electronic hardware, computer software, or a combination thereof. To clearly describe interchangeability between hardware and software, the foregoing generally describes compositions and operations of the examples based on functions. Whether the functions are performed by hardware or software depends on particular applications and design constraints of technical solutions. A person skilled in the art may use different methods to implement the described functions for each particular application, but it is not to be considered that the implementation goes beyond the scope of this disclosure.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A data processing method based on a hierarchical chain network, the method being performed by a verification execution node, the hierarchical chain network comprising a verification network, a service network, and a consensus network, both the verification network and the service network being deployed at a service layer of the hierarchical chain network, the consensus network being deployed at a consensus layer independent of the service layer, a blockchain maintained by the consensus network being configured to store service data of a service submitted by a service node in the service network, M verification nodes being deployed in the verification network, M being a positive integer, the verification execution node being comprised in the M verification nodes, and the method comprising:

obtaining a data location request transmitted by a first service node in the service network for target service data;

determining a first node mapping identifier of the verification execution node from a mapping space corresponding to the verification network in response to a target service data identifier of the target service data being identified from the data location request, the mapping space comprising node mapping identifiers respectively corresponding to the M verification nodes, and the node mapping identifiers being obtained by respectively mapping node addresses of the M verification nodes to the mapping space;

performing, in a first order obtained by sorting the node mapping identifiers in ascending order, data verification on the target service data identifier based on a resource location table associated with a first node address of the verification execution node, to obtain a first data verification result, the resource location table being for recording an adjacent node mapping identifier greater than the first node mapping identifier, an adjacent node address corresponding to the adjacent node mapping identifier being for storing a service data identifier of the service data that is synchronized from the blockchain, and the data verification result being for indicating whether the service data identifier obtained through synchronization comprises the target service data identifier;

obtaining a node routing list corresponding to the verification execution node in response to the first data verification result indicating that the service data identifier obtained through synchronization does not comprise the target service data identifier, the node routing list being for recording K routing node mapping identifiers, the routing node mapping identifier being a node mapping identifier of a verification node that has a preset distance from the first node mapping identifier in the mapping space, K being a positive integer greater than 1, and K being less than or equal to a spatial influence parameter of the mapping space;

determining, as a second node mapping identifier, a routing node mapping identifier among the K routing node mapping identifiers that is found in a second order opposite to the first order and that has a shortest distance from the target service data identifier in the mapping space; and transmitting a data location request to a target verification node corresponding to the second node mapping identifier, to enable the target verification node to perform data verification on the target service data.

2. The method according to claim 1, wherein the mapping space comprises a ring mapping space, and the target service data identifier is obtained by mapping the target service data to the ring mapping space, and the determining the first node mapping identifier of the verification execution node from a mapping space corresponding to the verification network comprises:

obtaining the first node address of the verification execution node in response to the target service data identifier of the target service data being identified from the data location request; and mapping the first node address to the ring mapping space to obtain the first node mapping identifier of the verification execution node.

3. The method according to claim 1, wherein the performing the data verification on the target service data identifier based on a resource location table associated with a first node address of the verification execution node to obtain the first data verification result comprises:

obtaining, in the first order obtained by sorting the node mapping identifiers in ascending order, the resource location table associated with the first node address of the verification execution node;

determining a target adjacent verification node mapping identifier from adjacent node mapping identifiers comprised in the resource location table; and performing data verification on the target service data identifier based on the first node mapping identifier and the target adjacent verification node mapping identifier to obtain the first data verification result.

4. The method according to claim 3, wherein the service data identifier obtained through synchronization comprises a target synchronous data identifier, and the target synchronous data identifier is a target synchronous data identifier of target on-chain synchronous data information that is synchronized from the blockchain and that is stored at a target adjacent verification node address corresponding to the target adjacent verification node mapping identifier, and the performing the data verification on the target service data identifier based on the first node mapping identifier and the target adjacent verification node mapping identifier to obtain the first data verification result comprises:

in response to the target service data identifier falling within a spatial range determined based on the first node mapping identifier and the target adjacent verification node mapping identifier, determining that the target adjacent verification node mapping identifier is a node mapping identifier with a shortest distance from the target service data identifier in the first order, and determining that the target synchronous data identifier comprises the target service data identifier, the distance being a hash distance obtained by performing an exclusive OR operation on the target adjacent verification node mapping identifier and the target service data identifier when the target adjacent verification node mapping identifier and the target service data identifier are hash values with a same length; and using, as the first data verification result, a data verification result obtained when the target synchronous data identifier comprises the target service data identifier.

5. The method according to claim 4, wherein the performing the data verification on the target service data identifier based on the first node mapping identifier and the target adjacent verification node mapping identifier to obtain the first data verification result comprises:

in response to the target service data identifier falling outside the spatial range determined based on the first node mapping identifier and the target adjacent verification node mapping identifier, determining that the target synchronous data identifier does not comprise the target service data identifier; and using, as the first data verification result, a data verification result obtained when the target synchronous data identifier does not comprise the target service data identifier.

6. The method according to claim 4, wherein the method further comprises:

in response to the first data verification result indicating that the target synchronous data identifier comprises the target service data identifier, forwarding the data location request carrying the target service data identifier to a target adjacent verification node corresponding to the target adjacent verification node mapping identifier, the data location request being for indicating the target adjacent verification node to perform data verification on the target service data, and a node address of the target adjacent verification node being the target adjacent verification node address.

7. The method according to claim 3, wherein a quantity of adjacent node mapping identifiers is N, and N is a positive integer greater than 1, and the determining the target adjacent verification node mapping identifier from adjacent node mapping identifiers comprised in the resource location table comprises:

searching, in the first order among the N adjacent node mapping identifiers, for an adjacent node mapping identifier corresponding to a node address immediately after the first node address, and using the adjacent node mapping identifier corresponding to the node address immediately after the first node address as a first adjacent node mapping identifier;

obtaining a node status of a first adjacent verification node corresponding to the first adjacent node mapping identifier;

in response to the node status of the first adjacent verification node being an effective state, using the first adjacent node mapping identifier as the target adjacent verification node mapping identifier.

8. The method according to claim 7, wherein the determining the target adjacent verification node mapping identifier from adjacent node mapping identifiers comprised in the resource location table comprises:

in response to the node status of the first adjacent verification node being an ineffective state, determining the target adjacent verification node mapping identifier in the first order from (N−1) adjacent node mapping identifiers other than the first adjacent node mapping identifier.

9. The method according to claim 1, wherein the mapping space comprises a ring mapping space, and an addressing direction of the ring mapping space is determined based on a direction indicated by the first order, and the determining, as the second node mapping identifier, the routing node mapping identifier among the K routing node mapping identifiers comprises:

determining a second order opposite to the first order in the ring mapping space;

determining a direction indicated by the second order as an opposite direction of the addressing direction;

searching, among the K routing node mapping identifiers, for a routing node mapping identifier with a longest distance from the first node mapping identifier in the opposite direction of the addressing direction;

using the found routing node mapping identifier as a first routing node mapping identifier; and in response to the first routing node mapping identifier falling within a spatial range determined based on the first node mapping identifier and the target service data identifier, determining that the first routing node mapping identifier is a node mapping identifier with a shortest distance from the target service data identifier in the opposite direction of the addressing direction, and using the first routing node mapping identifier as the second node mapping identifier.

10. The method according to claim 9, wherein the determining, as the second node mapping identifier, the routing node mapping identifier among the K routing node mapping identifiers comprises:

in response to the first routing node mapping identifier falling outside the spatial range determined based on the first node mapping identifier and the target service data identifier, determining the second node mapping identifier from (K−1) routing node mapping identifiers other than the first routing node mapping identifier.

11. A data processing method based on a hierarchical chain network, the method being performed by a target verification node, the hierarchical chain network comprising a verification network, a service network, and a consensus network, both the verification network and the service network being deployed at a service layer of the hierarchical chain network, the consensus network being deployed at a consensus layer independent of the service layer, a blockchain maintained by the consensus network being configured to store service data of a service submitted by a service node in the service network, M verification nodes being deployed in the verification network, M being a positive integer, the target verification node being comprised in the M verification nodes, and the method comprising:

obtaining a data location request that carries a target service data identifier and that is forwarded by a verification execution node based on a second node mapping identifier, the verification execution node being comprised in the M verification nodes, the data location request being a request transmitted by a first service node for target service data corresponding to the target service data identifier, the first service node being any service node in the service network, the verification execution node being configured to:

determine a first node mapping identifier of the verification execution node from a mapping space corresponding to the verification network in response to the target service data identifier being identified from the data location request, and perform, in a first order obtained by sorting node mapping identifiers in the mapping space in ascending order, data verification on the target service data identifier based on a resource location table associated with a first node address of the verification execution node, to obtain a first data verification result, the mapping space comprising node mapping identifiers respectively corresponding to the M verification nodes, the node mapping identifiers being obtained by respectively mapping node addresses of the M verification nodes to the mapping space, the resource location table being for recording an adjacent node mapping identifier greater than the first node mapping identifier, an adjacent node address corresponding to the adjacent node mapping identifier being for storing a service data identifier of the service data that is synchronized from the blockchain, the data verification result being for indicating whether the service data identifier obtained through synchronization comprises the target service data identifier, the first data verification result being for indicating the verification execution node to:

in response to the service data identifier obtained through synchronization not comprising the target service data identifier, obtain a node routing list maintained by the verification execution node, and determine, as the second node mapping identifier, a routing node mapping identifier, among K routing node mapping identifiers recorded in the node routing list, that is found in a second order opposite to the first order and that has a shortest distance from the target service data identifier, K being a positive integer greater than 1, and K being less than or equal to a spatial influence parameter of the mapping space; and performing data verification on the target service data based on a second node address corresponding to the second node mapping identifier in response to determining, based on the data location request, that the second node mapping identifier is a node mapping identifier with a shortest distance from the target service data identifier in the first order.

12. The method according to claim 11, wherein the target service data is determined after a consensus node in the consensus network invokes target service processing data in the blockchain to perform a target service, the target service is initiated by a second service node, and the second service node is a service node comprised in the service network, and the method further comprises:

in response to the second node mapping identifier being a node mapping identifier with a shortest distance from the target service data identifier in the first order, obtaining the target service data identifier and target verification information of the target service data from the blockchain, and storing the target service data identifier and the target verification information to the second node address corresponding to the second node mapping identifier, the target verification information being on-chain verification information, obtained from the blockchain, of the target service data.

13. The method according to claim 11, wherein the mapping space comprises a ring mapping space, and an addressing direction of the ring mapping space is determined based on a direction indicated by the first order, and the performing data verification on the target service data based on the second node address corresponding to the second node mapping identifier comprises:

in response to determining, based on the data location request, that the second node mapping identifier is a node mapping identifier with a shortest distance from the target service data identifier in the addressing direction, performing data verification on the target service data based on the target verification information stored at the second node address, to obtain a second data verification result; and returning, to the service object based on the second data verification result, first verification proof information corresponding to the target service data.

14. The method according to claim 13, wherein the target verification information comprises a Merkle path associated with the target service data, the Merkle path is a path connecting a target service corresponding to the target service data to a Merkle tree root, and the Merkle path comprises a path hash value for participating in reconstruction of a Merkle tree corresponding to the Merkle tree root, and the performing the data verification on the target service data based on the target verification information stored at the second node address, to obtain the second data verification result comprises:

obtaining the Merkle path from the target verification information stored at the second node address;

obtaining the path hash value from the Merkle path during obtaining of a service hash value of the target service data corresponding to the target service;

reconstructing the Merkle tree root based on the service hash value of the target service data and the path hash value;

determining the reconstructed Merkle tree root as a verification tree root;

locating, based on the service hash value, a target block to which the target service data belongs;

determining a Merkle tree root obtained from block header information of the target block as a bench Merkle tree root, and comparing the verification tree root with the bench Merkle tree root to obtain a tree root verification result; and determining the second data verification result based on the tree root verification result.

15. The method according to claim 13, wherein the target verification information comprises a node signature set associated with the target block to which the target service data belongs, the node signature set comprises G pieces of node signature information associated with G consensus nodes in the consensus network, one piece of node signature information is obtained by one consensus node by signing the target block, and G is a positive integer, and the performing the data verification on the target service data based on the target verification information stored at the second node address to obtain the second data verification result comprises:

obtaining node public keys respectively corresponding to the G consensus nodes;

performing node signature verification on the G pieces of node signature information based on the obtained G node public keys, to obtain a node signature verification result, a node public key corresponding to one consensus node being for performing node signature verification on one piece of node signature information; and determining the second data verification result based on the node signature verification result.

16. The method according to claim 11, wherein original data information of the target service data that is synchronized from the blockchain is stored on the second service node in the service network, the target verification information of the target service data comprises additional reading information, the additional reading information is determined after a consensus node in the consensus network invokes target service processing data to perform permission registration on original text authorization information submitted by the second service node, and the original text authorization information comprises a node address of the second service node; and the method further comprises:

in response to the data verification being original text verification on the original data information of the target service data, obtaining a node address of a service node on which the original data information of the target service data is stored; and in response to the node address of the service node being the node address of the second service node, transmitting an original text verification request for the target service data to the second service node based on the additional reading information, the original text verification request being for indicating the second service node to:

perform original text verification on the target service data based on the original data information of the target service data to obtain a third data verification result, and return, to the service object based on the third data verification result, second verification proof information corresponding to the target service data.

17. The method according to claim 11, wherein the method further comprises:

in response to no verification node storing the target verification information of the target service data being found among the M verification nodes, forwarding the data location request carrying the target service data identifier to a consensus node in the consensus network such that the consensus node performs data verification on the target service data based on the data location request.

18. The method according to claim 11, further comprising:

in response to a node status of the target verification node being an ineffective state or the target verification information of the target service data that is stored on the target verification node being damaged information, forwarding the data location request carrying the target service data identifier to a backup verification node, a node mapping identifier of the backup verification node being a node mapping identifier, other than the second node mapping identifier, that has a shortest distance from the target service data identifier in the first order, the backup verification node being configured to back up the target verification information, and the data location request being for indicating the backup verification node to perform data verification on the target service data based on the backed-up target verification information.

19. The method according to claim 11, wherein the target service processing data is for determining a verifiable timestamp of the target service data, and the method further comprises:

obtaining a verification time limit event generated by a consensus node in the consensus network based on the verifiable timestamp of the target service data; and in response to obtaining the verifiable timestamp in the verification time limit event and a data timestamp of the target service data being earlier than the verifiable timestamp, clearing the target service data identifier and the target verification information.

20. A data processing apparatus based on a hierarchical chain network, the apparatus running on a verification execution node, the hierarchical chain network comprising a verification network, a service network, and a consensus network, both the verification network and the service network being deployed at a service layer of the hierarchical chain network, the consensus network being deployed at a consensus layer independent of the service layer, a blockchain maintained by the consensus network being configured to store service data of a service submitted by a service node in the service network, M verification nodes being deployed in the verification network, M being a positive integer, the verification execution node being comprised in the M verification nodes, and the apparatus comprising:

a memory operable to store computer-readable instructions; and a processor circuitry operable to read the computer-readable instructions, the processor circuitry when executing the computer-readable instructions is configured to:

obtain a data location request transmitted by a first service node in the service network for target service data;

determine a first node mapping identifier of the verification execution node from a mapping space corresponding to the verification network in response to a target service data identifier of the target service data being identified from the data location request, the mapping space comprising node mapping identifiers respectively corresponding to the M verification nodes, and the node mapping identifiers being obtained by respectively mapping node addresses of the M verification nodes to the mapping space;

perform, in a first order obtained by sorting the node mapping identifiers in ascending order, data verification on the target service data identifier based on a resource location table associated with a first node address of the verification execution node, to obtain a first data verification result, the resource location table being for recording an adjacent node mapping identifier greater than the first node mapping identifier, an adjacent node address corresponding to the adjacent node mapping identifier being for storing a service data identifier of the service data that is synchronized from the blockchain, and the data verification result being for indicating whether the service data identifier obtained through synchronization comprises the target service data identifier;

obtain a node routing list corresponding to the verification execution node in response to the first data verification result indicating that the service data identifier obtained through synchronization does not comprise the target service data identifier, the node routing list being for recording K routing node mapping identifiers, the routing node mapping identifier being a node mapping identifier of a verification node that has a preset distance from the first node mapping identifier in the mapping space, K being a positive integer greater than 1, and K being less than or equal to a spatial influence parameter of the mapping space;

determine, as a second node mapping identifier, a routing node mapping identifier among the K routing node mapping identifiers that is found in a second order opposite to the first order and that has a shortest distance from the target service data identifier in the mapping space; and transmit a data location request to a target verification node corresponding to the second node mapping identifier, to enable the target verification node to perform data verification on the target service data.

* * * * *